United States Patent
Rizzo et al.

(10) Patent No.: US 12,552,593 B2
(45) Date of Patent: Feb. 17, 2026

(54) SHIPPING SYSTEM FOR STORING AND/OR TRANSPORTING TEMPERATURE-SENSITIVE MATERIALS

(71) Applicant: Cold Chain Technologies, LLC, Franklin, MA (US)

(72) Inventors: Anthony Rizzo, Grafton, MA (US); Amanda Lynn Longley, Hudson, MA (US); James Nilsen, Mays Landing, NJ (US); Tzeho Lee, Needham, MA (US); Richard Orsini, Roxbury, MA (US); Fery Pranadi, Pleasanton, CA (US); Gregory Cook, Holliston, MA (US); Ali Moghaddas, Cumberland, RI (US); Brian Paul Skocypec, North Attleboro, MA (US); Joseph Francis Consiglio, Ashland, MA (US)

(73) Assignee: COLD CHAIN TECHNOLOGIES, LLC, Franklin, MA (US)

( * ) Notice: Subject to any disclaimer, the term of this patent is extended or adjusted under 35 U.S.C. 154(b) by 0 days.

(21) Appl. No.: 18/752,609

(22) Filed: Jun. 24, 2024

(65) Prior Publication Data
US 2025/0011068 A1   Jan. 9, 2025

Related U.S. Application Data

(63) Continuation of application No. 17/842,544, filed on Jun. 16, 2022, now Pat. No. 12,043,470, which is a
(Continued)

(51) Int. Cl.
*B65D 81/38* (2006.01)
*B65D 81/18* (2006.01)
(Continued)

(52) U.S. Cl.
CPC ......... *B65D 81/3834* (2013.01); *B65D 81/18* (2013.01); *B65D 81/383* (2013.01);
(Continued)

(58) Field of Classification Search
CPC ............. F25D 3/08; F25D 2303/08222; F25D 2303/082; F25D 2303/0821;
(Continued)

(56) References Cited

U.S. PATENT DOCUMENTS 2,289,060 A   7/1942   Merkle
2,317,005 A   4/1943   Wasserman
(Continued)

FOREIGN PATENT DOCUMENTS

CN   100455956 C   1/2009
CN   101811601 A   8/2010
(Continued)

OTHER PUBLICATIONS

International Search Report dated Jan. 27, 2020, in corresponding PCT Application No. PCT/US19/60494.
(Continued)

*Primary Examiner* — Lionel Nouketcha
(74) *Attorney, Agent, or Firm* — KRIEGSMAN & KRIEGSMAN

(57) ABSTRACT

Shipping system for storing and/or transporting temperature-sensitive materials. In one embodiment, the system includes an outer box having four side walls, bottom closure flaps, and top closure flaps. A vacuum insulated panel (VIP) is detachably coupled to one of the top closure flaps and is removably covered by a cover. An insulation unit is removably positioned within the outer box, the insulation unit including a plurality of VIPs arranged to define a cavity bounded by a bottom wall and four side walls. A disposable liner is removably mounted on the insulation unit. The liner
(Continued)

may be a thermoformed sheet and may cover the interior and top surfaces of the insulation unit. A plurality of temperature-control members and a product box may be removably positioned in the liner. Preferably, the liner is shaped so that the temperature-control members snugly fit around all sides of the product box.

21 Claims, 23 Drawing Sheets

Related U.S. Application Data continuation of application No. 16/184,878, filed on Nov. 8, 2018, now Pat. No. 11,511,928, which is a continuation-in-part of application No. 15/975,600, filed on May 9, 2018, now Pat. No. 11,499,770.

(60) Provisional application No. 62/503,802, filed on May 9, 2017.

(51) Int. Cl.
*F25D 3/00* (2006.01)
*F25D 3/06* (2006.01)

(52) U.S. Cl.
CPC ............... *F25D 3/00* (2013.01); *F25D 3/06* (2013.01); *F25D 2303/082* (2013.01); *F25D 2303/084* (2013.01); *F25D 2303/0843* (2013.01); *F25D 2303/0844* (2013.01); *F25D 2303/0845* (2013.01)

(58) Field of Classification Search
CPC ............ F25D 2303/0832; B65B 63/08; B65D 21/0234; B65D 81/18
See application file for complete search history.

(56) References Cited

U.S. PATENT DOCUMENTS

| | | | |
|---|---|---|---|
| 2,467,268 A | 4/1949 | Merkle | |
| 2,515,709 A | 7/1950 | Heard et al. | |
| 2,844,299 A | 7/1958 | Kessler et al. | |
| 3,828,960 A | 8/1974 | Walles | |
| 3,890,762 A | 6/1975 | Ernst et al. | |
| 3,980,005 A | 9/1976 | Buonaiuto | |
| 3,993,811 A | 11/1976 | Walles | |
| 4,206,616 A | 6/1980 | Frank et al. | |
| 4,292,817 A | 10/1981 | Loucks | |
| 4,294,079 A | 10/1981 | Benson | |
| 4,311,022 A | 1/1982 | Hall | |
| 4,377,075 A | 3/1983 | Russo | |
| 4,446,705 A | 5/1984 | Loucks | |
| 4,527,370 A | 7/1985 | Schuette | |
| 4,529,638 A | 7/1985 | Yamamoto et al. | |
| 4,682,708 A | 7/1987 | Pool | |
| 4,819,793 A | 4/1989 | Willard et al. | |
| 4,889,252 A | 12/1989 | Rockom et al. | |
| 4,903,493 A | 2/1990 | Van Iperen et al. | |
| 4,928,847 A | 5/1990 | Hollander et al. | |
| 4,931,333 A | 6/1990 | Henry | |
| 4,947,658 A | 8/1990 | Wheeler et al. | |
| 5,042,260 A | 8/1991 | George, Sr. | |
| 5,102,004 A | 4/1992 | Hollander et al. | |
| 5,111,957 A | 5/1992 | Hollander et al. | |
| 5,216,900 A | 6/1993 | Jones | |
| 5,218,923 A | 6/1993 | LaRosa | |
| 5,323,911 A | 6/1994 | Johnston et al. | |
| 5,450,977 A | 9/1995 | Moe | |
| 5,501,338 A | 3/1996 | Preston | |
| 5,570,588 A | 11/1996 | Lowe | |
| 5,586,438 A | 12/1996 | Fahy | |
| 5,669,233 A | 9/1997 | Cook et al. | |
| 5,709,307 A | 1/1998 | Rosado et al. | |
| 5,755,987 A | 5/1998 | Goldstein et al. | |
| 5,897,017 A | 4/1999 | Lantz | |
| 5,899,088 A | 5/1999 | Purdum | |
| 5,924,302 A | 7/1999 | Derifield | |
| 5,979,693 A | 11/1999 | Bane, III | |
| 6,041,958 A | 3/2000 | Tremelo | |
| 6,044,650 A | 4/2000 | Cook et al. | |
| 6,055,825 A | 5/2000 | Choy | |
| 6,070,427 A | 6/2000 | Fine et al. | |
| 6,106,449 A | 8/2000 | Wynne | |
| 6,116,042 A | 9/2000 | Purdum | |
| 6,131,376 A | 10/2000 | Grey et al. | |
| 6,168,040 B1 | 1/2001 | Sautner et al. | |
| 6,189,330 B1 | 2/2001 | Retallick et al. | |
| 6,192,703 B1 | 2/2001 | Salyer et al. | |
| 6,209,343 B1 | 4/2001 | Owen | |
| 6,233,965 B1 | 5/2001 | Choy | |
| 6,244,458 B1 | 6/2001 | Frysinger et al. | |
| 6,257,764 B1 | 7/2001 | Lantz | |
| 6,295,830 B1 | 10/2001 | Newman | |
| 6,325,281 B1 | 12/2001 | Grogan | |
| 6,336,340 B1 | 1/2002 | Laby | |
| 6,427,475 B1 | 8/2002 | DeFelice et al. | |
| 6,450,398 B1 | 9/2002 | Muise et al. | |
| 6,482,332 B1 | 11/2002 | Malach | |
| 6,490,880 B1 | 12/2002 | Walsh | |
| 6,519,968 B1 | 2/2003 | Konarski | |
| 6,557,370 B2 | 5/2003 | Gano, III | |
| 6,564,992 B1 | 5/2003 | Wegner | |
| 6,584,797 B1 | 7/2003 | Smith et al. | |
| 6,619,500 B1 | 9/2003 | Lantz | |
| 6,645,598 B2 | 11/2003 | Alderman | |
| 6,668,577 B2 | 12/2003 | Quenedey | |
| 6,718,776 B2 | 4/2004 | Wessling et al. | |
| 6,771,183 B2 | 8/2004 | Hunter | |
| 6,838,146 B2 | 1/2005 | Merrill et al. | |
| 6,868,982 B2 | 3/2005 | Gordon | |
| 6,875,486 B2 | 4/2005 | Miller | |
| 6,910,582 B2 | 6/2005 | Lantz | |
| 7,028,504 B2 | 4/2006 | Derifield | |
| 7,057,527 B2 | 6/2006 | Hunter | |
| 7,131,289 B2 | 11/2006 | Harl et al. | |
| 7,147,626 B2 | 12/2006 | Goodman et al. | |
| 7,225,632 B2 | 6/2007 | Derifield | |
| 7,240,513 B1 | 7/2007 | Conforti | |
| 7,257,963 B2 | 8/2007 | Mayer | |
| 7,294,374 B2 | 11/2007 | Romero | |
| 7,318,535 B2 | 1/2008 | Gano, III et al. | |
| 7,328,583 B2 | 2/2008 | Hillman et al. | |
| 7,422,143 B2 | 9/2008 | Mayer | |
| 7,500,593 B2 | 3/2009 | Mayer | |
| 7,537,817 B2 | 5/2009 | Tsunetsugu et al. | |
| 7,624,873 B2 | 12/2009 | Tennant et al. | |
| 7,624,911 B2 | 12/2009 | Spurrell et al. | |
| 7,641,812 B2 | 1/2010 | Alderman | |
| 7,677,406 B2 | 3/2010 | Maxson | |
| 7,681,405 B2 | 3/2010 | Williams | |
| 7,704,584 B2 | 4/2010 | Alderman | |
| 7,721,566 B1 | 5/2010 | Wilken | |
| 7,849,708 B2 | 12/2010 | Goncharko et al. | |
| 7,862,876 B2 | 1/2011 | Yuasa et al. | |
| 7,896,182 B1 | 3/2011 | Hansen et al. | |
| 7,908,870 B2 | 3/2011 | Williams et al. | |
| 7,909,806 B2 | 3/2011 | Goodman et al. | |
| 7,950,246 B1 | 5/2011 | Mayer et al. | |
| 8,056,357 B2 | 11/2011 | Bruce | |
| 8,074,465 B2 | 12/2011 | Heroux et al. | |
| 8,156,703 B2 | 4/2012 | Alderman | |
| 8,199,019 B2 | 6/2012 | Kaczmarz et al. | |
| 8,202,599 B2 | 6/2012 | Henn | |
| 8,250,882 B2 | 8/2012 | Mustafa et al. | |
| 8,313,818 B2 | 11/2012 | Vo et al. | |
| 8,333,279 B2 | 12/2012 | Veiseh | |
| 8,342,588 B2 | 1/2013 | Skaradzinski | |
| 8,349,552 B2 | 1/2013 | Haarmann et al. | |
| 8,375,730 B2 | 2/2013 | Haarmann et al. | |
| 8,424,317 B2 | 4/2013 | Dain et al. | |
| 8,424,335 B2 | 4/2013 | Corder et al. | |
| 8,607,581 B2 | 12/2013 | Williams et al. | |

(56) References Cited

U.S. PATENT DOCUMENTS

| | | |
|---|---|---|
| 8,613,202 B2 | 12/2013 | Williams |
| 8,763,423 B2 | 7/2014 | Tattam |
| 8,763,811 B2 | 7/2014 | Lantz |
| 8,881,398 B2 | 11/2014 | Hanley et al. |
| 8,881,540 B1 | 11/2014 | Barakat et al. |
| 8,887,515 B2 | 11/2014 | Patstone |
| 8,899,071 B2 | 12/2014 | Mogil et al. |
| 8,904,810 B2 | 12/2014 | Schabron et al. |
| 8,919,082 B1 | 12/2014 | Cataldo |
| 8,935,934 B2 | 1/2015 | Barakat |
| 8,938,986 B2 | 1/2015 | Matta et al. |
| 8,956,710 B2 | 2/2015 | Jang et al. |
| 9,022,249 B2 | 5/2015 | Ranade |
| 9,045,278 B2 | 6/2015 | Mustafa et al. |
| 9,060,508 B2 | 6/2015 | Anti et al. |
| 9,151,531 B2 | 10/2015 | Wengreen et al. |
| 9,180,998 B2 | 11/2015 | Banks et al. |
| 9,272,475 B2 | 3/2016 | Ranade et al. |
| 9,366,469 B2 | 6/2016 | Chapman, Jr. |
| 9,373,099 B2 | 6/2016 | Barakat |
| 9,376,605 B2 | 6/2016 | Matta et al. |
| 9,400,966 B2 | 7/2016 | Dertadian |
| 9,429,350 B2 | 8/2016 | Chapman, Jr. |
| 9,513,067 B2 | 12/2016 | Ahmed |
| 9,550,618 B1 | 1/2017 | Jobe |
| 9,556,373 B2 | 1/2017 | Formato et al. |
| 9,598,622 B2 | 3/2017 | Formato et al. |
| 9,611,067 B2 | 4/2017 | Collison |
| 9,688,454 B2 | 6/2017 | Ranade |
| 9,707,156 B2 | 7/2017 | Wengreen et al. |
| 9,719,688 B2 | 8/2017 | Holloway et al. |
| 9,751,682 B2 | 9/2017 | Mayer et al. |
| 9,814,651 B2 | 11/2017 | Wengreen et al. |
| 9,828,137 B2 | 11/2017 | Albert et al. |
| 9,828,165 B2 | 11/2017 | Ranade et al. |
| 9,834,365 B2 | 12/2017 | Pointer et al. |
| 9,877,894 B2 | 1/2018 | Wengreen et al. |
| 9,913,777 B2 | 3/2018 | Wengreen et al. |
| 9,926,102 B2 | 3/2018 | Baker et al. |
| 9,944,449 B2 | 4/2018 | Wood et al. |
| 9,950,851 B2 | 4/2018 | Ranade |
| 9,956,140 B2 | 5/2018 | Wengreen et al. |
| 9,957,098 B2 | 5/2018 | Jobe |
| 9,957,099 B2 | 5/2018 | White et al. |
| 9,963,287 B2 | 5/2018 | Vogel et al. |
| 9,975,686 B2 | 5/2018 | Caps |
| 9,981,797 B2 | 5/2018 | Aksan et al. |
| 10,077,389 B2 | 9/2018 | Formato et al. |
| 10,104,876 B2 | 10/2018 | Garland et al. |
| 10,274,247 B2 | 4/2019 | Jeong et al. |
| 10,329,074 B2 | 6/2019 | Ranade et al. |
| 10,501,254 B2 | 12/2019 | Wood et al. |
| 10,508,854 B2 | 12/2019 | Demuth et al. |
| 10,583,978 B2 | 3/2020 | Longley et al. |
| 10,604,326 B2 | 3/2020 | Longley et al. |
| 10,610,985 B2 | 4/2020 | Liu et al. |
| 10,647,498 B1 | 5/2020 | Brygier, III |
| 10,661,969 B2 | 5/2020 | Pranadi et al. |
| 10,669,466 B2 | 6/2020 | Miyashita |
| 10,766,685 B2 | 9/2020 | Kuhn et al. |
| 10,829,675 B2 | 11/2020 | Formato et al. |
| 10,928,115 B2 | 2/2021 | Anstead et al. |
| 10,946,562 B2 | 3/2021 | Mohmeyer et al. |
| 10,962,270 B2 | 3/2021 | Jain et al. |
| 10,968,625 B2 | 4/2021 | Mack et al. |
| 11,040,818 B2 | 6/2021 | Jobe |
| 11,287,079 B2 | 3/2022 | Biswas et al. |
| 11,446,915 B2 | 9/2022 | Biswas et al. |
| 11,499,770 B2 | 11/2022 | Rizzo et al. |
| 11,511,928 B2 | 11/2022 | Rizzo et al. |
| 11,518,602 B2 | 12/2022 | Knight |
| 11,535,443 B2 | 12/2022 | Caps |
| 11,634,264 B2 | 4/2023 | Caps |
| 11,649,639 B2 | 5/2023 | Olvey et al. |
| 12,043,470 B2 | 7/2024 | Rizzo et al. |
| 2002/0134962 A1 | 9/2002 | Romero |
| 2002/0144482 A1 | 10/2002 | Henson et al. |
| 2003/0102317 A1 | 6/2003 | Gordon |
| 2004/0131871 A1 | 7/2004 | Lee et al. |
| 2004/0151851 A1* | 8/2004 | Miller .................. F25D 3/08 428/34.2 |
| 2005/0098255 A1 | 5/2005 | Lembo et al. |
| 2005/0189404 A1 | 9/2005 | Xiaohai et al. |
| 2005/0224501 A1 | 10/2005 | Folkert et al. |
| 2006/0175227 A1 | 8/2006 | Lau |
| 2006/0240216 A1 | 10/2006 | Stepanian et al. |
| 2007/0028642 A1 | 2/2007 | Glade et al. |
| 2007/0051734 A1 | 3/2007 | Kuhn |
| 2007/0186577 A1 | 8/2007 | Goncharko |
| 2007/0193297 A1 | 8/2007 | Wilson |
| 2007/0193298 A1 | 8/2007 | Derifield |
| 2008/0006628 A1 | 1/2008 | Goncharko et al. |
| 2008/0135564 A1 | 6/2008 | Romero |
| 2008/0164265 A1 | 7/2008 | Conforti |
| 2009/0078708 A1* | 3/2009 | Williams .......... B65D 81/3825 220/592.2 |
| 2009/0230138 A1 | 9/2009 | Williams et al. |
| 2010/0012653 A1 | 1/2010 | Ulrich et al. |
| 2010/0038369 A1 | 2/2010 | CaNas et al. |
| 2010/0062519 A1 | 3/2010 | Franklin, Jr. et al. |
| 2010/0072211 A1 | 3/2010 | Dickinson et al. |
| 2010/0289669 A1 | 11/2010 | Saltzman et al. |
| 2010/0299278 A1 | 11/2010 | Kriss et al. |
| 2010/0314397 A1 | 12/2010 | Williams et al. |
| 2010/0326993 A1* | 12/2010 | Mayer ................ B65D 81/3825 220/592.2 |
| 2011/0079330 A1 | 4/2011 | Raine et al. |
| 2011/0248038 A1 | 10/2011 | Mayer |
| 2011/0253289 A1 | 10/2011 | Shepard |
| 2011/0290792 A1 | 12/2011 | Krzak et al. |
| 2012/0009376 A1 | 1/2012 | Rusek, Jr. |
| 2012/0237716 A1 | 9/2012 | Fukuzawa et al. |
| 2012/0248101 A1 | 10/2012 | Tumber et al. |
| 2013/0020309 A1 | 1/2013 | Tattam et al. |
| 2013/0055750 A1 | 3/2013 | Mustafa et al. |
| 2013/0062355 A1 | 3/2013 | Shulman |
| 2013/0213977 A1 | 8/2013 | Stathes et al. |
| 2013/0228583 A1 | 9/2013 | Mayer |
| 2013/0245991 A1 | 9/2013 | Kriss |
| 2013/0255306 A1 | 10/2013 | Mayer |
| 2014/0008042 A1 | 1/2014 | Schryver et al. |
| 2014/0054297 A1* | 2/2014 | Patstone ................ F25D 11/003 220/592.01 |
| 2014/0091098 A1 | 4/2014 | Casoli |
| 2014/0138392 A1 | 5/2014 | McCormick |
| 2014/0144161 A1 | 5/2014 | Pointer et al. |
| 2014/0157797 A1 | 6/2014 | Kovalick et al. |
| 2014/0311170 A1* | 10/2014 | Mills .................... F25D 11/003 62/62 |
| 2014/0319018 A1 | 10/2014 | Collison |
| 2014/0331711 A1 | 11/2014 | Blezard et al. |
| 2014/0343493 A1 | 11/2014 | Wengreen |
| 2015/0068242 A1 | 3/2015 | Patstone |
| 2015/0090728 A1 | 4/2015 | Lubart et al. |
| 2015/0150244 A9 | 6/2015 | Annis et al. |
| 2015/0166244 A1 | 6/2015 | Wood et al. |
| 2015/0191291 A1* | 7/2015 | Wood ................ B65D 81/3827 62/457.2 |
| 2015/0217927 A1 | 8/2015 | Ranade |
| 2015/0239639 A1 | 8/2015 | Wenner et al. |
| 2015/0259126 A1 | 9/2015 | McGoff et al. |
| 2015/0274415 A1 | 10/2015 | Farrar et al. |
| 2015/0276297 A1 | 10/2015 | Moore et al. |
| 2016/0039594 A1 | 2/2016 | Ranade |
| 2016/0075498 A1 | 3/2016 | Mayer et al. |
| 2016/0123648 A1* | 5/2016 | Leaverton ................ F25D 3/08 220/592.09 |
| 2016/0130066 A1* | 5/2016 | Ranade ................ B29C 43/203 220/592.25 |
| 2016/0161171 A1 | 6/2016 | Blezard et al. |
| 2016/0262979 A1 | 9/2016 | Wengreen et al. |
| 2016/0305598 A1 | 10/2016 | Ranade |
| 2016/0311600 A1 | 10/2016 | Albert et al. |

(56) References Cited

U.S. PATENT DOCUMENTS

| | | | |
|---|---|---|---|
| 2016/0341711 A1 | 11/2016 | Rice et al. |
| 2016/0362240 A1 | 12/2016 | Ferracamo, Jr. |
| 2017/0001406 A1 | 1/2017 | Graf et al. |
| 2017/0001422 A1* | 1/2017 | Bauernfeind .......... B32B 29/08 |
| 2017/0010037 A1 | 1/2017 | Allard et al. |
| 2017/0015488 A1 | 1/2017 | Caps |
| 2017/0072604 A1 | 3/2017 | Sjong |
| 2017/0073146 A1 | 3/2017 | Kuhn et al. |
| 2017/0073147 A1 | 3/2017 | Kuhn |
| 2017/0082344 A1 | 3/2017 | Tansley |
| 2017/0113868 A1 | 4/2017 | Ahmed et al. |
| 2017/0121097 A1 | 5/2017 | Pranadi et al. |
| 2017/0131015 A1 | 5/2017 | Farrar |
| 2017/0146276 A1 | 5/2017 | Newman |
| 2017/0158411 A1 | 6/2017 | Taka et al. |
| 2017/0198959 A1 | 7/2017 | Morris |
| 2017/0225869 A1 | 8/2017 | Ranade |
| 2017/0240337 A1 | 8/2017 | Austerberry et al. |
| 2017/0284723 A1 | 10/2017 | Newman |
| 2017/0305639 A1 | 10/2017 | Kuhn et al. |
| 2018/0036202 A1 | 2/2018 | Wengreen et al. |
| 2018/0086534 A1 | 3/2018 | Kilmer et al. |
| 2018/0093816 A1 | 4/2018 | Longley et al. |
| 2018/0100682 A1 | 4/2018 | Nilsen et al. |
| 2018/0148245 A1 | 5/2018 | Aggarwal et al. |
| 2018/0202700 A1 | 7/2018 | Anstead et al. |
| 2018/0237207 A1 | 8/2018 | Aksan et al. |
| 2018/0282049 A1 | 10/2018 | Tumber et al. |
| 2018/0320947 A1 | 11/2018 | Jain et al. |
| 2018/0328644 A1 | 11/2018 | Rizzo et al. |
| 2019/0210790 A1 | 7/2019 | Rizzo et al. |
| 2019/0219320 A1 | 7/2019 | Wood et al. |
| 2019/0241350 A1 | 8/2019 | Goellner |
| 2019/0248573 A1 | 8/2019 | Collison et al. |
| 2019/0316345 A1 | 10/2019 | Caps et al. |
| 2019/0359407 A1 | 11/2019 | Kale et al. |
| 2020/0002075 A1 | 1/2020 | Lee et al. |
| 2020/0047993 A1 | 2/2020 | Brabbs et al. |
| 2020/0087052 A1 | 3/2020 | Lyons |
| 2020/0122909 A1 | 4/2020 | Jobe |
| 2020/0141531 A1 | 5/2020 | Rell et al. |
| 2020/0156852 A1 | 5/2020 | Veiseh |
| 2020/0231362 A1 | 7/2020 | Kulangara et al. |
| 2020/0307896 A1 | 10/2020 | Pranadi et al. |
| 2020/0324959 A1 | 10/2020 | Longley et al. |
| 2020/0331686 A1 | 10/2020 | Longley et al. |
| 2020/0378544 A1 | 12/2020 | Bock et al. |
| 2020/0408453 A1 | 12/2020 | Martino |
| 2021/0024270 A1 | 1/2021 | Mirzaee Kakhki |
| 2021/0070539 A1 | 3/2021 | Chasteen et al. |
| 2021/0102746 A1 | 4/2021 | Waltermire et al. |
| 2021/0253330 A1 | 8/2021 | Madanagopal et al. |
| 2021/0300665 A1 | 9/2021 | Melchor |
| 2021/0301970 A1 | 9/2021 | Yamashita et al. |
| 2021/0309442 A1 | 10/2021 | Kletzel et al. |
| 2022/0002070 A1 | 1/2022 | Moghaddas |
| 2022/0194682 A1 | 6/2022 | Michel et al. |
| 2022/0267081 A1 | 8/2022 | Conway et al. |
| 2022/0333840 A1 | 10/2022 | Chasteen et al. |
| 2022/0343270 A1 | 10/2022 | Melchor et al. |
| 2022/0388756 A1 | 12/2022 | Birgersen et al. |
| 2023/0064825 A1 | 3/2023 | Conway et al. |
| 2023/0173785 A1 | 6/2023 | Kuhn et al. |
| 2023/0202141 A1 | 6/2023 | Bock et al. |

FOREIGN PATENT DOCUMENTS

| | | | |
|---|---|---|---|
| CN | 201980585 U | 5/2012 |
| CN | 202244410 U | 2/2013 |
| CN | 202831270 U | 3/2013 |
| CN | 202945694 U | 5/2013 |
| CN | 202728724 U | 5/2014 |
| CN | 203601782 U | 5/2014 |
| CN | 103964076 A | 8/2014 |
| CN | 106081351 A | 11/2016 |
| CN | 103672303 B | 1/2017 |
| CN | 207644932 U | 7/2018 |
| CN | 105971183 B | 12/2018 |
| CN | 108943947 B | 12/2018 |
| CN | 209410800 U | 9/2019 |
| CN | 110513569 A | 11/2019 |
| CN | 110549701 A | 12/2019 |
| CN | 109185603 B | 8/2020 |
| CN | 211944580 U | 11/2020 |
| CN | 211951909 U | 11/2020 |
| CN | 114834112 A | 8/2022 |
| CN | 115012544 A | 9/2022 |
| CN | 116061527 A | 5/2023 |
| CN | 116065714 A | 5/2023 |
| CN | 114321570 B | 8/2023 |
| CN | 107804573 B | 11/2023 |
| DE | 1486302 B1 | 9/1970 |
| DE | 10107478 A1 | 9/2002 |
| DE | 10123453 A1 | 11/2002 |
| DE | 10131136 A1 | 1/2003 |
| DE | 10336835 A1 | 3/2005 |
| DE | 202007012289 U1 | 11/2007 |
| DE | 102007059799 A1 | 6/2008 |
| DE | 102008036669 A1 | 2/2010 |
| DE | 102014003413 A1 | 9/2015 |
| DE | 202015004047 U1 | 10/2016 |
| DE | 202017003908 U1 | 9/2017 |
| DE | 102017119920 A1 | 12/2018 |
| DE | 202019001700 U1 | 9/2019 |
| DE | 202022101226 U1 | 4/2022 |
| EP | 1006058 A1 | 6/2000 |
| EP | 1177984 A2 | 2/2002 |
| EP | 1336574 A2 | 8/2003 |
| EP | 1887154 A2 | 2/2008 |
| EP | 2050884 A2 | 4/2009 |
| EP | 1500752 B1 | 10/2010 |
| EP | 1898014 B1 | 1/2013 |
| EP | 2700891 A2 | 2/2014 |
| EP | 2081838 B1 | 8/2014 |
| EP | 2883811 A1 | 6/2015 |
| EP | 3421860 B1 | 6/2020 |
| EP | 3808684 A1 | 4/2021 |
| EP | 4230596 A1 | 8/2023 |
| FR | 2604981 B1 | 6/1989 |
| FR | 2697809 A1 | 5/1994 |
| FR | 2884810 A1 | 10/2006 |
| FR | 2948342 B1 | 9/2011 |
| FR | 2994420 A1 | 2/2014 |
| GB | 2492195 B | 6/2013 |
| GB | 2548887 B | 3/2019 |
| GB | 2566792 A | 3/2019 |
| JP | 06298283 A | 10/1994 |
| JP | 2000211667 A | 8/2000 |
| JP | 2006306422 A | 11/2006 |
| JP | 2007191195 A | 8/2007 |
| JP | 2007253974 A | 10/2007 |
| JP | 2008068871 A | 3/2008 |
| JP | 2009113822 A | 5/2009 |
| JP | 2010089802 A | 4/2010 |
| JP | 2010208644 A | 9/2010 |
| JP | 2013010524 A | 1/2013 |
| JP | 5435435 B2 | 3/2014 |
| KR | 20030060191 A1 | 7/2003 |
| KR | 101457029 B1 | 11/2014 |
| WO | 9747174 A1 | 12/1997 |
| WO | 1997045326 A1 | 12/1997 |
| WO | 9916330 A1 | 4/1999 |
| WO | 9932374 A1 | 7/1999 |
| WO | 0060184 A1 | 10/2000 |
| WO | 0144731 A1 | 6/2001 |
| WO | 2006082433 A1 | 8/2006 |
| WO | 2007030110 A1 | 3/2007 |
| WO | 2008133374 A1 | 11/2008 |
| WO | 2011152610 A1 | 12/2011 |
| WO | 2012017910 A1 | 2/2012 |
| WO | 2013014409 A1 | 1/2013 |
| WO | 2013144621 A2 | 10/2013 |
| WO | 2014007444 A1 | 1/2014 |
| WO | 2014067927 A1 | 5/2014 |

(56) References Cited

FOREIGN PATENT DOCUMENTS

| | | |
|---|---|---|
| WO | 2014118821 A1 | 8/2014 |
| WO | 2014147425 A2 | 9/2014 |
| WO | 2014163274 A1 | 10/2014 |
| WO | 2014183019 A2 | 11/2014 |
| WO | 2015117568 A1 | 8/2015 |
| WO | 2016033077 A1 | 3/2016 |
| WO | 2016120224 A1 | 8/2016 |
| WO | 2016149627 A1 | 9/2016 |
| WO | 2016168523 A1 | 10/2016 |
| WO | 2016208193 A1 | 12/2016 |
| WO | 2017048793 A1 | 3/2017 |
| WO | 2017062692 A1 | 4/2017 |
| WO | 2017072638 A1 | 5/2017 |
| WO | 2017220953 A1 | 12/2017 |
| WO | 2017220954 A1 | 12/2017 |
| WO | 2018075470 A1 | 4/2018 |
| WO | 2018197049 A1 | 11/2018 |
| WO | 2018208986 A1 | 11/2018 |
| WO | 2018213348 A2 | 11/2018 |
| WO | 2019011478 A1 | 1/2019 |
| WO | 2020097477 A1 | 5/2020 |

OTHER PUBLICATIONS

"Collapsible Insulated Shipping Coolers: Reliable & Cost-Efficient"; https://chill-pak.com/collapsible-insulated-shipping-coolers/; accessed Jun. 3, 2023.
"IPC Full Product Selection"; https://ipcpack.com/products/; accessed Jun. 3, 2023.
"TemPak Fabricated Insulated Shipping Containers"; https://www.cryopak.com/cold-chain-packaging/insulated-containers/tempak-fabricated-insulated-shipping-containers/; accessed Jun. 3, 2023.
"Insulated Shippers: TheraPak Compact Insulated Shippers"; https://www.therapak.com/catalog/insulated-shippers/; accessed Jun. 3, 2023.
"SEALED AIR: TEMPGUARD"; https://www.sealedair.com/products/protective-packaging/insulated-box-liners#tempguard-tab; accessed Jun. 3, 2023.
"Sonoco Thermosafe Vacuum Insulated Panel (VIP) Shippers"; https://www.thermosafe.com/products/insulated-shippers/life-sciences-healthcare/vip-shippers/; accessed Jun. 3, 2023.
"Nanopore: Insulated Shipping Containers"; http://www.nanopore.com/shipping.html; accessed Jun. 3, 2023.
"DuraTherm Cold Chain Packaging"; https://www.atlasmoldedproducts.com/packaging/cold-chain; accessed Jun. 3, 2023.
Sales literature for NOMADIC Pre-qualified Shipping System, ISC, Inc., Phoeniz, AZ (2001).
THERMOSAFE Catalog, SCA Packaging North America, Arlington Heights, Illinois (2004).
"The Quantum PLUS+ Systems," https://radmat.com/protherm-quantum/the-quantum-systems/; accessed Feb. 21, 2024.
"Self-Healing Films for Vacuum Insulation Panels" (Mar. 23, 2021), https://www.energy.gov/eere/buildings/articles/self-healing-films-vacuum-insulation-panels; accessed Feb. 21, 2024.
"Demonstration of self-healing barrier films for vacuum insulation panels," Vacuum, 164:132-139 (Jun. 2019), https://www.sciencedirect.com/science/article/abs/pii/S0042207X1832147X?via%3Dihub; accessed Feb. 21, 2024.
"Self-Healing Films to Improve Durability of VIPs by In-Situ Remediation of Film Defects" (May 22, 2019), https://www.energy.gov/eere/buildings/articles/self-healing-films-improve-durability-vips-situ-remediation-film-defects; accessed Feb. 21, 2024.
"Kaushik Biswas: Making self-healing building materials a reality" (Jun. 6, 2018), https://www.ornl.gov/news/kaushik-biswas-making-self-healing-building-materials-reality; accessed Feb. 21, 2024.
Peng et al. "Structure, Mechanism, and Application of Vacuum Insulation Panels in Chinese Buildings," Advances in Building Technologies and Construction Materials 2016 (May 19, 2016), https://www.hindawi.com/journals/amse/2016/1358072/; accessed Feb. 21, 2024.
"Raising inverted roof performance with encapsulated vacuum insulation panels," pbctoday (Aug. 14, 2023), https://www.pbctoday.co.uk/news/energy-news/raising-inverted-roof-performance-with-vips/131169/; accessed Feb. 21, 2024.
"Vacuum Insulation Panels (VIP) Shippers," https://www.thermosafe.com/products/insulated-shippers/life-sciences-healthcare/vip-shippers/; accessed Feb. 21, 2024.
Frattaruolo, "Reducing temperature excursions in cold chain shipping—The business imperative for using phase- change materials (PCM)," (May 18, 2021), https://csafeglobal.com/blog/2021/05/18/reduce-temperature-excursions-using-vip-and-phase-change-material/; accessed Feb. 21, 2024.
Written Opinion dated Jan. 27, 2020, in corresponding PCT Application No. PCT/US19/60494.
"Reusable Passive Thermal Parcel Shippers," Pelican Biothermal®, pelicanbiothermal.com, Nov. 6, 2016. https://web.archive.org/web/20161106221805/http://pelicanbiothermal.com/therma•• packaging/reusable•parce.
"IBOX," So Fri Gam, sofrigam.com, Apr. 2010. https://web.archive.org/web/20170304003303/http://www.sofrigam.com/iBox•col••chain•packaging.
"VIP Series," Panasonic, panasonic•healthcare.com, MD•500 U76VC. PA | MD ••U76VA•PA, Dec. 2, 2016. http://www.panasonic•healthcare.com/us/~/media/biomedical/americas/US/catalogs/Cut%20Sheets/PHCNA_MDF76_product_sheet.pdf.
"V••••Tcon3," VA•••Tec, va•q•tec.com, accessed: May 2017. http://www.v••q•tec.com/en/products•industries/healthcar••logistics/cold•chai••packaging/clinical•trials/v••••tcon.html.
"Vacuum Insulated Panel (VIP) Shippers," Sonoco Thermosafe®, thermosafe.com, oct. 6, 2016. https://web.archive.org/web/20161006061833/http://www.thermosafe.com:80/insulatedshippers.
"Below-zero Complete without Orange bio-bottle," BB: bio-bottle, biobottle.com, Sku: BZOW1, 2018. https://www.bio-bottle.com/shop /below-zero/below-zero-complete-withoutorange-bio-bottle/.
"Cold Chain Logistics Accessories: Cryoport Exclusive Accessories Safepak®," Cryoport, cryoportj.com, 2018. https://www.cryoport.com/servi ces/cold-chain-logistics-accessories.
"Simport Cryostore ™ Storage Boxes," Thomas Scientific, thomassci.com, 2018. https://www.thomassci.com/Laboratory-Supplies/Boxes/_/CRYOSTORE-Storage-Boxes?q=Cryovial%20Storage%20Boxes.
"Packaging Requirements for Dry Ice," Standard Operating Procedure, ehs.umich.edu, Rev.#2, Univ. of Michigan, Jun. 2, 2017. https://ehs.umich.edu/wp-content/uploads/2018/04/Pkg-Req-Dry-Ice.pdf.
"Global Thermal Container with Phase Change Materials," World Courier, https://www.youtube.com/watch?v=Mwabx3W-ado (2017).
https://chill-pak.com/collapsible-insulated-shipping-coolers/ (2020).
https://ipcpack.com/products/green-liner/ (2020).
https://www.cryopak.com/packaging-and-refrigerants/insulated-shipping-containers/vip/ (2016).
https://therapak.com/catalog/insulated-shippers/ (2020).
https://www.sealedair.com/products/protective-packaging/insulated-box-liners (2020).
https://www.thermosafe.com/insulatedshippers (2020).
https://www.achfoam.com/Packaging/DuraTherm-Shipping-Containers/DuraTherm-Shipper-Services.aspx (2020).
http://www.nanopore.com/shipping.html (2008).
Pack-out Sheet for HP-76-ST Shipping System, Cold Chain Technologies, Franklin, MA (2011).
Pack-out Sheet for Excel GTS-6L-RFG Shipping Systems, Cold Chain Technologies, Franklin, MA (2014).
Pack-out Sheet for KoolTemp GTS Extreme 7L Shipping System, Cold Chain Technologies, Franklin, MA (2014).
Pack-out Sheet for KoolTemp GTS Excel 26L Shipping System, Cold Chain Technologies, Franklin, MA (2013).
Pack-out Sheet for KoolTemp GTS Extreme 45L Shipping System, Cold Chain Technologies, Franklin, MA (2014).
U.S. Appl. No. 16/246,435, inventors James Robert Chasteen et al., filed Jan. 11, 2019.
Romeo, Ben, "Upgrading of Traditional Cold Chain Shipping Systems Using 2-8degree C Phase Change Materials," Pharmaceutical OutsourcingTM, pharmoutsourcing.com, Nov. 27, 2017. http://

(56) References Cited

OTHER PUBLICATIONS web.archive.org/web/20171127155311/http://www.pharmoutsourcing.com/Featured-Articles/37644-Upgrading-of-Traditional-Cold-Chain-Shipping-Systems-Using-2-8-C-Phase-Change-Materials/.
"SavENRG Temperature Controlled Container," SavENRG, rgees.com, Dec. 5, 2012. https://web.archive.org/web/20121205011328/http://rgees.com:80/solutions_refrigerated-shipping.php.
"Complete Cold-Chain Design, Implementation and Shipping Services," AeroSafe Global, aerosafeglobal.com, Oct. 16, 2018. https://web.archive.org/web/20181016010215/https://www.aerosafeglobal.com/complete-solution.
"Food Delivery & Supply Chains," Croda, crodatherm.com, Oct. 16, 2018. https://web.archive.org/web/20181016013357/https://www.crodatherm.com/en-gb/products-and-applications/food-and-refrigeration/food-delivery-and-supply-chains.
Singh, Suman, Kirtiraj. K. Gaikwad, and Youn Suk Lee, "Phase change materials for advanced cooling packaging," Environmental Chemistry Letters (2018): 1-15. https://www.researchgate.net/publication/324695298_Phase_change_materials_for_advanced_cooling_packaging.
Pack-out Sheet for KoolTemp HP-75 Shipping System, Cold Chain Technologies, Franklin, MA (2011).
Pack-out Sheet for JOM Small Shipper, Cold Chain Technologies, Franklin, MA (2017).
Pack-out Sheet for Sanofi GTS-3L CRT Shipping System, Cold Chain Technologies, Franklin, MA (2017).
Sales literature for AEON reusable shippers, Softbox Systems Limited, Buckinghamshire, UK (2021).
Sales literature for CHILLTECH shipping system, Sonoco Thermosafe, Arlington Heights, IL (2017).
Laminar Medica Company Presentation, Laminar Medica Limited, Hertfordshire, UK (2016).
ThermoSafe catalog, Sonoco ThermoSafe, Arlington Heights, IL (2014).
Sales literature for va-Q-proof shipping solution, va-Q-tec AG, Wuerzburg, Germany (2020).
Sales literature for CHRONOS ADVANCE shipper, Pelican BioThermal, Maple Grove, MN (2018).
Sales literature for CREDO CUBE shipper, Pelican BioThermal, Maple Grove, MN (2018).
Almac White Paper, "Changing the Dynamics of Temperature Controlled Shipping Solutions," Almac Group, Craigavon, UK (2017).
Ashokan, "A Comparative Study for Cold Chain Packaging Options," Thesis for Master of Science, Rochester Institute of Technology (2011).
Caps et al., "Quality control of vacuum insulation panels: Methods of measuring gas pressure," Vacuum, 82: 691-699 (2008).
2018 photos taken by Applicant of CHILLTECH shipping system with Zero Bench-Time insert (white).
Saf-T-Pak catalog, Saf-T-Pak Inmark, Edmonton, Canada (2017).
Sonoco Thermosafe catalog, Sonoco ThermoSafe, Arlington Heights, IL (2017).
Sales literature for Vype shipping system, Emball'iso Group, Saint Georges de Reneins, France (2018).
U.S. Appl. No. 18/085,136, inventors James Nilsen et al., filed Dec. 20, 2022.
U.S. Appl. No. 18/120,256, inventors William D. Robertson et al., filed Mar. 10, 2023.
U.S. Appl. No. 17/668,569, inventors William C. Blezard et al., filed Feb. 10, 2022.
U.S. Appl. No. 17/668,610 inventors William C. Blezard et al., filed Feb. 10, 2022.
U.S. Appl. No. 17/508,418 inventors William C. Blezard et al., filed Oct. 22, 2021.
U.S. Appl. No. 17/508,447 inventors William C. Blezard et al., filed Oct. 22, 2021.
RuhrTech Cold Chain Product Catalogue, Hangzhou Ruhr New Material Technology Co., Ltd., Zhejiang, China (2023).

\* cited by examiner

SHIPPING SYSTEM FOR STORING AND/OR TRANSPORTING TEMPERATURE-SENSITIVE MATERIALS

CROSS-REFERENCE TO RELATED APPLICATIONS

The present application is a continuation of U.S. patent application Ser. No. 17/842,544, inventors Anthony Rizzo et al., filed Jun. 16, 2022, which, in turn, is a continuation of U.S. patent application Ser. No. 16/184,878, inventors Anthony Rizzo et al., filed Nov. 8, 2018, now U.S. Pat. No. 11,511,928, which, in turn, is a continuation-in-part of U.S. patent application Ser. No. 15/975,600, inventors Anthony Rizzo et al., filed May 9, 2018, now U.S. Pat. No. 11,499,770, which, in turn, claims the benefit under 35 U.S.C. 119(e) of U.S. Provisional Patent Application No. 62/503,802, inventors Anthony Rizzo et al., filed May 9, 2017, the disclosures of all of which are incorporated herein by reference.

BACKGROUND OF THE INVENTION

The present invention relates generally to shipping systems for storing and/or transporting temperature-sensitive materials and relates more particularly to a novel such shipping system.

It is often desirable to store and/or to transport temperature-sensitive materials, examples of such materials including, but not being limited to, pharmaceuticals, biological samples, foods, and beverages. As a result, various types of shipping systems for storing and/or transporting such materials have been devised, some of these shipping systems being parcel-sized shipping systems and some of these shipping systems being pallet-sized shipping systems. Typically, such parcel-sized shipping systems include an insulated container having a cavity for receiving a temperature-sensitive material. Often, the temperature-sensitive material is housed within a product or payload container, the product or payload container (with the temperature-sensitive material disposed therewithin) being placed in the cavity of the insulated container. Such shipping systems often also include a phase-change material disposed within the insulated container for maintaining the temperature-sensitive material within a desired temperature range. In many instances, such as when the desired temperature range for the temperature-sensitive material is below the ambient temperature outside the insulated container, the phase-change material is refrigerated or frozen prior to being placed in the insulated container so that the phase-change material can act as a coolant.

An example of a parcel-sized shipping system of the type described above is illustrated by U.S. Pat. No. 6,868,982, inventor Gordon, which issued, Mar. 22, 2005, and which is incorporated herein by reference. According to this patent, there is disclosed an insulated shipping container and a method of making the same. In a preferred embodiment, the insulated shipping container comprises an outer box, an insulated insert, an inner box, and a closure member. The outer box, which is preferably made of corrugated fiberboard, comprises a rectangular prismatic cavity bounded by a plurality of rectangular side walls, a closed bottom end, and top closure flaps. The insulated insert is snugly, but removably, disposed within the outer box and is shaped to define a rectangular prismatic cavity bounded by a bottom wall and a plurality of rectangular side walls, the insulated insert having an open top end. The insulated insert is made of a foamed polyurethane body to which on all sides, except its bottom, a thin, flexible, unfoamed polymer bag is integrally bonded. The bag is a unitary structure having a generally uniform rectangular shape, the bag being formed by sealing shut one end of a tubular member with a transverse seam and forming longitudinal creases extending from opposite ends of the seam. The inner box, which is snugly, but removably, disposed within the insert, is preferably made of corrugated fiberboard and is shaped to include a rectangular prismatic cavity bounded by a plurality of rectangular side walls and a closed bottom end, the top end thereof being open. The closure member is a thick piece of foam material snugly, but removably, disposed in the open end of the inner box. In use, a temperature sensitive material is placed in the inner box, together with dry ice or some other temperature-stabilizing material.

Another example of a parcel-sized shipping system of the type described above is illustrated by U.S. Pat. No. 9,045,278, inventors Mustafa et al., which issued Jun. 2, 2015, and which is incorporated herein by reference. According to this patent, there is disclosed an insulated shipping container and method of making the same. In a preferred embodiment, the aforementioned shipping container includes an outer box, an insulated insert, an insulated cover, a payload container and a plurality of coolant members. The insulated insert is snugly, but removably, disposed within the outer box and is shaped to include a plurality of sides and a top. The top includes a raised peripheral edge and a recessed shelf. A large rectangular prismatic cavity surrounded by a plurality of smaller cavities extends downwardly from the recessed shelf. The large cavity of the insulated insert is adapted to receive a payload container. Each of the smaller cavities of the insulated insert is adapted to receive a coolant member, the smaller cavities having a "top hat" shape when viewed from above that includes a crown portion and a brim portion.

Other documents of interest may include the following, all of which are incorporated herein by reference: U.S. Pat. No. 5,897,017, inventor Lantz, issued Apr. 27, 1999; U.S. Pat. No. 6,257,764, inventor Lantz, issued Jul. 10, 2001; U.S. Pat. No. 5,924,302, inventor Derifield, issued Jul. 20, 1999; U.S. Pat. No. 6,044,650, inventors Cook et al., issued Apr. 4, 2000; U.S. Pat. No. 5,709,307, inventors Rosado et al., issued Jan. 20, 1998; U.S. Pat. No. 5,450,977, inventor Moe, issued Sep. 19, 1995; U.S. Pat. No. 5,501,338, inventor Preston, issued Mar. 26, 1996; U.S. Pat. No. 6,244,458, inventors Frysinger et al., issued Jun. 12, 2001; U.S. Pat. No. 6,192,703, inventors Salyer et al., issued Feb. 27, 2001; U.S. Pat. No. 7,950,246, inventors Mayer et al., issued May 31, 2011; U.S. Patent Appln. Publication No. US 2005/0224501 A1, inventors Folkert et al., published Oct. 13, 2005; and U.S. Patent Appln. Publication No. US 2003/0102317 A1, inventor Gordon, published Jun. 5, 2003.

SUMMARY OF THE INVENTION

It is an object of the present invention to provide a novel shipping system for storing and/or transporting temperature-sensitive materials.

According to one aspect of the invention, there is provided a shipping system for use in transporting and/or storing temperature-sensitive materials, the shipping system comprising (a) an insulation unit, the insulation unit shaped to include a cavity bounded by a bottom wall, four side walls, and an open top; (b) a liner, the liner being removably mounted on the insulation unit, the liner being shaped to include a cavity, wherein the cavity of the liner extends into the cavity of the insulation unit; (c) a product box, the product box being removably disposed within the cavity of the liner; and (d) at least one temperature-control member, the at least one temperature-control member being removably disposed within the cavity of the liner.

In a more detailed feature of the invention, the insulation unit may comprise a plurality of vacuum insulated panels.

In a more detailed feature of the invention, the plurality of vacuum insulated panels may comprise a bottom vacuum insulated panel and four side vacuum insulated panels, and the four side vacuum insulated panels may be positioned on top of the bottom vacuum insulated panel.

In a more detailed feature of the invention, the insulation unit may have a top edge, and the liner may be shaped to cover the top edge of the insulation unit.

In a more detailed feature of the invention, the insulation unit may have a top edge, the liner may be further shaped to include a bottom wall, a plurality of side walls, and a flange, and the flange may cover all of the top edge of the insulation unit.

In a more detailed feature of the invention, the liner may be further shaped to include an outer extension extending downwardly from the flange.

In a more detailed feature of the invention, the liner may be a one-piece construction made of a rigid material.

In a more detailed feature of the invention, the liner may comprise a thermoformed member.

In a more detailed feature of the invention, the liner may comprise corrugated cardboard.

In a more detailed feature of the invention, the liner may comprise a polymer-coated corrugated cardboard.

In a more detailed feature of the invention, the liner may comprise a corrugated cardboard spray-coated with a polymer coating.

In a more detailed feature of the invention, the liner may comprise at least one of polyester paper, expanded polypropylene, polyethylene terephthalate, and plastic corrugate panels.

In a more detailed feature of the invention, the liner may be a multi-piece construction comprising a corrugated plastic member defining one or more of the side walls and a thermoformed plastic member defining the flange.

In a more detailed feature of the invention, the liner may be impermeable to liquid.

In a more detailed feature of the invention, the liner may be made of a material that may be cleaned with a cleaning solvent.

In a more detailed feature of the invention, the side walls of the liner may comprise an upper portion, a lower portion, and an intermediate portion, the lower portion may be spaced inwardly relative to the upper portion, and the intermediate portion may form a shelf between the upper portion and the lower portion.

In a more detailed feature of the invention, the cavity of the liner may comprise an upper portion and a lower portion, and the upper portion may have a greater footprint than the lower portion.

In a more detailed feature of the invention, the at least one temperature-control member may comprise a plurality of temperature-control members, and one of the plurality of temperature-control members may have at least a portion snugly disposed within the lower portion of the cavity of the liner.

In a more detailed feature of the invention, the at least one temperature-control member may comprise a plurality of temperature-control members, and the plurality of temperature-control members may be positioned snugly on all sides of the product box.

In a more detailed feature of the invention, each of the plurality of temperature-control members may comprise at least one pouch, and a layer of exactly one pouch may be positioned on all sides of the product box.

In a more detailed feature of the invention, each of the plurality of temperature-control members may comprise at least one pouch, and a layer of more than one pouch may be positioned on at least one side of the product box.

In a more detailed feature of the invention, each of the plurality of temperature-control members may comprise at least one pouch, a layer of more than one pouch may be positioned on at least one side of the product box, and a layer of exactly one pouch may be positioned on at least one side of the product box.

In a more detailed feature of the invention, the at least one temperature-control member may comprise a plurality of temperature-control members, each of the temperature-control members may comprise a phase-change material, and the phase-change material of all the temperature-control members may be identical.

In a more detailed feature of the invention, the at least one temperature-control member may comprise a plurality of temperature-control members, each of the temperature-control members may comprise a phase-change material, and some of the phase-change materials of the temperature-control members may be different.

In a more detailed feature of the invention, the at least one temperature-control member may comprise a plurality of temperature-control members, each of the temperature-control members may comprise a plurality of pouches, each pouch may contain a phase-change material, and at least one pouch may contain a different phase-change material than another pouch.

In a more detailed feature of the invention, the at least one temperature-control member may comprise at least one inner temperature-control member and at least one outer temperature-control member, both the at least one inner temperature-control member and the at least one outer temperature-control member may be positioned in the cavity of the liner, the at least one inner temperature-control member may be more proximal to the product box, and the at least one outer temperature-control member may be more distal to the product box.

In a more detailed feature of the invention, the at least one inner temperature-control member may comprise a first type of phase-change material, the at least one outer temperature-control member may comprise a second type of phase-change material, and the first type of phase-change material and the second type of phase-change material may be different. Moreover, the at least one inner temperature-control member and the at least one outer temperature-control member may be preconditioned at different temperatures or at the same temperature.

In a more detailed feature of the invention, the at least one inner temperature-control member and the at least one outer temperature-control member may comprise an identical phase-change material. Moreover, the at least one inner temperature-control member and the at least one outer temperature-control member may be preconditioned at different temperatures or at the same temperature.

In a more detailed feature of the invention, at least one of the at least one inner temperature-control member and at least one of the at least one outer temperature-control member may be mechanically coupled to one another, such as by, but not limited to, the use of a sleeve, shrink-wrapping, hook and loop fasteners, glue, adhesive tape, and the like.

In a more detailed feature of the invention, the at least one temperature-control member may comprise a first temperature-control member, the first temperature-control member may comprise a plurality of pouches, at least some of the pouches of the first temperature-control member may comprise a first type of phase-change material, at least some of the pouches of the first temperature-control member may comprise a second type of phase-change material, and the first and second types of phase-change material may be different.

In a more detailed feature of the invention, the system may further comprise a lid, and the lid may be removably mounted over the insulation unit for closing the cavity of the insulation unit.

In a more detailed feature of the invention, the lid may comprise a vacuum insulated panel.

In a more detailed feature of the invention, the system may further comprise an outer box, and the insulation unit, the liner, the product box and the at least one temperature-control member may be removably mounted within the outer box.

In a more detailed feature of the invention, the outer box may comprise a top closure flap, and the shipping system may further comprise an insulated lid coupled to the top closure flap so that closure of the top closure flap positions the insulated lid over the cavity of the insulation unit.

In a more detailed feature of the invention, the insulated lid may be removably mounted on the top closure flap.

In a more detailed feature of the invention, the system may further comprise a cover, and the cover may be mounted on the insulated lid.

In a more detailed feature of the invention, the insulated lid may be removably mounted on the top closure flap, and the cover may be removably mounted on the insulated lid.

In a more detailed feature of the invention, the system may further comprise an environmental data logger for measuring and storing at least one environmental parameter, and the environmental data logger may be disposed in the outer box outside of the insulation unit.

In a more detailed feature of the invention, the environmental data logger may measure and store ambient temperature data.

In a more detailed feature of the invention, the system may further comprise a temperature indicator, and the temperature indicator may be positioned in contact with the product box and may be configured to provide a real-time indication of whether or not the product box is within a desired temperature range.

In a more detailed feature of the invention, the system may be well-suited for reconditioning and/or reuse.

According to another aspect of the invention, there is provided a kit for assembling a shipping system suitable for use in transporting and/or storing temperature-sensitive materials, the kit comprising (a) an insulation unit, the insulation unit shaped to include a cavity bounded by a bottom wall, four side walls, and an open top; (b) a liner, the liner being removably mounted on the insulation unit, the liner being shaped to include a cavity, wherein the cavity of the liner extends into the cavity of the insulation unit; (c) a product box, the product box being removably disposed within the cavity of the liner, the product box being designed to hold a payload; (d) an insulated lid, the insulated lid covering the cavity of the insulation unit; and (e) a plurality of alternative sets of temperature-control members, each alternative set of temperature-control members being removably disposed within the cavity of the liner and being designed to maintain the payload within a different temperature range.

According to yet another aspect of the invention, there is provided a kit for assembling at least one shipping system suitable for use in transporting and/or storing temperature-sensitive materials, the kit comprising (a) a first shipper, the first shipper comprising (i) a first insulation unit, the first insulation unit shaped to include a cavity bounded by a bottom wall, a plurality of side walls, and an open top, the plurality of side walls collectively defining a top edge, (ii) a first insulated lid, the first insulated lid removably mountable over the first insulation unit to close the cavity of the first insulation unit, (iii) a first liner, the first liner being removably mountable on the first insulation unit, the first liner being shaped to include a cavity and a flange, wherein the cavity of the first liner is dimensioned to extend into the cavity of the first insulation unit and wherein the flange of the first liner is dimensioned to extend over the top edge of the first insulation unit, (iv) a first product box, the first product box being removably positionable within the cavity of the first liner, the first product box being designed to hold a payload; (b) a second shipper, the second shipper comprising (i) a second insulation unit, the second insulation unit shaped to include a cavity bounded by a bottom wall, a plurality of side walls, and an open top, the plurality of side walls collectively defining a top edge, (ii) a second insulated lid, the second insulated lid removably mountable over the second insulation unit to close the cavity of the second insulation unit, (iii) a second liner, the second liner being removably mountable on the second insulation unit, the second liner being shaped to include a cavity and a flange, wherein the cavity of the second liner is dimensioned to extend into the cavity of the second insulation unit and wherein the flange of the second liner is dimensioned to extend over the top edge of the second insulation unit, (iv) a second product box, the second product box being removably positionable within the cavity of the second liner, the second product box being designed to hold a payload, wherein the second product box is dimensioned to hold a differently-sized payload than the first product box; and (c) a set of temperature-control members, the set of temperature-control members being dimensioned for alternative deployment in the cavity of the first liner, snugly fitting around the first product box, or the cavity of the second liner, snugly fitting around the second product box.

According to a further aspect of the invention, there is provided a method, the method comprising (a) providing a shipping system for use in transporting and/or storing temperature-sensitive materials, the shipping system comprising (i) an insulation unit, the insulation unit shaped to include a cavity bounded by a bottom wall, four side walls, and an open top; (ii) a liner, the liner being removably mounted on the insulation unit, the liner being shaped to include a cavity, wherein the cavity of the liner extends into the cavity of the insulation unit; (iii) a product box, the product box being removably disposed within the cavity of the liner; and (iv) at least one temperature-control member, the at least one temperature-control member being removably disposed within the cavity of the liner; (b) using the shipping system to transport a first payload; (c) then, cleaning or replacing the liner; and (d) then, using the shipping system to transport a second payload.

According to a further aspect of the invention, there is provided a shipping system for use in transporting and/or storing temperature-sensitive materials, the shipping system comprising (a) an insulation unit, the insulation unit shaped to include a cavity bounded by a bottom wall, four side walls, and an open top, the insulation unit comprising an assembly of vacuum insulated panels encapsulated within a spray-coating of a polyurea; (b) a product box, the product box being removably disposed within the cavity of the insulation unit; and (c) at least one temperature-control member, the at least one temperature-control member being removably disposed within the cavity of the insulation unit.

According to a further aspect of the invention, there is provided a shipping system for use in transporting and/or storing temperature-sensitive materials, the shipping system comprising (a) an insulation unit, the insulation unit shaped to include a cavity bounded by a bottom wall, four side walls, and an open top, the insulation unit consisting of an assembly of vacuum insulated panels held together with a spray-coating of a polyurea; (b) a product box, the product box being removably disposed within the cavity of the insulation unit; and (c) at least one temperature-control member, the at least one temperature-control member being removably disposed within the cavity of the insulation unit.

For purposes of the present specification and claims, various relational terms like "top," "bottom," "proximal," "distal," "upper," "lower," "front," and "rear" may be used to describe the present invention when said invention is positioned in or viewed from a given orientation. It is to be understood that, by altering the orientation of the invention, certain relational terms may need to be adjusted accordingly.

Additional objects, as well as aspects, features and advantages, of the present invention will be set forth in part in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. These drawings are not necessarily drawn to scale, and certain components may have undersized and/or oversized dimensions for purposes of explication. In the drawings wherein like reference numerals represent like parts.

DETAILED DESCRIPTION OF THE INVENTION

Figure 1:
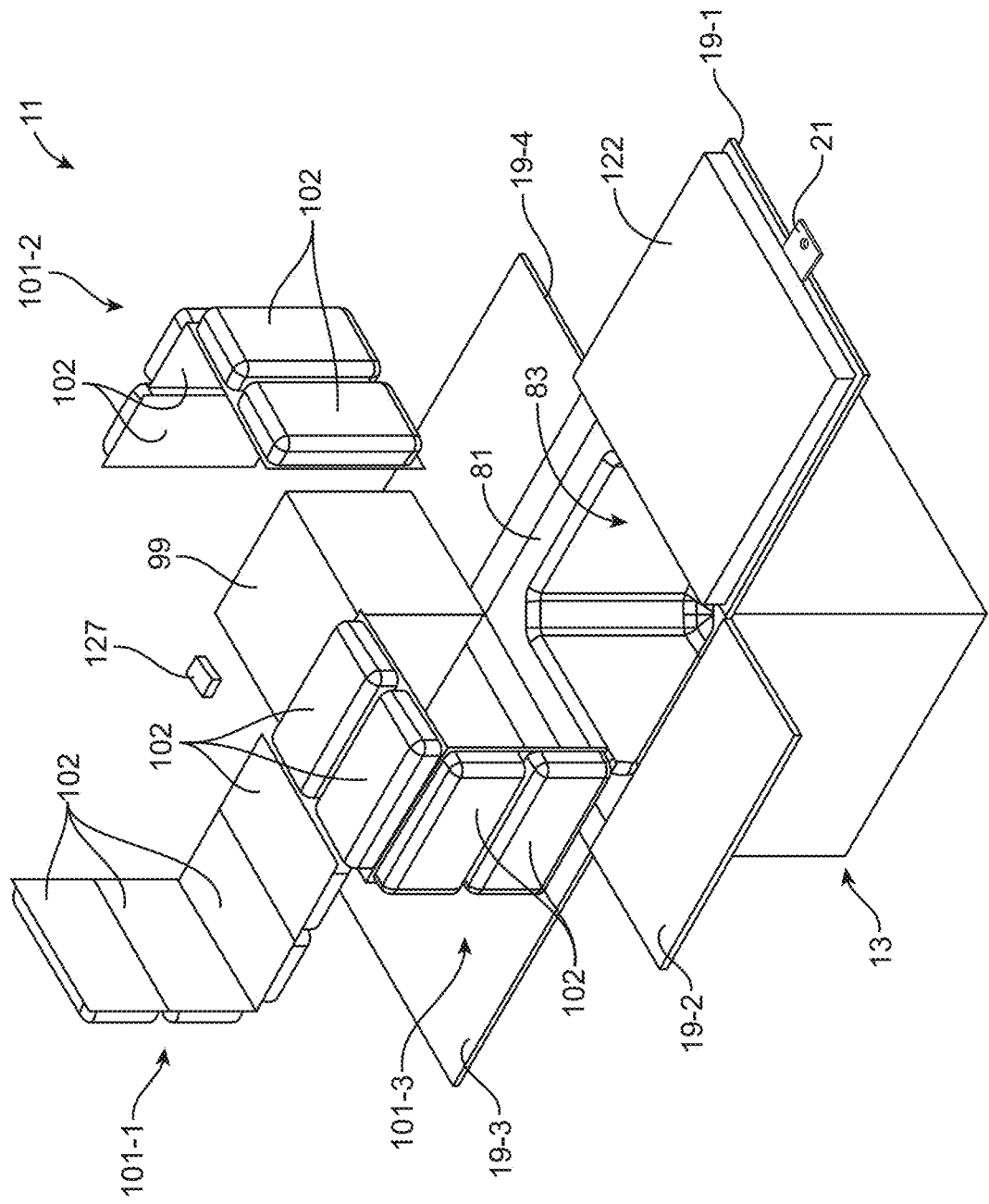
FIG. 1 is a partly exploded perspective view of a first embodiment of a shipping system suitable for use in storing and/or transporting temperature-sensitive materials, the shipping system being constructed according to the teachings of the present invention.
Figure 2:
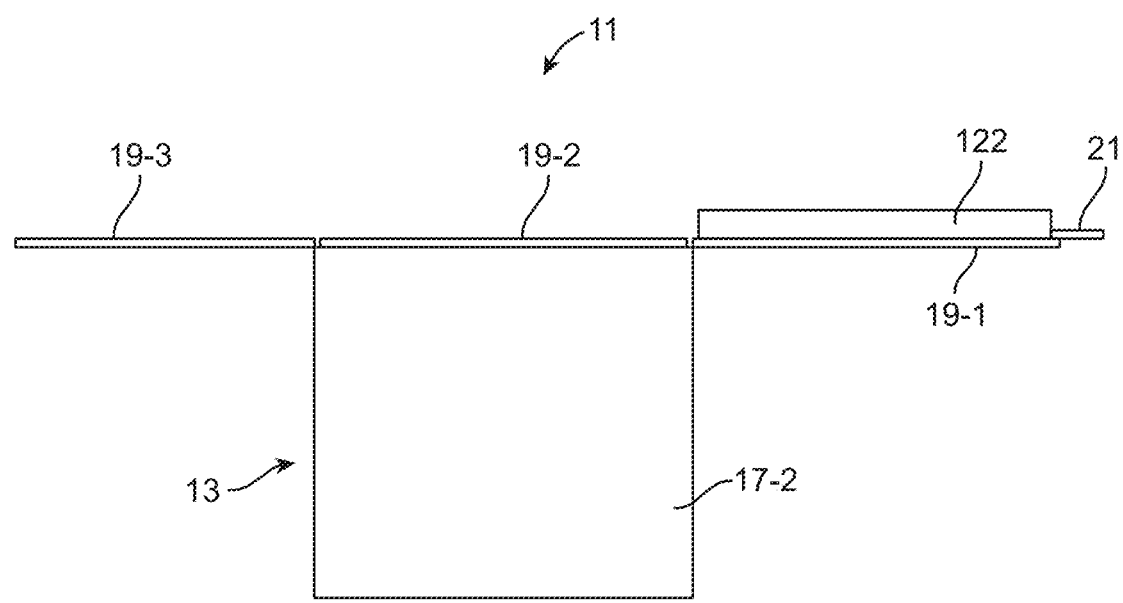
FIG. 2 is a side view of the shipping system shown in FIG. 1, with the top flaps of the outer container being shown in an open state.
Figure 3:
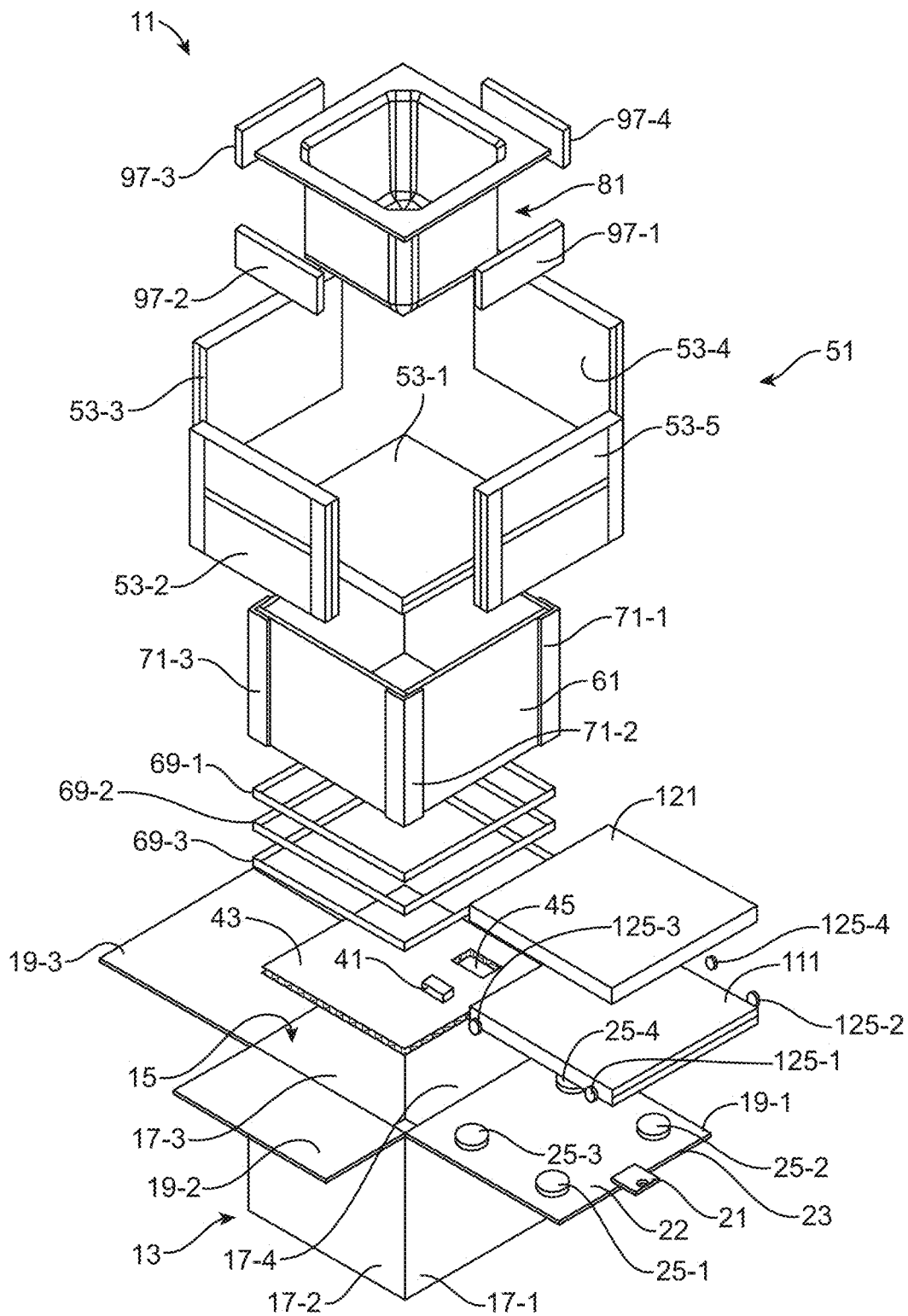
FIG. 3 is a partly exploded perspective view of the shipping system shown in FIG. 1, with the payload container, the temperature indicator, and the temperature-control members not being shown.

Referring now to FIGS. 1 through 3, there are shown various views of a first embodiment of a shipping system suitable for use in storing and/or transporting temperature-sensitive materials, the shipping system being constructed according to the present invention and being represented generally by reference numeral 11. For clarity and/or ease of illustration, certain details of shipping system 11 that are discussed elsewhere in this application or that are not critical to an understanding of the invention may be omitted from one or more of FIGS. 1 through 3 or may be shown therein in a simplified manner.

System 11 may be used to maintain a payload within a desired temperature range for an extended period of time. Solely for illustrative purposes and not to be limited thereto, system 11 may be configured to maintain a parcel-sized payload within a temperature range of +2° C. to +8° C. for a period of up to 96 hours or longer or, alternatively, may be configured to maintain a parcel-sized payload within a temperature range of +15° C. to +25° C. for a period of up to 96 hours or longer or, alternatively, may be configured to maintain a parcel-sized payload within a temperature range of −15° C. to −25° C. for a period of up to 96 hours or longer.

System 11 may comprise an outer box 13. Outer box 13, which may be, for example, a conventional corrugated cardboard box or carton, may comprise a rectangular prismatic cavity 15 bounded by a plurality of rectangular side walls 17-1 through 17-4, a plurality of bottom closure flaps (not shown), and a plurality of top closure flaps 19-1 through 19-4. Adhesive strips of tape or other closure means (not shown) may be used to retain, in a closed condition, the bottom closure flaps and top closure flaps 19-1 through 19-4.

A tab 21 may be secured, for example, by adhesive or similar means, to an interior face 22 of top closure flap 19-1, and tab 21 may be situated on interior face 22 so as to extend across a free edge 23 of top closure flap 19-1. In this manner, a user may swing open top closure flap 19-1 from a closed state by pulling generally upwardly on tab 21. Tab 21 may be made of a sheet of polymeric material, such as a polyvinyl chloride or similar material. Instead of being secured to closure flap 19-1, tab 21 may be secured to an insulated lid assembly mounted on closure flap 19-1.

A plurality of fasteners 25-1 through 25-4 may be secured, for example, by an adhesive or similar means to interior face 22 of top closure flap 19-1. As will be discussed further below, fasteners 25-1 through 25-4 may be used to removably couple a vacuum insulated panel (VIP) to top closure flap 19-1. In the present embodiment, fasteners 25-1 through 25-4 may be hook (or loop) fasteners, with complementary loop (or hook) fasteners being secured, for example, by adhesive or similar means to the vacuum insulated panel; however, it is to be understood that other types of fasteners, such as adhesive fasteners applied to one or both of the vacuum insulated panel and top closure flap 19-1, may also be used. Also, although four fasteners 25-1 through 25-4 are shown in the present embodiment, it is to be understood that a greater number or lesser number of fasteners 25-1 through 25-4 may be used without departing from the present invention.

Figure 4:
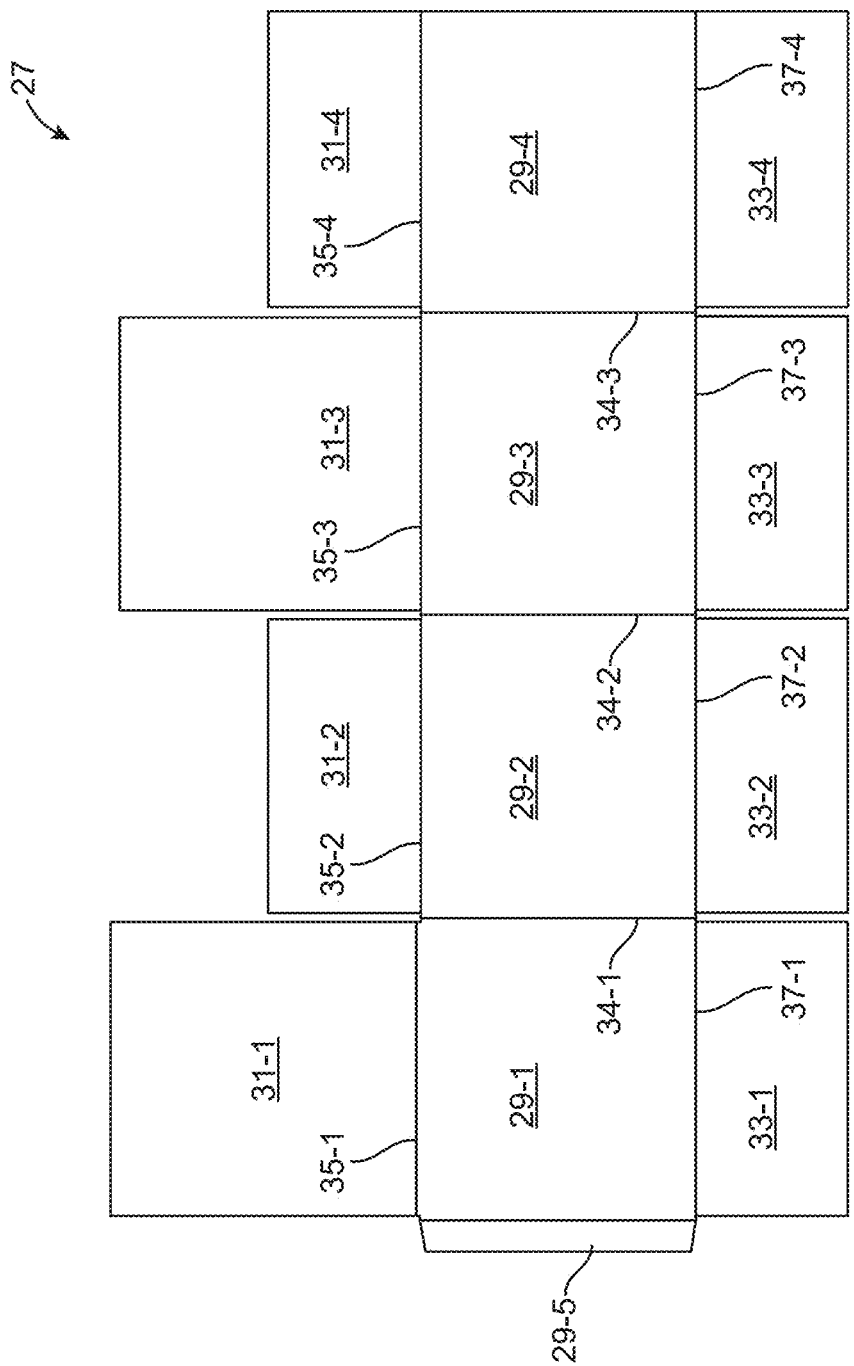
FIG. 4 is a top view of a blank used to make the outer box shown in FIG. 1.

Referring now to FIG. 4, there is shown a blank 27, which may be used to form outer box 13. Blank 27, which may be a unitary structure made of corrugated cardboard or a similar material, may be cut and scored to define a plurality of central panels 29-1 through 29-5, a plurality of top panels 31-1 through 31-4, and a plurality of bottom panels 33-1 through 33-4. Central panels 29-1 through 29-4 may be folded about lines 34-1 to 34-3 to become side walls 17-1 through 17-4 of outer box 13, and central panel 29-5 may be used to secure central panel 29-1 to central panel 29-4 using an adhesive (not shown) or the like. Top panels 31-1 through 31-4 may be folded about lines 35-1 through 35-4, respectively, to become top flaps 19-1 through 19-4, respectively, of outer box 13. Bottom panels 33-1 through 33-4 may be folded about lines 37-1 through 37-4, respectively, to become the bottom flaps of outer box 13.

Referring back now to FIG. 3, system 11 may also comprise an environmental data logger 41. Environmental data logger 41 may be, for example, a conventional temperature data logger that may be configured to measure and to store the ambient external temperature to which system 11 is exposed over an extended period of time. Additionally or alternatively, environmental data logger 41 may be configured to measure or to detect and, optionally, to store one or more of shock/movement, global position, moisture/humidity, or some other environmental parameter.

Figure 5:
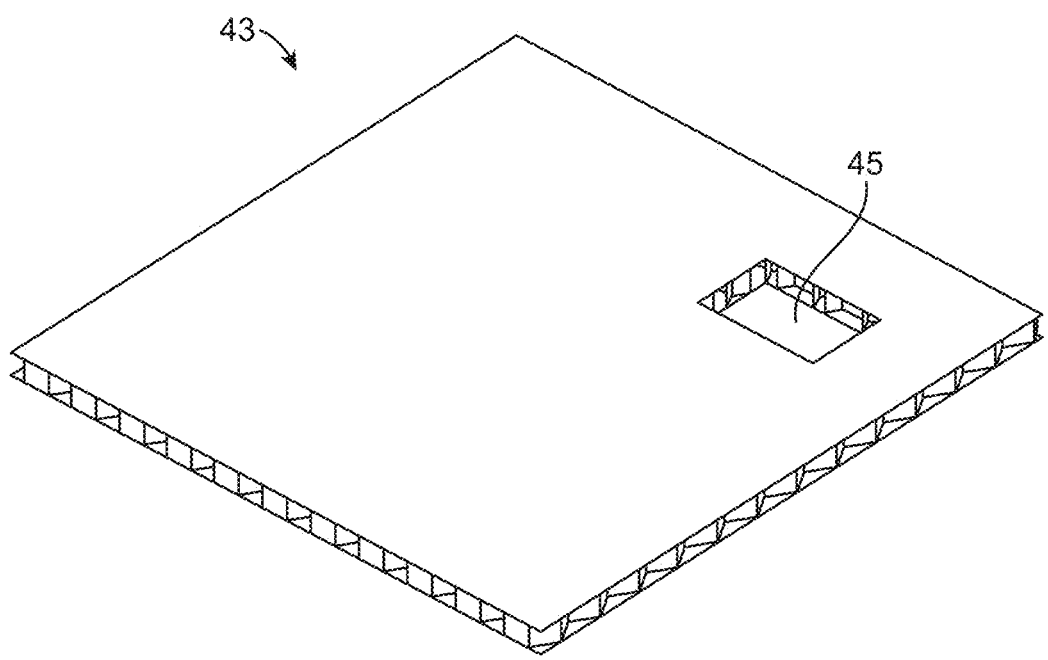
FIG. 5 is an enlarged perspective view of the data logger board shown in FIG. 3.

System 11 may additionally comprise a board 43, which is also shown separately in FIG. 5. Board 43, which may be, for example, a piece of honeycomb corrugated cardboard, may be shaped to include a transverse opening 45. Opening 45 may be appropriately dimensioned to receive data logger 41. In particular, opening 45 may be dimensioned to have a length and a width to snugly receive data logger 41. Preferably, board 43 has a thickness that is approximately equal to or slightly greater than that of data logger 41. Accordingly, in the present embodiment, data logger 41 may have a thickness of approximately 0.4 inch, and board 43 may have a thickness of approximately 0.5 inch. In addition, board 43 preferably has a length and a width that are slightly less than those of prismatic cavity 15 of outer box 13 to enable board 43 to be placed horizontally within prismatic cavity 15 of outer box 13.

Although not shown in the present embodiment, system 11 may also include a foam pad, which may be made of a polyurethane or the like, positioned between board 43 and the bottom closure flaps of outer box 13. Such a foam pad may serve to keep the components that are contained within outer box 13 from jostling up and down, despite tolerances, and may also provide some shock absorption to protect the contents disposed within outer box 13.

Figure 6:
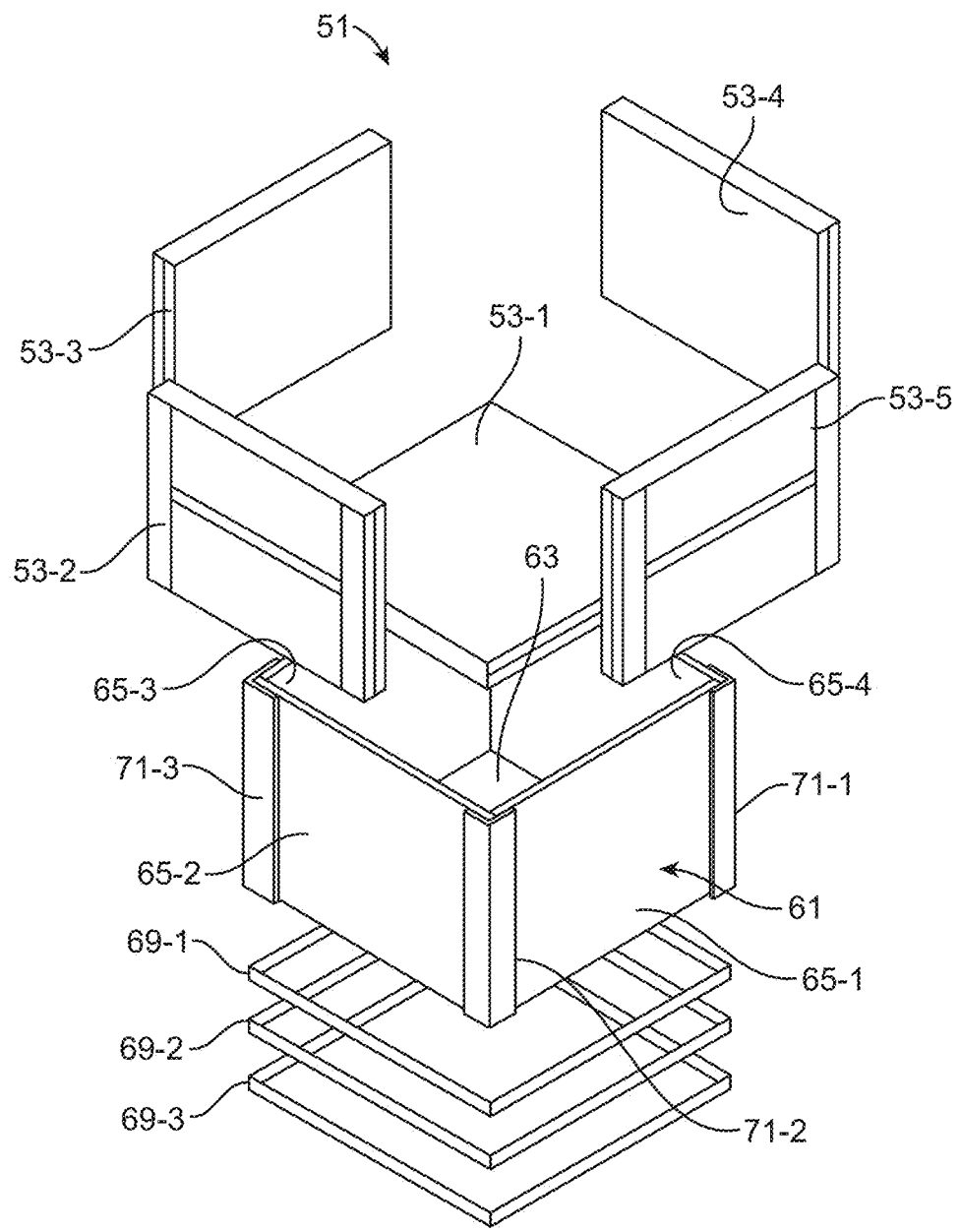
FIG. 6 is a partly exploded perspective view of the insulation unit shown in FIG. 3.
Figure 7:
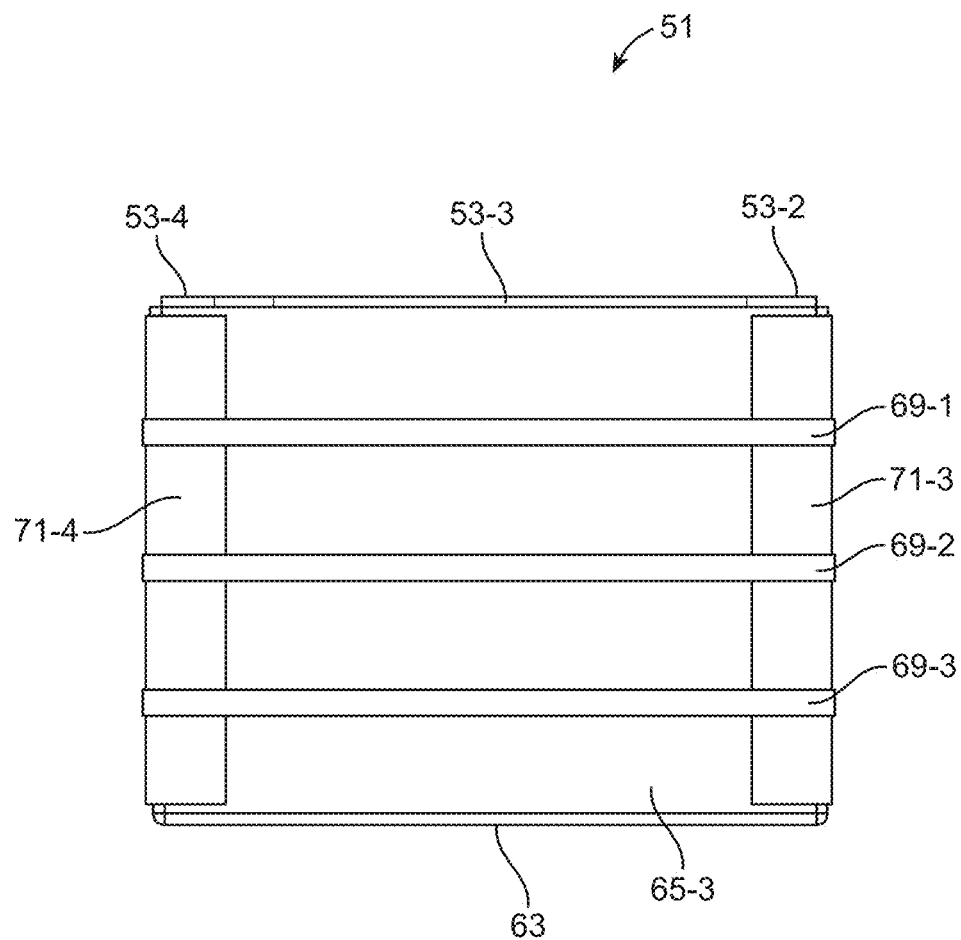
FIG. 7 is a rear view, showing the insulation unit of FIG. 6 in an assembled state.

System 11 may further comprise an insulation unit 51. Insulation unit 51, which is also shown separately in FIGS. 6 and 7, may comprise a plurality of vacuum insulated panels 53-1 through 53-5, which may be identical to one another. Vacuum insulated panels 53-1 through 53-5, which may be conventional vacuum insulated panels, may be arranged with vacuum insulated panels 53-2 through 53-5 positioned perpendicularly relative to and sitting directly on top of vacuum insulated panel 53-1 so as to define a generally prismatic cavity bounded by a bottom wall and four side walls. The four side walls may be positioned relative to one another in a "pinwheel"-type arrangement, wherein one end of each vacuum insulated panel abuts the inside major surface of its adjacent vacuum insulated panel. Alternatively, the four side walls may be positioned relative to one another so that one end of each of two parallel vacuum insulated panels abuts the inside major surface of each of the two remaining parallel vacuum insulated panels.

Figure 8:
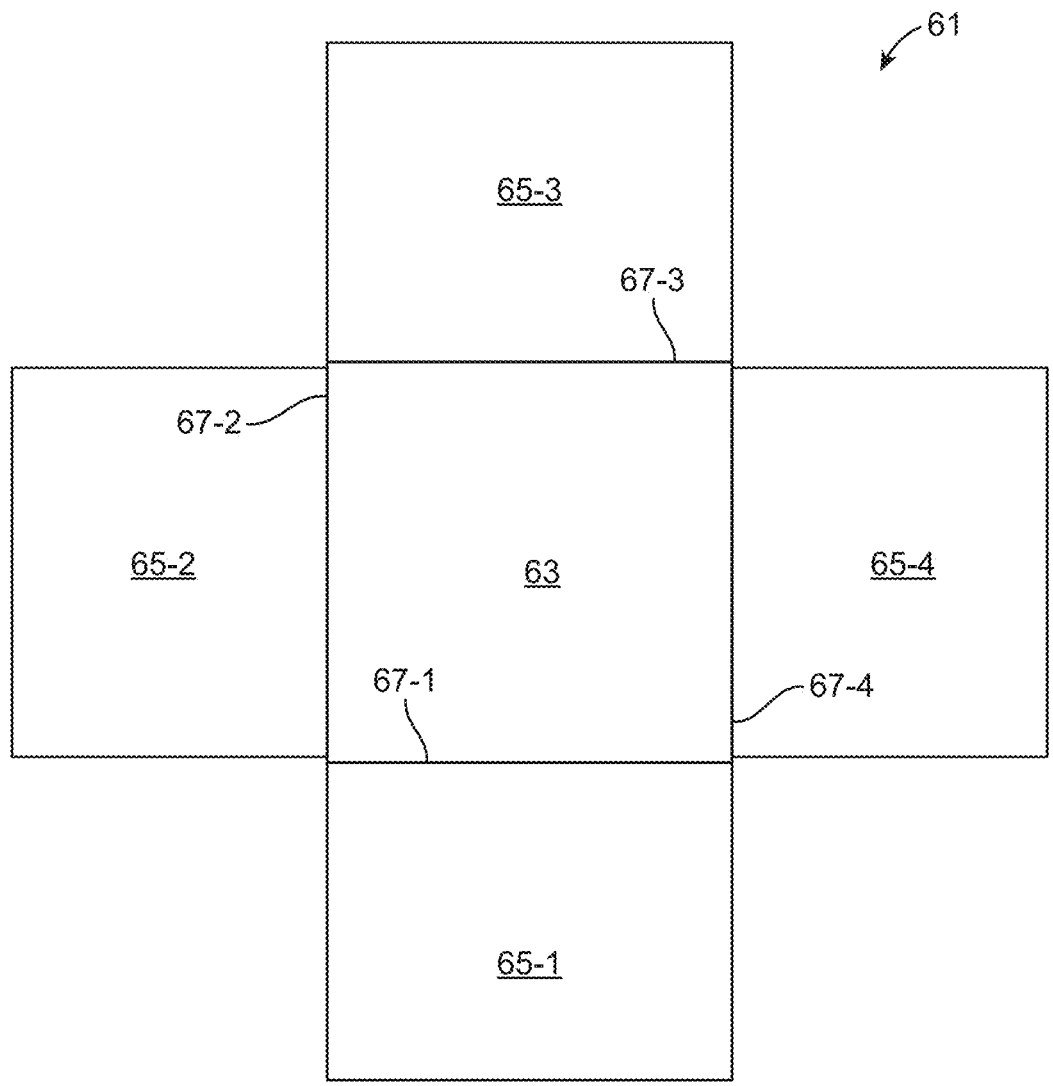
FIG. 8 is an enlarged top view of the support shown in FIG. 3, the support being shown in an unfolded state.

Insulation unit 51 may additionally comprise a support 61, which is also shown separately in FIG. 8 in an unfolded state. Support 61, which may be made of corrugated cardboard or the like, may be a unitary box-like structure configured to include a central portion 63 and four side portions 65-1 through 65-4. Central portion 63 may be rectangular, and each of four side portions 65-1 through 65-4 may extend from a different one of the four sides of the central portion 63. Support 61 may be folded along edges 67-1 through 67-4 and may be appropriately dimensioned so that the central portion 63 of support 61 may be positioned under vacuum insulated panel 53-1 and so that side portions 65-1 through 65-4 of support 61 may be positioned along the outside faces of vacuum insulated panels 53-2 through 53-5, as well as along the peripheral edges of vacuum insulated panel 53-1. As will be discussed further below, support 61 may be used, in conjunction with other structural members, to help keep vacuum insulation panels 53-1 through 53-5 assembled together. In addition, support 61 may also provide some additional thermal insulation to insulation unit 51.

Insulation unit 51 may further comprise a plurality of plastic binding straps 69-1 through 69-3. Straps 69-1 through 69-3, which may be conventional binding straps, may be wrapped around the four sides of support 61 and may be used to help retain vacuum insulated panels 53-1 through 53-5 in an assembled state.

Figure 9A:
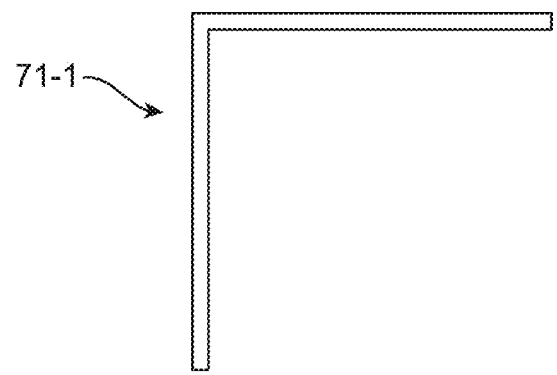
FIGS. 9(a) and 9(b) are enlarged side and enlarged perspective views, respectively, of one of the corner boards shown in FIG. 3.
Figure 9B:
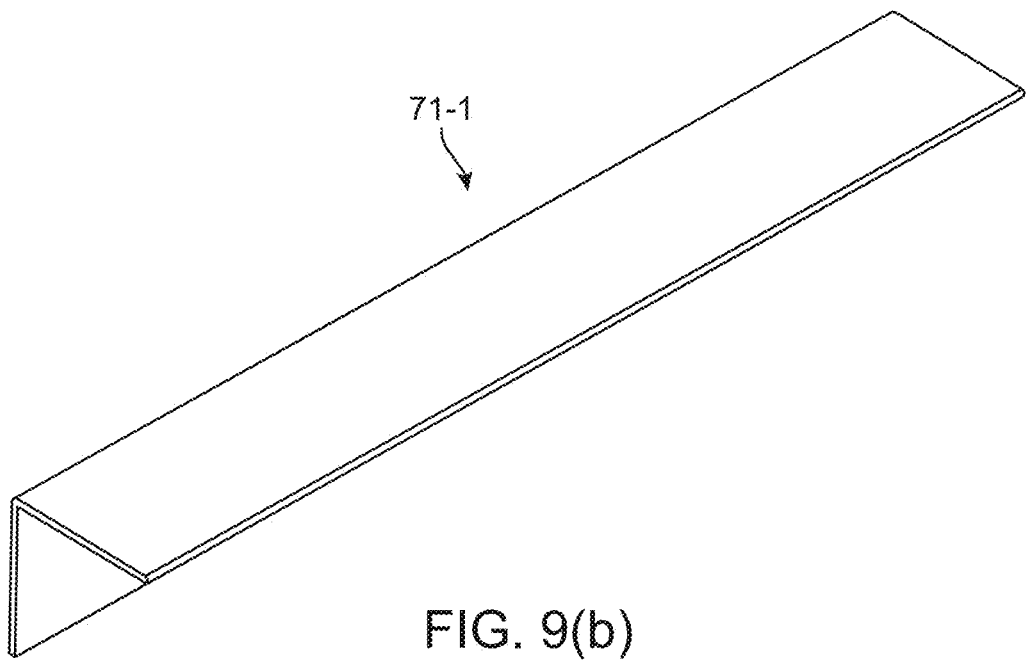
Figure 10A:
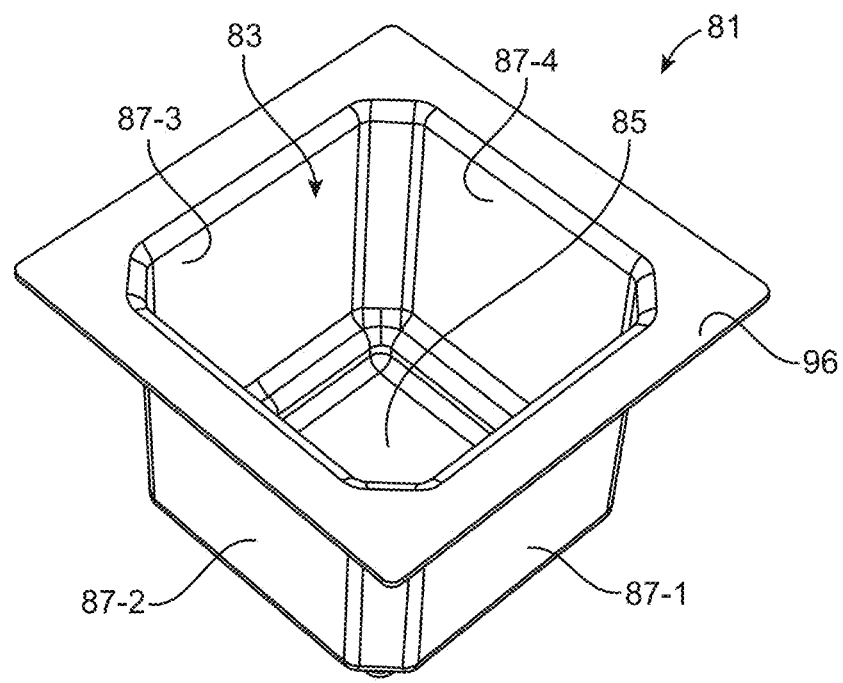
FIGS. 10(a) and 10(b) are perspective and top views, respectively, of the liner shown in FIG. 1.
Figure 10B:
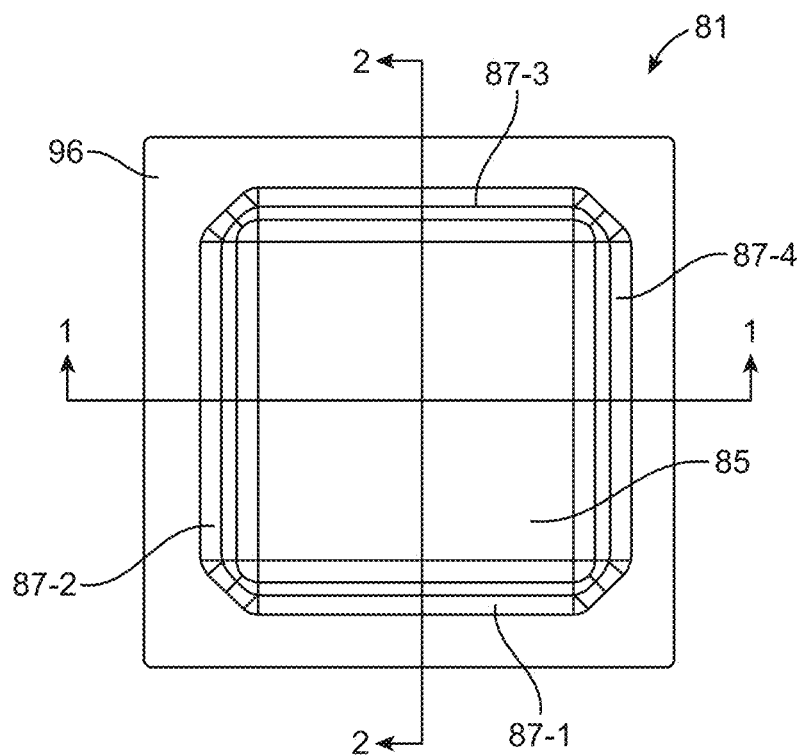
Figure 10C:
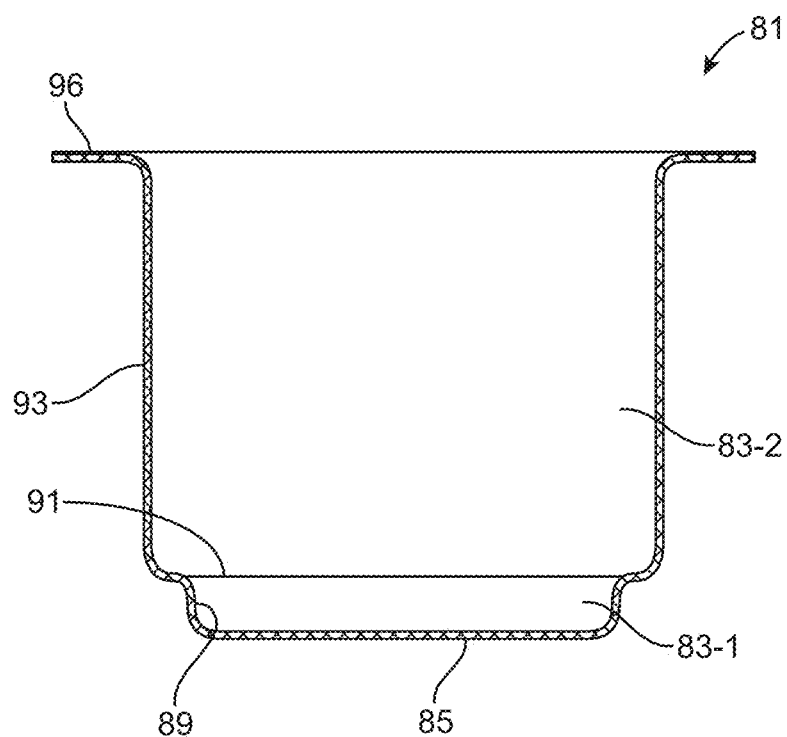
FIGS. 10(c) and 10(d) are section views taken along lines 1-1 and 2-2, respectively, of FIG. 10(b)
Figure 10D:
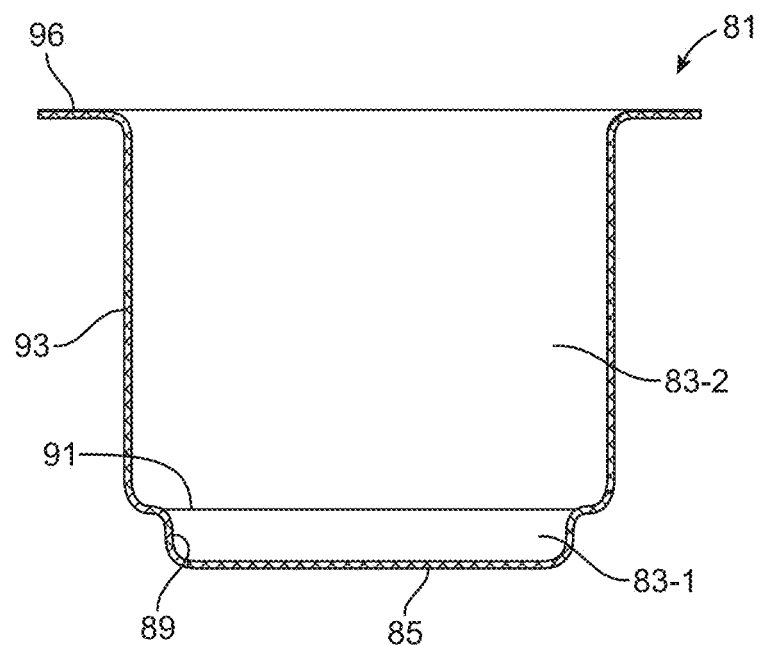

Insulation unit 51 may further comprise a plurality of corner boards 71-1 through 71-4. Corner boards 71-1 through 71-4 may be identical to one another (corner board 71-1 being shown separately in FIGS. 9(*a*) and 9(*b*)). Corner boards 71-1 through 71-4 may be made of Kraft paper and may have a thickness, for example, of 0.06 to 0.08 inch. Corner boards 71-1 through 71-4 may be positioned vertically at the four exterior corners of support 61 and may help to increase the thermal life of insulation unit 51 by keeping panels 53-1 through 53-5 together and tighter for a longer period of time and by protecting support 61 and panels 53-1 through 53-5 from physical damage that may be caused by straps 69-1 through 69-3, particularly at the four corners of insulation unit 51. Corner boards 71-1 through 71-4 also may help to increase the length of time that straps 69-1 through 69-3 are able to hold a minimal required tension in a reuse application.

Insulation unit 51 may be assembled as follows: First, support 61 may be folded and then placed in a fixture (not shown), whereby side portions 65-1 through 65-4 may be maintained in a generally perpendicular orientation relative to central portion 63. Next, panel 53-1 may be positioned with its bottom major surface flush on top of central portion 63. Next, panels 53-2 through 53-5 may be positioned on top of panel 53-1 in a "pinwheel" arrangement. (Preferably, the seams of panels 53-1 through 53-5 face outwardly towards support 61.) Next, corner boards 71-1 through 71-4 may be placed around the exterior four corners of the support 61. Next, straps 69-1 through 69-3 may be wrapped around support 61 and corner boards 71-1 through 71-4. (Preferably, each of straps 69-1 through 69-3 provides a tension of at least 10 psi.) The resulting structure is a five-sided unit defining a cavity bounded by a bottom and four sides and having an open top. As can be appreciated, in the absence of the combination of support 61, straps 69-1 through 69-3, and corner boards 71-1 through 71-4, there is nothing keeping panels 53-1 through 53-5 in an assembled state.

Referring back now to FIGS. 1 and 3, system 11 may further comprise a protective liner (or shell or insert) 81, which is also shown separately in FIGS. 10(*a*) through 10(*d*). Liner 81, which is appropriately dimensioned to be removably mounted on insulation unit 51, may be a rigid structure, either one-piece or multi-piece, comprising or consisting of materials, such as a thermoformed plastic (e.g., high density polyethylene having a thickness of approximately 0.1 inch), a corrugated cardboard or plastic, polyester paper, expanded polypropylene (EPP), polyethylene terephthalate (PET), plastic corrugate panels, or some combination thereof. Moreover, as will be discussed further below, liner 81 may comprise or consist of a polymer-coated corrugated cardboard, such as a polyurea-coated corrugated cardboard or a polyurethane-coated corrugated cardboard. In the present embodiment, liner 81 may be a one-piece thermoformed member shaped to include a cavity 83 bounded by a bottom wall 85 and four side walls 87-1 through 87-4. Each of side walls 87-1 through 87-4 may include a lower portion 89, an intermediate portion 91, and an upper portion 93. Lower portion 89 and upper portion 93 may extend generally vertically (although there may be a draft angle where liner 81 is made by thermoforming), with lower portion 89 being spaced inwardly relative to upper portion 93 and with intermediate portion 91 extending generally horizontally. In this manner, cavity 83 may be regarded as having a lower portion 83-1 of relatively smaller footprint and an upper portion 83-2 of relatively larger footprint 83-2, with intermediate portion 91 forming a shelf at the bottom of upper portion 83-2. Liner 81 is preferably dimensioned so that bottom wall 85 and side walls 87-1 through 87-4 may be inserted into the cavity of insulation unit 51, with bottom wall 85 being positioned over the top of vacuum insulated panel 53-1 and with side walls 87-1 through 87-4 being positioned along the inner faces of vacuum insulated panels 53-2 through 53-5. A flange 96 may extend peripherally outwardly from the open top of liner 81 and may be dimensioned to sit on top of and to cover the tops of vacuum insulated panels 53-2 through 53-5. In this manner, liner 81 may cover the exposed inner and top faces of vacuum insulated panels 53-2 through 53-5. Liner 81 may be dimensioned so that bottom wall 85 of liner 81 is spaced from the bottom vacuum insulated panel 53-1, for example, by approximately ⅛-¼ inch, whereby an air gap is provided between the bottom of liner 81 and panel 53-1. This may be done to allow for tolerances of liner 81.

System 11 may further comprise a plurality of foam pads 97-1 through 97-4. Pads 97-1 through 97-4, which may be identical to one another, may be made of an open cell urethane or similar material. Pads 97-1 through 97-4 may be fixedly mounted, for example, with an adhesive (not shown), on the outside surfaces of side walls 87-1 through 87-4, respectively, of liner 81, preferably on upper portion 93 of side walls 87-1 through 87-4. Pads 97-1 through 97-4 may serve to keep liner 81 from moving laterally relative to the remainder of insulation unit 51. In this manner, damage to outer box 13 by flange 96 may be reduced. Pads 97-1 through 97-4 may also provide some nominal thermal insulation.

System 11 may further comprise a product box 99, in which the temperature-sensitive materials (not shown) may be disposed. Product box 99, which may be a conventional corrugated cardboard box, may be appropriately dimensioned to be received within cavity 83 of liner 81. In the present embodiment, product box 99 may be dimensioned to hold a payload volume of approximately 6 L.

System 11 may further comprise a plurality of temperature-control members 101-1 through 101-3. Temperature-control member 101-1 through 101-3, which may be identical to one another, may be appropriately dimensioned to be received, along with product box 99, within cavity 83 of liner 81. Materials suitable for use as temperature-control members 101-1 through 101-3 are exemplified by, but are not limited to, conventional ice packs, conventional gel packs, or refrigerant packs of the type disclosed in U.S. Pat. No. 9,598,622 B2, inventors Formato et al., issued Mar. 21, 2017, and U.S. Patent Application Publication No. US 2018/0093816 A1, inventors Longley et al., published Apr. 5, 2018, both of which are incorporated herein by reference.

According to one embodiment, temperature-control members 101-1 through 101-3 may be in the form of flexible mats having a plurality of discrete sealed pouches, each pouch containing a quantity of a phase-change material (PCM). The phase-change material may be any phase-change material including any water-based or organic phase-change material. For example, if the phase-change material is water-based, the phase-change material may be water, a mixture of water and a thickener (e.g., a polysaccharide thickener) to produce a gelled water mixture, or a water/salt solution with an optional thickener.

Alternatively, if the phase-change material is an organic phase-change material, the phase-change material may be a gelled organic phase-change material, such as is disclosed in U.S. Pat. No. 9,598,622 B2 and U.S. Patent Application Publication No. US 2018/0093816 A1. More specifically, a suitable gelled organic phase-change material may comprise one or more n-alkanes, such as n-tetradecane (C14), n-pentadecane (C15), n-hexadecane (C16), n-heptadecane (C17), n-octadecane (C18), or combinations thereof, together with a gelling agent in the form of a styrene-ethylene-butylene-styrene triblock copolymer and/or a styrene-ethylene-propylene-styrene triblock copolymer. Solely for purposes of illustration, where, for example, system 11 is designed to keep a payload within a temperature range of +2° C. to +8° C., the gelled phase-change material may comprise a mixture of n-tetradecane (C14) and KRATON™ G1654 styrene-ethylene-butylene-styrene (SEBS) tri-block copolymer. Alternatively, where, for example, system 11 is designed to keep a payload within a temperature range of +15° C. to +25° C., the gelled phase-change material may comprise a mixture of n-hexadecane (C16) and KRATON™ G1654 styrene-ethylene-butylene-styrene (SEBS) tri-block copolymer. Each pouch of temperature-control members 101-1 through 101-3 may contain suitable masses of the phase-change material and the gelling agent for the particular application to which system 11 is put. For example, for the particular applications described above, each pouch may contain approximately 150-200 g of the n-alkane(s) and approximately 12-18 g of the gelling agent.

In the present embodiment, there are three temperature-control members 101-1 through 101-3, and each of temperature-control members 101-1 through 101-3 has four generally rectangular, trough-shaped pouches 102; however, it is to be understood that the number of temperature-control members 101-1 through 101-3 and the number and shape of pouches 102 in temperature-control members 101-1 through 101-3 are merely illustrative. Consequently, the number of temperature-control members 101, as well as the number and shape of pouches 102 therein, may be varied while still coming within the scope of the present invention. Moreover, while, in the present embodiment, each pouch 102 of temperature-control members 101-1 through 101-3 contains the same quantity and type of phase-change material, this need not be so as some of temperature-control members 101-1 through 101-3 may contain different phase-change materials than others of temperature-control members 101-1 through 101-3 and/or different pouches of the same temperature-control member may contain different types of phase-change materials.

Temperature-control members 101-1 through 101-3 and product box 99 may be appropriately dimensioned and arranged within liner 81 as follows: First, temperature-control member 101-1 may be arranged within liner 81 so that two of its four pouches are positioned within lower portion 83-1 of cavity 83 and so that two of its four pouches are positioned in upper portion 83-2 of cavity 83 on top of intermediate portion 91 and along side wall 87-3 of liner 81. The two pouches sitting within lower portion 83-1 of cavity 83 may be dimensioned to fit snugly therewithin. Product box 99 may then be positioned on top of the two pouches of temperature-control member 101-1 positioned within lower portion 83-1 of cavity, with the bottom of product box 99 substantially aligned with the bottom of upper portion 83-2 of cavity 83. Temperature-control member 101-2 may then be positioned between liner 81 and product box 99 so that two of its four pouches are positioned on top of intermediate portion 91 of side wall 87-1 and so that two of its four pouches are positioned on top of intermediate portion 91 of side wall 87-4. Temperature-control member 101-3 may then be positioned within liner 81 so that two of its four pouches are positioned on top of intermediate portion of side wall 87-2 and so that two of its four pouches are positioned on top of product box 99. Preferably, liner 81, product box 99, and temperature-control members 101-1 through 101-3 are dimensioned so that temperature-control members 101-1 through 101-3 fit snugly around product box 99 within liner 81. As can be appreciated, the method described above is exemplary; accordingly, the order in which temperature-control members 101-1 through 101-3 are placed around product box 99 and the positioning of temperature-control members 101-1 through 101-3 relative to product box 99 and liner 81 may be varied without departing from the present invention.

System 11 may further comprise a vacuum insulated panel 111. Vacuum insulated panel 111 may be similar in construction to vacuum insulated panels 53-1 through 53-5. A plurality of fasteners (not shown) that may be complementary to fasteners 25-1 through 25-4 may be secured, for example, by adhesive or similar means to vacuum insulated panel 111 and may be arranged on vacuum insulated panel 111 so as to permit detachable mating with fasteners 25-1 through 25-4. In this manner, vacuum insulated panel 111 may be detachably secured to top closure flap 19-1 of outer box 13.

Figure 11:
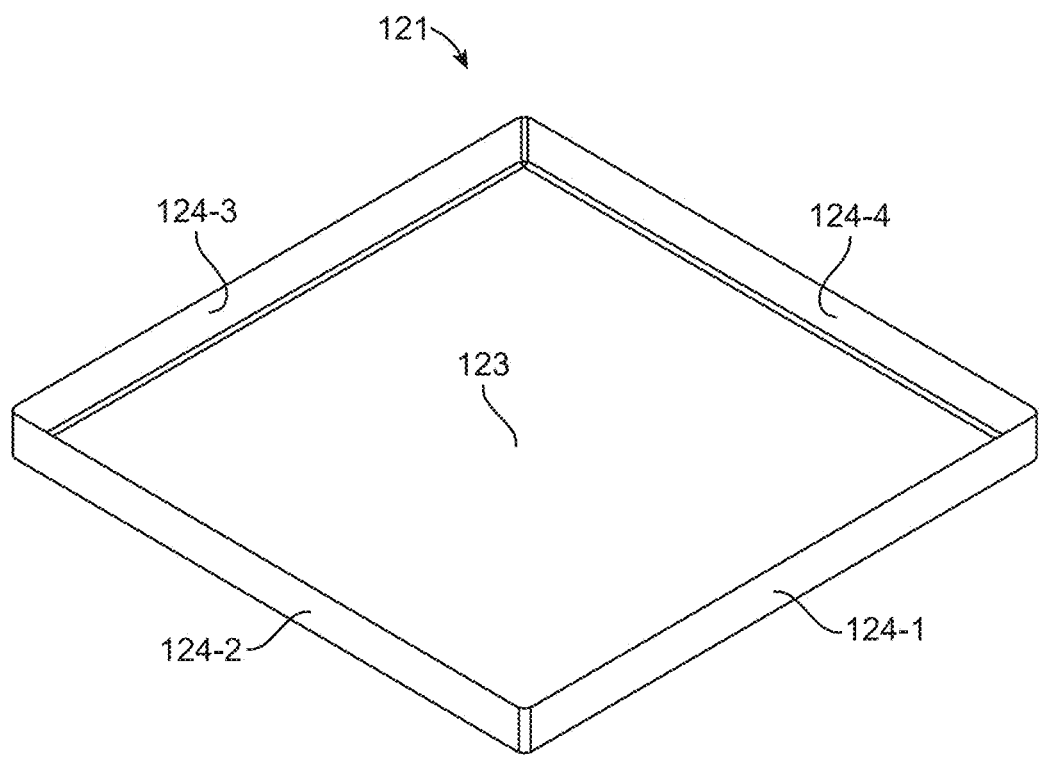
FIG. 11 is a perspective view of the cover shown in FIG. 3.

System 11 may further comprise a cover 121. Cover 121, which is also shown separately in FIG. 11, may be made of the same material as liner 81 or may be made of a material similar thereto. Cover 121 may be shaped to include a bottom 123, a plurality of sides 124-1 through 124-4, and an open top. Cover 121 may be appropriately dimensioned to cover the bottom and sides of vacuum insulated panel 111. A plurality of fasteners 125-1 through 125-4 may be secured, for example, by an adhesive or similar means to the interior faces of sides 124-1 through 124-4 of cover 121, and complementary fasteners (not shown) may be secured, for example, by an adhesive or similar means to the peripheral edges of vacuum insulated panel 111 at locations thereon that permit detachable mating with fasteners 125-1 through 125-4. In this manner, vacuum insulated panel 111 may be detachably secured to cover 121. In the present embodiment, fasteners 125-1 through 125-4 may be hook (or loop) fasteners, with complementary loop (or hook) fasteners being secured to vacuum insulated panel 111; however, it is to be understood that other types of fasteners, such as adhesive fasteners applied to one or both of vacuum insulated panel 111 and cover 121, may also be used. Also, although four fasteners 125-1 through 125-4 are shown in the present embodiment, it is to be understood that a greater number or lesser number of fasteners 125-1 through 125-4 may be used without departing from the present invention.

Vacuum insulated panel 111 is preferably positioned on top closure flap 19-1 and cover 121 is preferably positioned on vacuum insulated panel 111 so that liner 81 may be closed simply by the closure of top closure flap 19-1. In this regard, cover 121 and vacuum insulated panel 111 may be collectively regarded as a lid assembly 122 for insulation unit 51.

System 11 may further comprise a temperature indicator 127. Temperature indicator 127, which may be a conventional temperature indicator, may be positionable on top of product box 99 below the top two pouches of temperature-control member 101-3 and may be used to give a real-time indication of whether or not product box 99 is within a desired temperature range. For example, temperature indicator 127 may indicate a positive condition (e.g., by displaying a particular color or symbol) if the temperature is within the desired temperature range and may indicate a negative condition (e.g., by displaying a particular color or symbol) if the temperature is outside of the desired temperature range. Alternatively, temperature indicator 127 may provide a real-time temperature reading. As can readily be appreciated, temperature indicator 127 may be replaced with, or may additionally have the capability to measure or to detect shock/movement, global position, moisture/humidity or another environmental parameter.

System 11 minus temperature-control members 101-1 through 101-3 may be referred to herein as a shipper.

One may assemble system 11 as follows: First, outer box 13 may be formed from blank 27, and the bottom closure flaps of outer box 13 may be closed and, preferably, sealed. Next, data logger 41 may be inserted into opening 45 of board 43, and the combination of data logger 41 and board 43 may be placed in the bottom of outer box 13. Next, liner 81 (with pads 97-1 through 97-4 secured thereto) may be placed in insulation unit 51, and the combination of insulation unit 51 and liner 81 may be placed in outer box 13 on top of board 43. Next, cover 121 may be secured to vacuum insulated panel 111, and the combination of cover 121 and vacuum insulated panel 111 may be secured to closure flap 19-1. (Tab 21 may be secured to closure flap 19-1 prior to securement of cover 121 and vacuum insulated panel 111 to closure flap 19-1.)

Next, temperature-control member 101-1 may be placed in liner 81, with two pouches 102 of temperature-control member 101-1 lining the bottom of liner 81 and with two pouches of temperature-control member 101-1 lining one of the side walls of liner 81. Product box 99 (with the temperature-sensitive materials loaded therein and with temperature indicator 127 positioned on top of product box 99) may then be placed in liner 81 on top of the bottom two pouches 102 of temperature-control member 101-1. Temperature-control members 101-2 and 101-3 may then be placed in insert 81 around the remaining exposed faces of product box 99. Next, top closure flaps 19-1 through 19-4 may be closed, the closure of top closure flap 19-1 causing lid assembly 122 to be swung down on top of liner 81 and insulation unit 51.

The product load and temperature-control members 101-1 through 101-3 may be preconditioned at appropriate temperatures prior to being loaded into insert 81 and may be loaded into system 11 at a particular temperature. For example, to maintain the temperature-sensitive materials within a temperature range of +2° C. to +8° C., the product load may be pre-conditioned at +5° C.±3° C., temperature-control members 101-1 through 101-3 may contain a phase-change material having a phase-change temperature of +5° C. and may be pre-conditioned at +3° C.±3° C., and the above-described steps for assembling system 11 may be conducted at +5° C.±3° C. Alternatively, to maintain the temperature-sensitive materials within a temperature range of +15° C. to +25° C., the product load may be pre-conditioned at +20° C.±5° C., temperature-control members 101-1 through 101-3 may contain a phase-change material having a phase-change temperature of +17° C. and may be pre-conditioned at +20° C.±5° C., and the above-described steps for assembling system 11 may be conducted at +20° C.±5° C. Moreover, as discussed above, in other embodiments, it may be desirable to have different pouches of the same temperature-control member or of different temperature-control members contain different types of phase-change materials. For example, according to one embodiment, some of temperature-control members 101-1 through 101-3 may contain a first type of phase-change material, for example, a phase-change material having a phase-change temperature of +17° C., and some of temperature-control members 101-1 through 101-3 may, instead, contain a second type of phase-change material, for example, a phase-change material having a phase-change temperature of +24° C. Alternatively, according to another embodiment, one, some or all of temperature-control members 101-1 through 101-3 may have some pouches 102 (e.g., two of four pouches 102 of a given temperature-control member) containing a first type of phase-change material, for example, a phase-change material having a phase-change temperature of +17° C. and may have some pouches 102 (e.g., the other two of four pouches 102 of the same temperature-control member) containing a second type of phase-change material, for example, a phase-change material having a phase-change temperature of +24° C. Where two different types of phase-change material are each present in two of four pouches 102, the two different types of phase-change material may or may not be present in an alternating sequence of pouches 102 (e.g., A/B/A/B). Furthermore, in certain embodiments, whether the same phase-change materials or different phase-change materials are used, it may be desirable, in certain instances, to precondition all of the temperature-control members at the same preconditioning temperature and, in other instances, to precondition some temperature-control members at a first temperature and to precondition other temperature control-members at a second (i.e., different) temperature. For example, where some temperature-control members contain a first type of phase-change material having a first phase-change temperature and where some temperature-control members contain a second type of phase-change material having a different phase-change temperature, it may be desirable, in certain instances, to precondition the two types of temperature-control members at different preconditioning temperatures.

According to another aspect of the invention, system 11 may be used as follows: First, system 11 may be assembled by a first party in the manner indicated above, except that temperature-control members 101-1 through 101-3 may be omitted from the assembly of system 11. (In addition, product box 99 may be devoid of product.) Then, system 11—minus temperature-control members 101-1 through 101-3—may be shipped from the first party to a second party. Concurrently with the shipping of system 11—minus temperature-control members 101-1 through 101-3 (or therebefore or thereafter), temperature-control members 101-1 through 101-3 may also be shipped from the first party to the second party. Next, the second party may precondition temperature-control members 101-1 through 101-3. Next, while in a temperature-controlled environment, the second party may open system 11, insert the preconditioned temperature-control members 101-1 through 101-3 into insert 81 of system 11, and then re-close system 11. Next, the second party may transport system 11 to a third party, the transport preferably being performed using a refrigerated vehicle. The third party may then use system 11 immediately or may keep it refrigerated until the third party is ready for its use. When ready for its use, the third party may open system 11 and may check temperature indicator 127 to see if the current temperature of product box 99 is in the desired range. If temperature indicator 127 indicates that the current temperature is not within the desired range, system 11 is returned to the second party for reconditioning and no product is shipped therein. If temperature indicator 127 indicates that the current temperature is within the desired range, the third party may remove temperature indicator 127 from system 11 and may pack a product in product box 99. (The removed temperature indicator 127 may then be shipped back to the first party or the second party.) The third party may then ship system 11, minus temperature indicator 127 but with the product, to a fourth party. The fourth party may then remove the product from product box 99 and then return system 11 to the first party for cleaning, refurbishment and reuse.

Alternatively, in another embodiment, the roles of the above-described second and third parties may be performed by a single party, and the role of the fourth party may be eliminated. More specifically, system 11—minus temperature-control members 101-1 through 101-3—may be shipped from a first party to a second party. Concurrently with the shipping of system 11—minus temperature-control members 101-1 through 101-3 (or therebefore or thereafter), temperature-control members 101-1 through 101-3 may also be shipped from the first party to the second party. When the second party wishes to ship a product, the second party may precondition, if needed, temperature-control members 101-1 through 101-3. Next, the second party may load the payload into payload box 99, then may open system 11 and insert temperature-control members 101-1 through 101-3 and payload box 99 into insert 81 of system 11, and then may re-close system 11. Next, the second party may transport the thus-loaded system 11 to a third party. The third party may then remove the product from product box 99 and then return system 11 to the first party or to the second party for cleaning, refurbishment and reuse.

The cleaning and/or refurbishment of system 11 for reuse may comprise the following (or some portion thereof): Removal of temperature-control members 101-1 through 101-3 from liner 81, inspection of temperature-control members 101-1 through 101-3 for damage, and replacement of any damaged temperature-control members 101-1 through 101-3; removal of lid assembly 122 from outer box 13, separation of vacuum insulated panel 111 from cover 121, inspection of cover 121 and vacuum insulated panel 111 for damage, and replacement of any damaged parts; removal of liner 81 and insulation unit 51 from outer box 13, separation of liner 81 from insulation unit 51, inspection of liner 81 and individual components of insulation unit 51 for damage (and checking that tension of straps 69-1 through 69-3 is acceptable), and replacement of any damaged parts; removal of board 43 from outer box 13, inspection of board 43 for damage, and replacement of board 43 if damaged; and replacement of outer box 13. If one or more of liner 81, cover 121, and temperature-control members 101-1 through 101-3 are soiled, but are not otherwise damaged, these items may be cleaned (e.g., wiped with 70% isopropyl alcohol solution) and reused. Such cleaning and reuse of these items may take place even if there is no discernible soiling of these items. Payload box 99 may also be replaced if soiled or damaged.

System 11 possesses a number of advantageous features. One such advantageous feature is that liner 81 may protect vacuum insulated panels 53-1 through 53-5 from becoming soiled, such as by the items that are placed within cavity 83 (e.g., product box 99 and its contents, temperature-control members 101-1 through 101-3) or otherwise. This is particularly the case where liner 81 is made of a liquid impermeable material and does not contain any seams, such as may be the case, for example, where liner 81 is made by thermoforming a single sheet of plastic.

Another advantageous feature of system 11 is that liner 81 may be removably mounted on insulation unit 51. In this manner, after system 11 has been used, liner 81 may be removed from insulation unit 51 and may be cleaned (assuming that liner 81 is made of a material that lends itself to being cleaned) or replaced, with a cleaned or replacement liner 81 then being mounted on insulation unit 51 for a subsequent use. In this manner, problems like cross-contamination, resulting from multiple uses, may be minimized.

Still another advantageous feature of system 11 is that liner 81 may protect vacuum insulated panels 53-1 through 53-5 from damage, such as may occur due to contact with product box 99 and/or temperature-control members 101-1 through 101-3. Relatedly, cover 121 may protect vacuum insulated panel 111 from damage.

Yet another advantageous feature of system 11 is that liner 81 may be sized and shaped relative to product box 99 and to temperature-control members 101-1 through 101-3 so that temperature-control members 101-1 through 101-3 may be snugly and correctly positioned around product box 99, with little available volume for temperature-control members 101-1 through 101-3 to move during shipping. This feature is attributable, at least in part, to the shape of liner 81, whose lower cavity 83-1 is smaller in footprint than its upper cavity 83-2. As a result of this shape, a shelf is formed upon which the side pouches 102 may be seated. This shelf keeps the side pouches 102 aligned with the sides of payload box 99 and prevents some of the side pouches 102 from sliding down relative to the payload box 99 (which could occur with a cavity of uniform cross-sectional area along its height).

Still yet another advantageous feature of system 11 is that lid assembly 122, which includes vacuum insulated panel 111, may be coupled to one of the top flaps of outer box 13. As a result of this integrated construction, the closing of top flap 19-1 of outer box 13 automatically results in the correct placement of vacuum insulated panel 111 on top of liner 81 and insulation unit 15, thereby creating a closed volume for containing product box 99 and temperature-control members 101-1 through 101-3. Moreover, because vacuum insulated panel 111 is detachably secured both to top flap 19-1 and to cover 121, vacuum insulated panel 111 may be periodically inspected (for example, after each use) and replaced if damaged.

Still yet even another advantageous feature of system 11 is that system 11 may include data logger 41 and/or temperature indicator 127. Data logger 41 may be used to provide environmental data, such as ambient temperature, that is encountered by system 11 during its use to transport temperature-sensitive materials. By contrast, temperature indicator 127 may be used to provide an indication to a shipping party as to whether the temperature within product box 99 is at an appropriate temperature at the time of pack-out.

Still a further advantageous feature of system 11 is that system 11 may readily lend itself to being refurbished and/or reused. As noted above, components like liner 81 and cover 121 may be made of cleanable and/or disposable materials. Moreover, the removable mounting of components like liner 81, cover 121, and vacuum insulated panel 111 facilitate the inspection of system 11.

Still yet even a further advantageous feature of system 11 is that system 11 may be adapted for maintaining different payloads at different temperature ranges simply by using different temperature-control members. For example, system 11 may be used, in a first job, to maintain a payload at +2° C. to +8° C. by using a first set of temperature-control members, for example, temperature-control members containing phase-change material having a phase-change temperature of +5° C. and then may be used, in a second or alternative job, to maintain a different payload at +15° C. to +25° C. by using a second set of temperature-control members, for example, temperature-control members containing phase-change material having a phase-change temperature of +17° C. In this manner, a shipping party having an array of different types of temperature-control members may simply select an appropriate type of temperature-control member for a particular job.

Still yet a further advantageous feature of system 11 is that, where temperature-control members 101-1 through 101-3 employ a +5° C. phase-change material of the type described in U.S. Patent Application Publication No. US 2018/0093816, the system can hibernate under refrigeration for up to 5 days without reducing its ability to provide protection for 96 hours.

Figure 12:
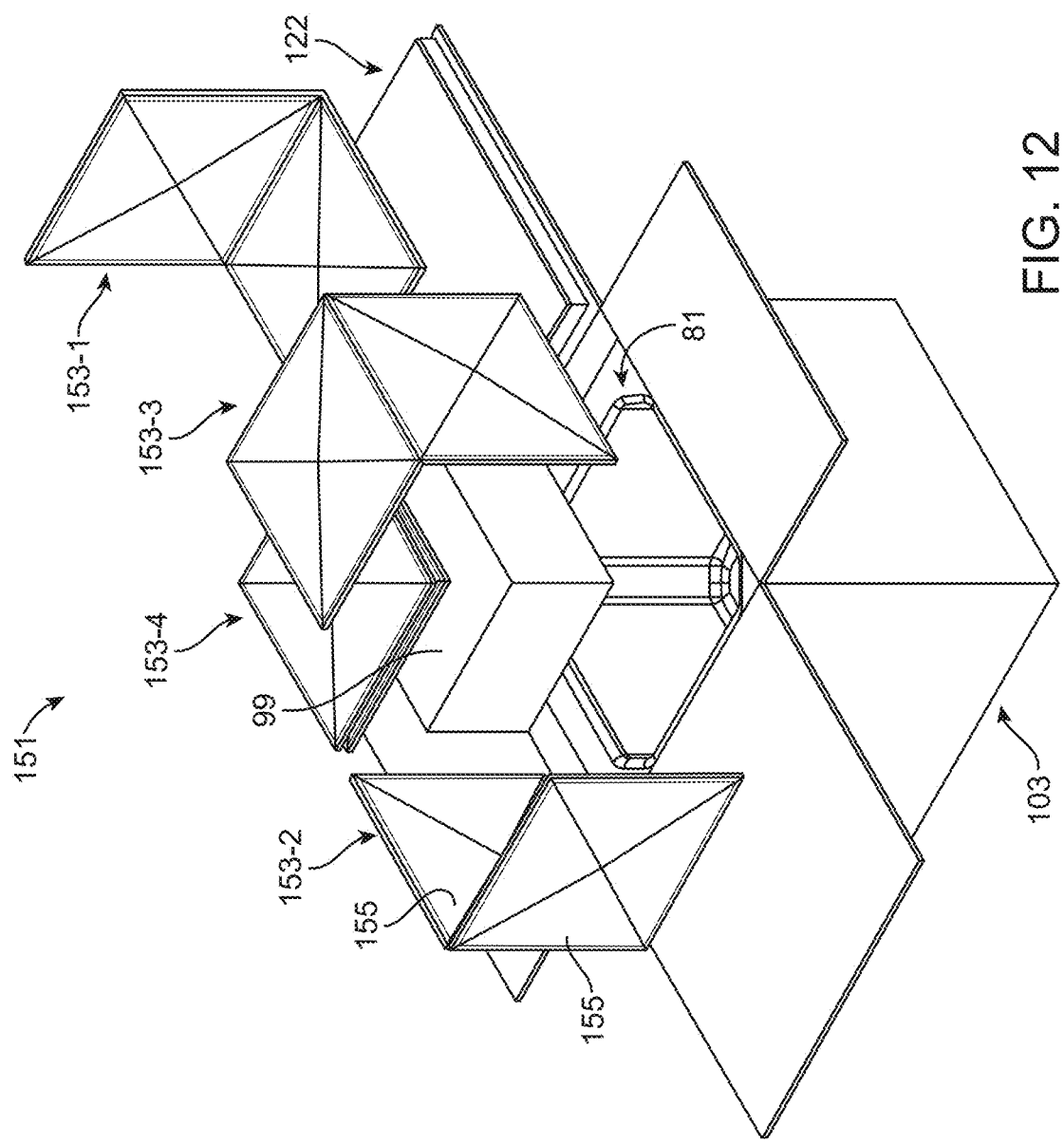
FIG. 12 is a partly exploded perspective view of a second embodiment of a shipping system suitable for use in storing and/or transporting temperature-sensitive materials, the shipping system being constructed according to the teachings of the present invention.

Referring now to FIG. 12, there is shown a partly exploded perspective view of a second embodiment of a shipping system suitable for use in storing and/or transporting temperature-sensitive materials, the shipping system being constructed according to the present invention and being represented generally by reference numeral 151. For clarity and/or ease of illustration, certain details of shipping system 151 that are discussed elsewhere in this application or that are not critical to an understanding of the invention may be omitted from FIG. 12 or may be shown therein in a simplified manner.

System 151 may be similar in many respects to system 11. One difference between the two systems may be that, whereas system 11 may comprise temperature-control members 101-1 through 101-3, wherein each of said temperature-control members may have four pouches, system 151 may comprise temperature-control members 153-1 through 153-4, wherein each of said temperature-control member may have two pouches 155. Notwithstanding the above, temperature-control members 153-1 through 153-4 may have a different number of pouches than shown and may include, for example, four pouches.

Another difference between the two systems may be that, whereas system 11 may have the same number of pouches arranged on all six sides of product box 99 (i.e., one pouch), system 151 may have different numbers of pouches on different sides of product box 99. For example, in the present embodiment, three pouches 155, in a stacked configuration, may be positioned over product box 99 (i.e., the two pouches of temperature-control member 153-4 and one of the pouches of temperature-control member 153-3), and one pouch may be positioned over the other five sides of product box 99. The contents of the various pouches 155 of temperature-control members 153-1 through 153-4 may be the same, or some pouches may contain different phase-change materials or may have contents with a different phase-change temperature than the contents of other pouches. Moreover, regardless of the contents of the pouches, the various temperature-control members or even the various pouches of the same temperature-control member may be preconditioned at the same or different temperatures.

According to one embodiment, system 151 may be used to maintain a payload at a temperature of −15° C. to −25° C. for up to 4 days or longer, and each of pouches 155 of temperature-control members 153-1 through 153-4 may contain a salt/water solution having a phase-change temperature of −23° C. An example of a material suitable for use as temperature-control members 153-1 through 153-4 is a 500-ST series KOOLIT® gel pack or saddlebag from Cold Chain Technologies, Inc. (Franklin, MA). In such a case, the product load may be pre-conditioned at −20° C.±5° C., temperature-control members 153-1 through 153-4 may be pre-conditioned at −30° C.±3° C., and system 151 may be assembled at a temperature of +20° C.±3° C.

Also, although not shown, it is to be understood that one or more layers of insulating material may be interposed between product box 99 and an adjacent temperature-control member and/or may be interposed between two adjacent layers of pouches (either of a single, folded temperature-control member or of two discrete temperature-control members) along a common side of product box 99.

Figure 13:
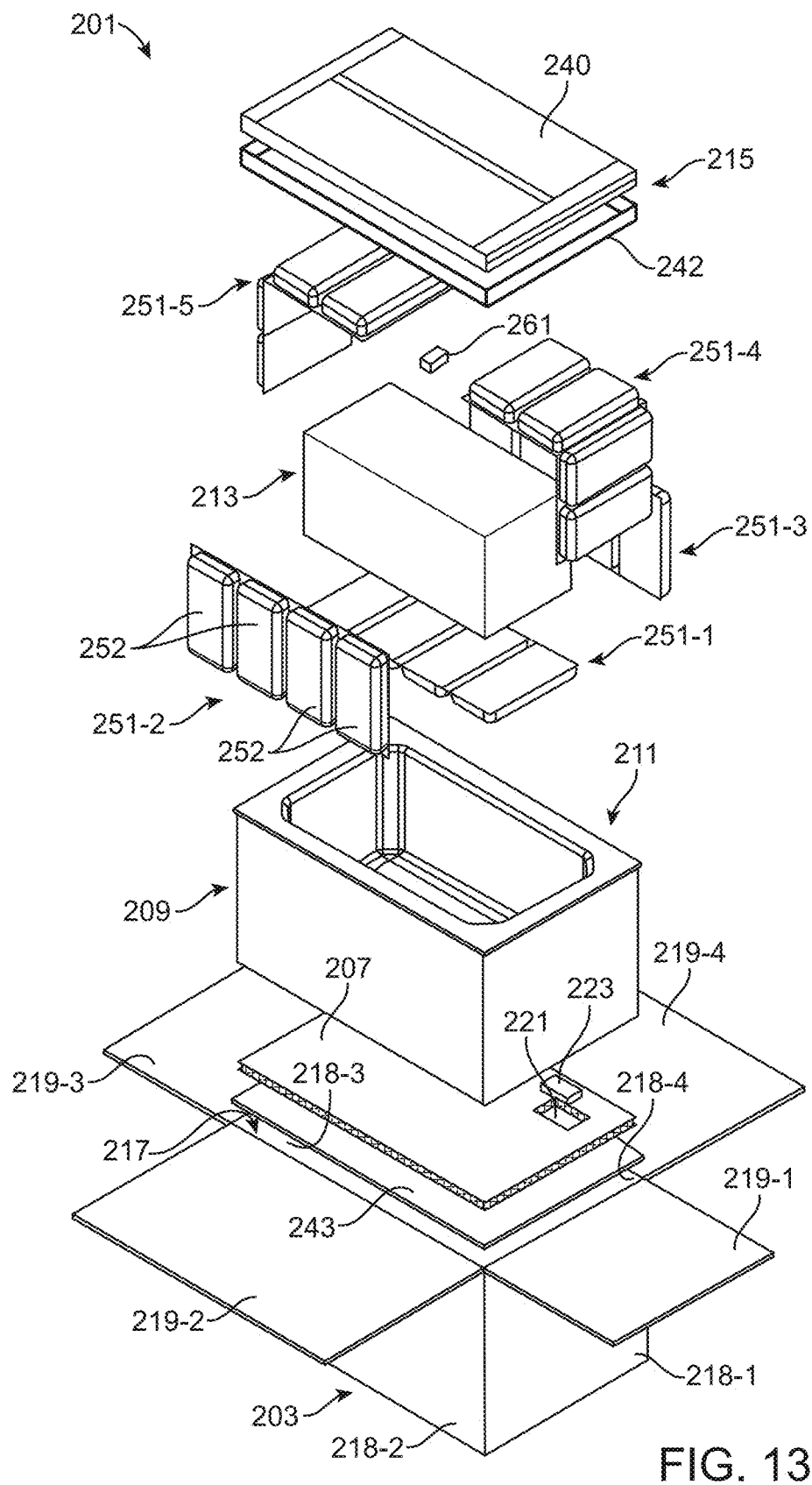
FIG. 13 is a partly exploded perspective view of a third embodiment of a shipping system suitable for use in storing and/or transporting temperature-sensitive materials, the shipping system being constructed according to the teachings of the present invention.

Referring now to FIG. 13, there is shown a partly exploded perspective view of a third embodiment of a shipping system suitable for use in storing and/or transporting temperature-sensitive materials, the shipping system being constructed according to the present invention and being represented generally by reference numeral 201. For clarity and/or ease of illustration, certain details of shipping system 201 that are discussed elsewhere in this application or that are not critical to an understanding of the invention may be omitted from FIG. 13 or may be shown therein in a simplified manner.

System 201 may be similar in many respects to system 11. One difference between the two systems may be that, whereas system 11 may be designed for a payload of approximately 6 L, system 201 may be designed for a payload of approximately 15 L. Accordingly, system 201 may comprise an outer box 203, a board 207, an insulation unit 209, a liner 211, a product box 213, and a lid assembly 215, all of which may be similar in construction to the corresponding components of system 11 but may simply be larger in at least one dimension.

Outer box 201 may comprise a cavity 217 bounded by a plurality of side walls 218-1 through 218-4, a plurality of top closure flaps 219-1 through 219-4, and a plurality of bottom closure flaps (not shown). Board 207 may comprise an opening 221 for snugly receiving an environmental data logger 223, which may be similar to environmental data logger 41 of system 11.

Figure 14:
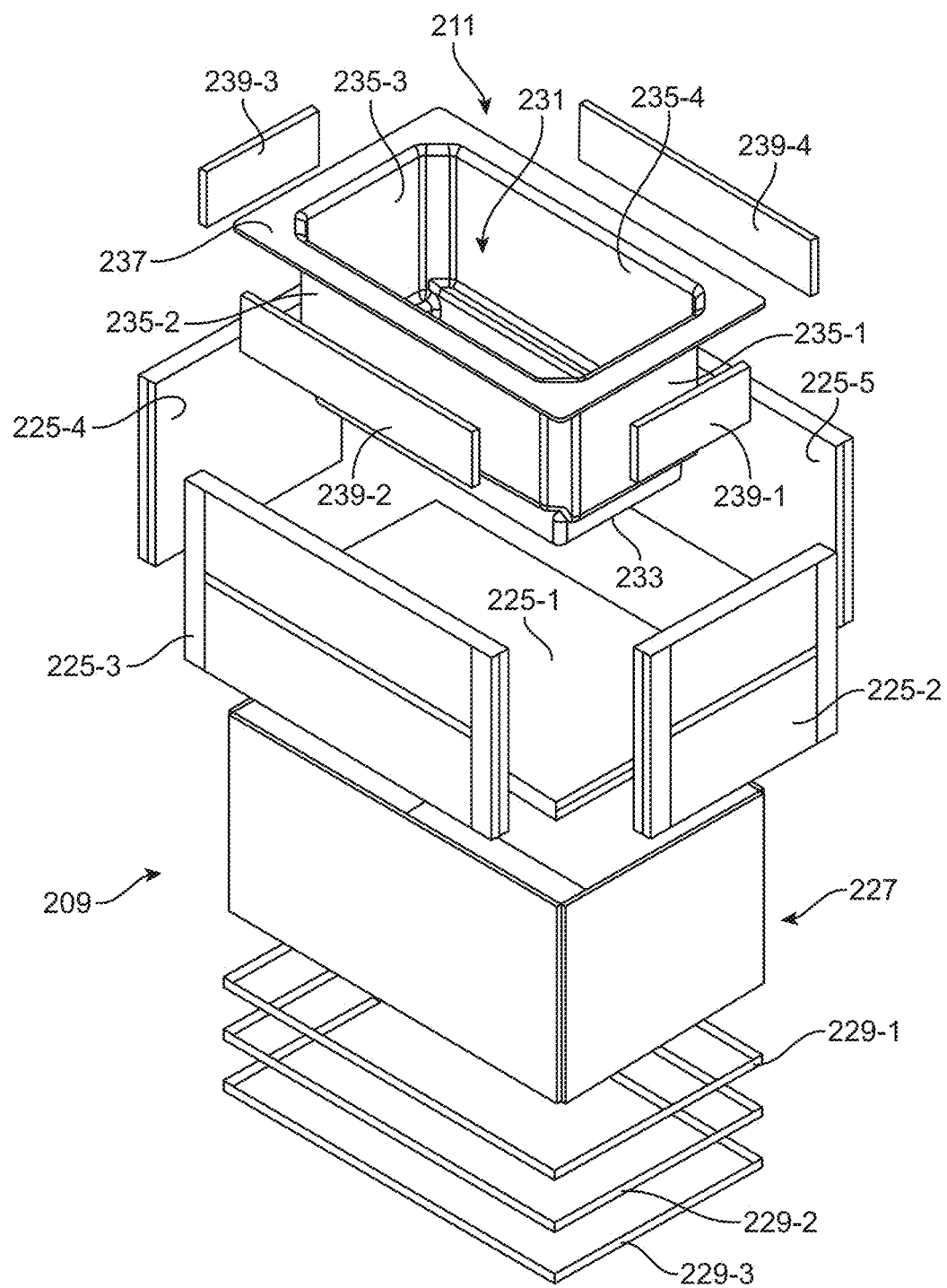
FIG. 14 is an exploded perspective view of a portion of the system of FIG. 13, showing in greater detail the insulation unit, the liner, and other components not visible in FIG. 13.

Referring now to FIG. 14, insulation unit 209 may comprise a plurality of vacuum insulated panels 225-1 through 225-5, a support 227, and a plurality of straps 229-1 through 229-3. Although not shown, insulation unit 209 preferably also includes a plurality of corner boards, which may be similar to corner boards 71-1 through 71-4 of system 11. Liner 211, which may be similar to liner 81 but may have a more elongated, rectangular shape as opposed to a more square shape, may be shaped to include a cavity 231, bounded by a bottom wall 233, and four side walls 235-1 through 235-4. A flange 237 may extend peripherally outwardly from the top of liner 211 and may be dimensioned to cover the tops of vacuum insulated panels 225-2 through 225-5. A plurality of pads 239-1 through 239-4, which may be similar in composition and function to pads 97-1 through 97-4 of system 11, may be secured to the outer surfaces of walls 235-1 through 235-4.

Referring back now to FIG. 13, it should be noted that, although lid assembly 215 is not shown in FIG. 12 as being coupled to a top flap of outer box 203, lid assembly 215 preferably is detachably coupled to flap 219-2 or 219-4 in a manner analogous to that discussed above for lid assembly 122 of system 11. It should also be noted vacuum insulated panel 240 and cover 242 of lid assembly 215 are preferably detachably coupled to one another by fasteners similar to those discussed above for detachably coupling vacuum insulated panel 111 to cover 121. It should additionally be noted that system 201 is shown comprising a pad 243 disposed under board 207. Pad 243 may be used to keep the components that are contained within outer box 203 from jostling up and down, despite tolerances, and may also provide some shock absorption to protect the contents disposed within outer box 13. Notwithstanding the above, in some embodiments, pad 243 may be omitted.

System 201 may further comprise a plurality of temperature-control members 251-1 through 251-5. Temperature-control members 251-1 through 251-5 may be identical to one another and to temperature-control members 101-1 through 101-3, the only difference being that system 201 may include five temperature-control members whereas system 11 may include three temperature-control members. Notwithstanding the above, it is to be understood that the number of temperature-control members 251-1 through 251-5 and the number and shape of pouches 252 in temperature-control members 251-1 through 251-5 are merely illustrative. Consequently, the number of temperature-control members 251, as well as the number and shape of pouches 252 therein, may be varied while still coming within the scope of the present invention. Moreover, while, in the present embodiment, each pouch 252 of temperature-control members 251-1 through 251-5 contains the same quantity and type of phase-change material, this need not be so as some of temperature-control members 251-1 through 251-5 may contain different phase-change materials than others of temperature-control members 251-1 through 251-5 and/or different pouches 252 of the same temperature-control member 251 may contain different phase-change materials. Furthermore, in certain embodiments, whether the same phase-change materials or different phase-change materials are used, it may be desirable to precondition some temperature-control members at a first temperature and to precondition other temperature control-members at a second (i.e., different) temperature.

Temperature-control members 251-1 through 251-5 may be dimensioned relative to product box 213 and liner 211 so that temperature-control member 251-1 may fit snugly in the lower portion of cavity 231, with product box 213 sitting thereon and with temperature-control members 251-2 through 251-5 snugly fitting around the sides and top of product box 213.

System 201 may further comprise a temperature indicator 261, which may be similar in composition and function to temperature indicator 127.

System 201 may be used similarly to system 11.

Figure 15:
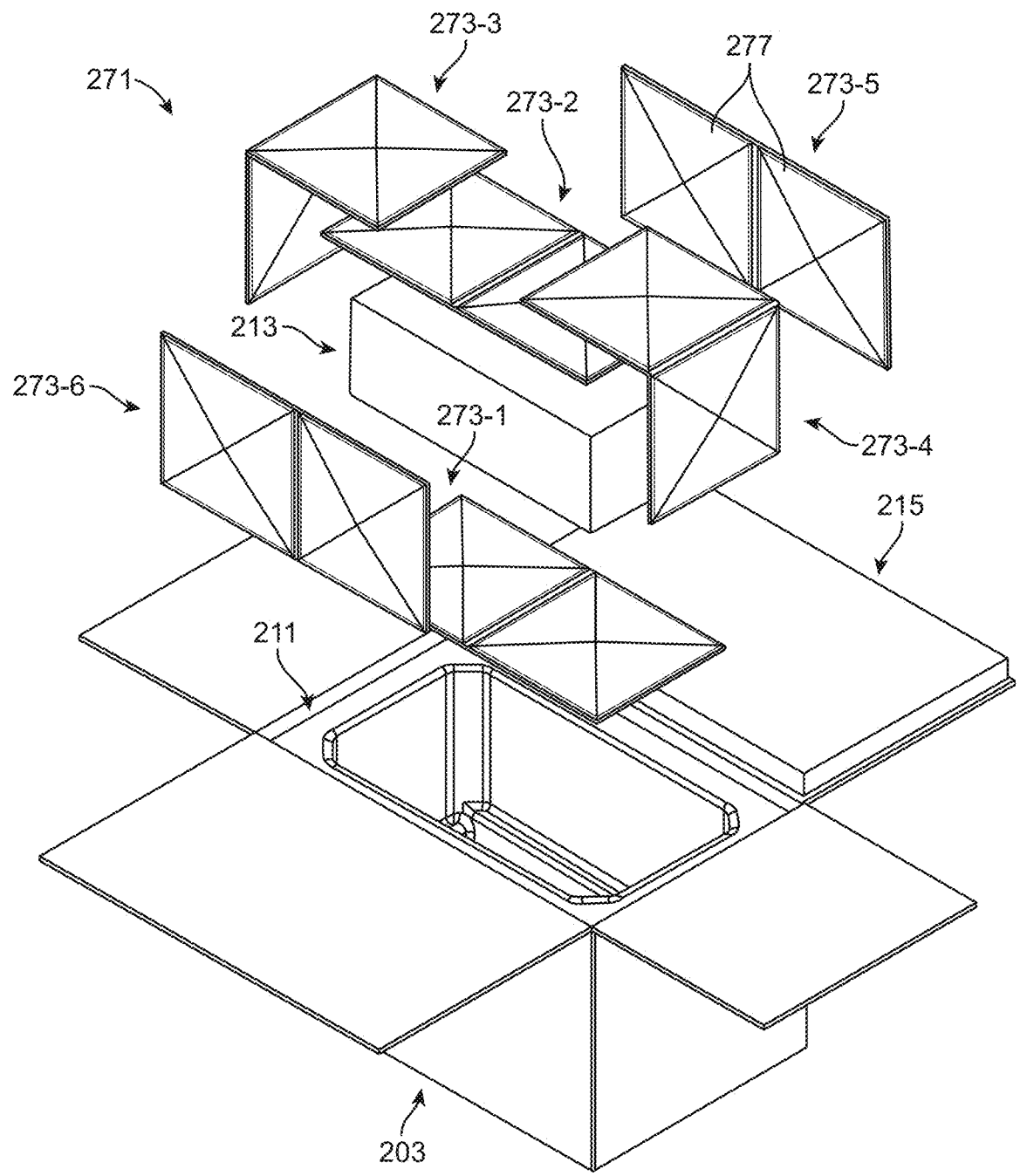
FIG. 15 is a partly exploded perspective view of a fourth embodiment of a shipping system suitable for use in storing and/or transporting temperature-sensitive materials, the shipping system being constructed according to the teachings of the present invention.

Referring now to FIG. 15, there is shown a partly exploded perspective view of a fourth embodiment of a shipping system suitable for use in storing and/or transporting temperature-sensitive materials, the shipping system being constructed according to the present invention and being represented generally by reference numeral 271. For clarity and/or ease of illustration, certain details of shipping system 271 that are discussed elsewhere in this application or that are not critical to an understanding of the invention may be omitted from FIG. 15 or may be shown therein in a simplified manner.

System 271 may be similar in many respects to system 201. One difference between the two systems may be that, whereas system 201 may comprise temperature-control members 251-1 through 251-5, wherein each of said temperature-control members may have four pouches, system 271 may comprise temperature control members 273-1 through 273-6, wherein each of said temperature-control member may have two pouches 277. Notwithstanding the above, temperature-control members 273-1 through 273-6 may have a different number of pouches than shown and may include, for example, four pouches.

Another difference between the two systems may be that, whereas system 201 may have the same number of layers of pouches arranged on all six sides of product box 213 (i.e., one layer), system 271 may have different numbers of layers of pouches on different sides of product box 213. For example, in the present embodiment, two layers of pouches 277 may be positioned over product box 213 (i.e., the two pouches of temperature-control member 273-2 and one of the pouches of each of temperature-control members 273-3 and 273-4), and one layer may be positioned over the other five sides of product box 213. The contents of the various pouches 277 of temperature-control members 273-1 through 273-6 may be the same, or some pouches may contain different phase-change materials or may have contents with a different phase-change temperature than the contents of other pouches. Moreover, regardless of the contents of the pouches, the various temperature-control members or even the various pouches of the same temperature-control member may be preconditioned at the same or different temperatures.

According to one embodiment, system 271 may be used to maintain a payload at a temperature of −15° C. to −25° C. for up to 4 days or longer, and each of pouches 277 of temperature-control members 273-1 through 273-6 may contain a salt/water solution having a phase-change temperature of −23° C. An example of a material suitable for use as temperature-control members 153-1 through 153-4 is a 500-ST series KOOLIT® gel pack or saddlebag from Cold Chain Technologies, Inc. (Franklin, MA). In such a case, the product load may be pre-conditioned at −20° C.±5° C., temperature-control members 273-1 through 273-6 may be pre-conditioned at −30° C.±3° C., and system 271 may be assembled at a temperature of +20° C.±3° C.

Also, although not shown, it is to be understood that one or more layers of insulating material may be interposed between product box 213 and an adjacent temperature-control member and/or may be interposed between two adjacent layers of pouches (either of a single, folded temperature-control member or of two discrete temperature-control members) along a common side of product box 213.

Figure 16:
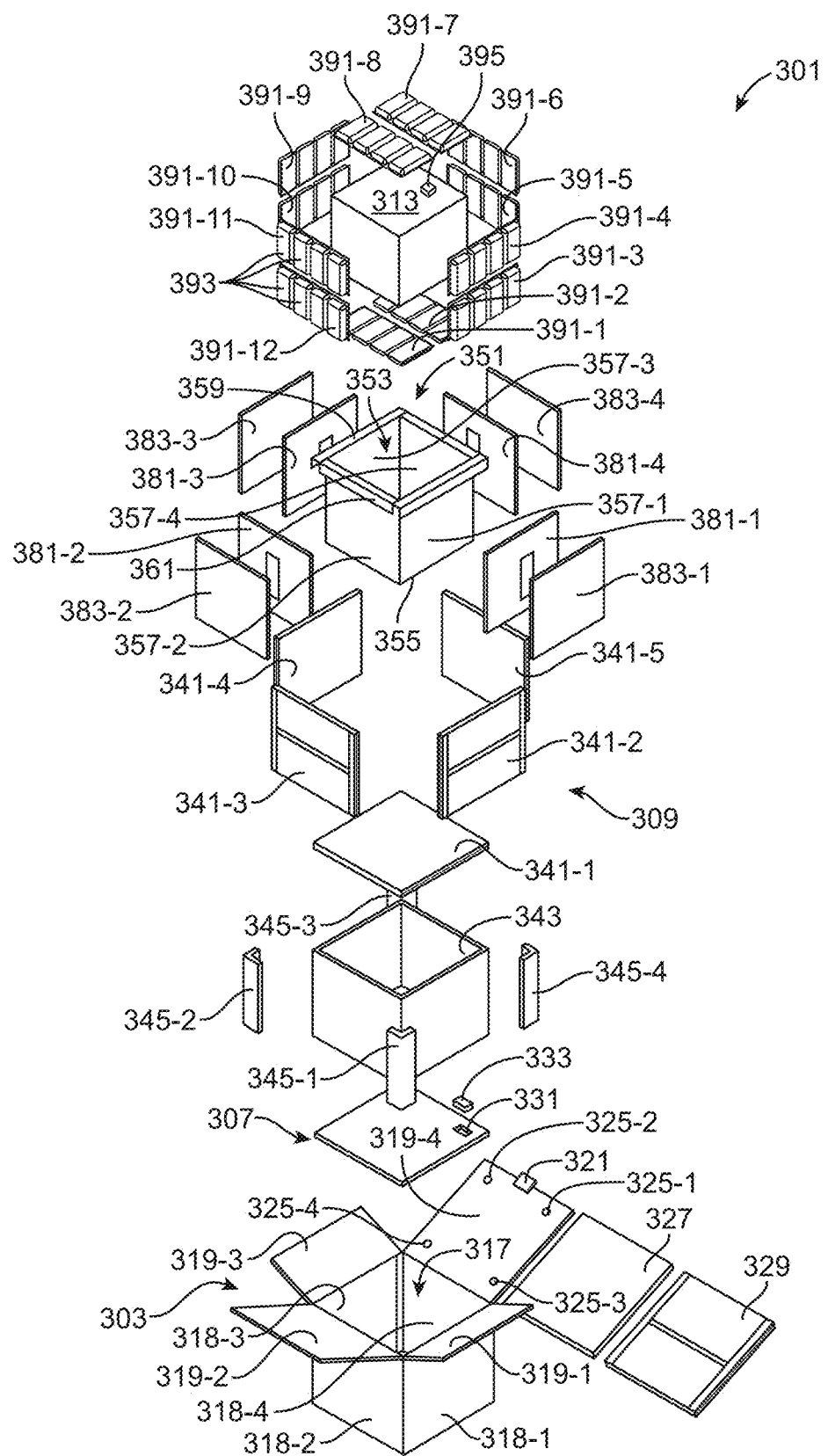
FIG. 16 is a partly exploded perspective view of a fifth embodiment of a shipping system suitable for use in storing and/or transporting temperature-sensitive materials, the shipping system being constructed according to the teachings of the present invention.

Referring now to FIG. 16, there is shown a partly exploded perspective view of a fifth embodiment of a shipping system suitable for use in storing and/or transporting temperature-sensitive materials, the shipping system being constructed according to the present invention and being represented generally by reference numeral 301. For clarity and/or ease of illustration, certain details of shipping system 301 that are discussed elsewhere in this application or that are not critical to an understanding of the invention may be omitted from FIG. 16 or may be shown therein in a simplified manner. For example, FIG. 16 does not show four straps that are used as part of the insulation unit, such straps being similar to straps 69-1 through 69-3 of system 11.

System 301 may be similar in some respects to system 11. One difference between the two systems may be that, whereas system 11 may be designed for a payload of approximately 6 L, system 301 may be designed for a payload of approximately 59 L. Accordingly, system 301 may comprise an outer box 303, a board 307, an insulation unit 309, and a product box 313, all of which may be similar in construction to the corresponding components of system 11 but may simply be larger in at least one dimension.

Outer box 301 may comprise a cavity 317 bounded by a plurality of side walls 318-1 through 318-4, a plurality of top closure flaps 319-1 through 319-4, and a plurality of bottom closure flaps (not shown). A tab 321, which may be similar in composition and function to tab 21, may be secured to flap 319-4. A plurality of fasteners 325-1 through 325-4, which may be similar in composition and function to fasteners 25-1 through 25-4, may also be secured to flap 319-4. Fasteners 325-1 through 325-4 may be used to detachably mate with complementary fasteners (not shown) secured to a cover or casing 327. Casing 327, which may be made of corrugated cardboard or a similar material, may be used to completely encase a vacuum insulated panel 329. Consequently, vacuum insulated panel 329 may be coupled to and integrated with flap 319-4.

Board 307 may comprise an opening 331 for snugly receiving an environmental data logger 333, which may be similar to environmental data logger 41 of system 11.

Insulation unit 309 may comprise a plurality of vacuum insulated panels 341-1 through 341-5, a support 343, a plurality of corner boards 345-1 through 345-4, and a plurality of straps (not shown), the combination of which may be assembled in a manner analogous to that described above for insulation unit 51.

System 301 may further comprise a protective liner (or shell or insert) 351. Liner 351, which is appropriately dimensioned to be removably mounted on insulation unit 309, may be a rigid structure, either one-piece or multi-piece, comprising or consisting of materials, such as a corrugated cardboard or plastic, polyester paper, expanded polypropylene (EPP), polyethylene terephthalate (PET), plastic corrugate panels, or some combination thereof. Moreover, as will be discussed further below, liner 351 may comprise or consist of a polymer-coated corrugated cardboard, such as a polyurea-coated corrugated cardboard or a polyurethane-coated corrugated cardboard. In the present embodiment, liner 351 may be a one-piece, corrugated cardboard or plastic member shaped to include a cavity 353 bounded by a bottom wall 355 and four side walls 357-1 through 357-4. Each of side walls 357-1 through 357-4 may extend peripherally outwardly at its top end to form a flange 359 and then may extend downwardly a short distance to form an outer wall or extension 361.

Figure 17:
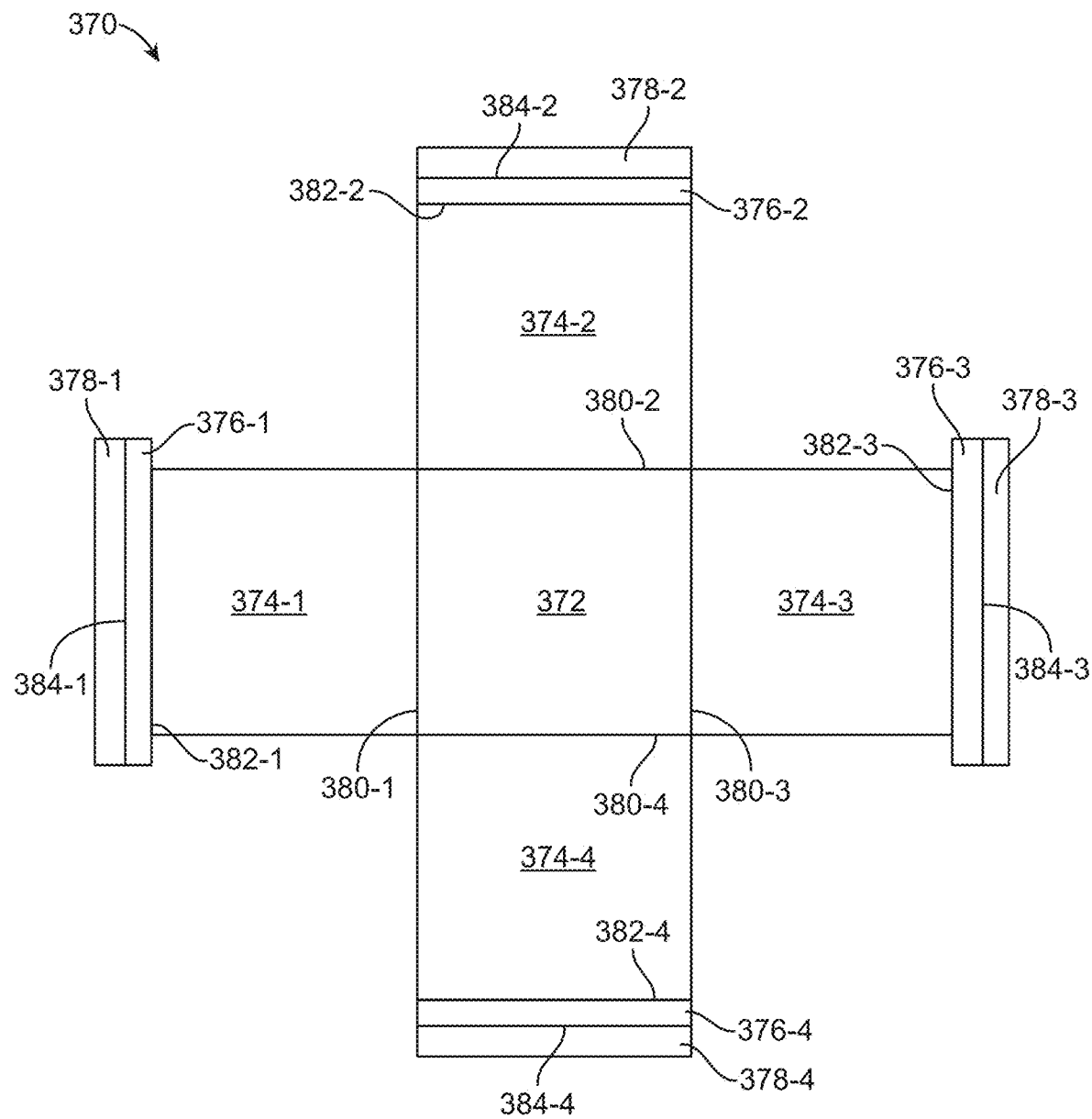
FIG. 17 is a blank used to make the liner shown in FIG. 16.

Referring now to FIG. 17, there is shown a blank 370 that may be used to make liner 351. As can be seen, blank 370 may include a central panel 372, a first plurality of intermediate panels 374-1 through 374-4, a second plurality of intermediate panels 376-1 through 376-4, and a plurality of end panels 378-1 through 378-4. A first plurality of fold lines 380-1 through 380-4 is provided at the interface of central panel 372 with each of intermediate panels 374-1 through 374-4, respectively. The folding of blank 370 about fold lines 380-1 through 380-4 may be used to define bottom wall 355 and side walls 357-1 through 357-4. A second plurality of fold lines 382-1 through 382-4 is provided at the interface of intermediate panels 374-1 through 374-4 with intermediate panels 376-1 through 376-4, respectively. The folding of blank 370 about fold lines 382-1 through 382-4 may be used to define flanges 359. A third plurality of fold lines 384-1 through 384-4 is provided at the interface of intermediate panels 376-1 through 376-4 with end panels 378-1 through 378-4, respectively. The folding of blank 370 about fold lines 384-1 through 384-4 may be used to define outer walls 361.

Liner 351 is preferably dimensioned so that bottom wall 355 and side walls 357-1 through 357-4 may be inserted into the cavity of insulation unit 309, with bottom wall 355 being positioned over the top of vacuum insulated panel 341-1 and with side walls 357-1 through 357-4 being positioned along the inner faces of vacuum insulated panels 341-2 through 341-5. Flanges 359 may be dimensioned to sit on top of and/or to cover the tops of vacuum insulated panels 341-2 through 341-5, and outer walls 361 may extend downwardly along the exterior faces of support 343. In this manner, liner 351 may cover the exposed inner and top faces of vacuum insulated panels 341-2 through 341-5.

Liner 351 may be maintained in a folded state by insulation unit 309. In other words, if liner 351 is removed from insulation unit 309, there is nothing maintaining side walls 357-1 through 357-4 perpendicular to bottom wall 355. Alternatively, in another embodiment, liner 351 may be maintained in a folded state, independently of insulation unit 309, using one or more strips of adhesive tape (not shown) or using a polymer coating of the type described above (not shown), either of which may be used to secure adjacent side walls 357-1 through 357-4 to one another. Alternatively, in yet another embodiment, liner 351 may be maintained in a folded state, independently of insulation unit 209, by providing blank 370 with suitable mating tabs and slots (not shown). Other ways of maintaining liner 351 in a folded state will be apparent to those of ordinary skill in the art.

Although, in the present embodiment, liner 351 may be a one-piece structure, it is to be understood that liner 351 need not be a one-piece structure and may be formed by the assembly of two or more pieces. For example, liner 351 may be formed by joining together a first structure defining the walls of liner 351 with a second structure defining the flanges and, optionally, outer walls of liner 351. For purposes of illustration, such a first structure defining the walls of liner 351 could be one or more pieces made of corrugated plastic, and such a second structure defining the flanges and, optionally, outer walls of liner 351 could be one or more pieces made of thermoformed plastic.

Also, as noted above, liner 351 may comprise or consist of a polymer-coated corrugated cardboard, such as a polyurea-coated corrugated cardboard or a polyurethane-coated corrugated cardboard. More specifically, for example, blank 370 (FIG. 17), which may be made of corrugated cardboard or a similarly suitable material, may be folded in the manner discussed above, and one or more strips of adhesive tape may be used to secure adjacent side walls 357-1 through 357-4 to one another. (Instead of securing adjacent side walls 357-1 through 357-4 to one another in the above fashion, the folded blank 370 may simply be placed in a suitable structure to maintain blank 370 in the desired folded state.) Next, a polymer coating may be applied to one or more exposed surfaces of the liner. For example, the polymer coating may be a conventional sprayable, two-part polyurea system, in which one feed is an isocyanate and the other feed is an amine. An example of such a polyurea system is commercially available from Ultimate Linings (Houston, TX) as UL XT 66 two-component modified polyurea protective coating. Other types of chemistries may also be used. For example, instead of a polyurea system, a polyurethane system may be used, in which one feed is isocyanate and the other feed is polyol. As noted above, the polymer coating may be applied to one or more exposed surfaces of the liner. For example, the polymer coating may be applied to some or all of the exposed surfaces of bottom wall 355 and/or side walls 357-1 through 357-4 including flanges 359 and extensions 361. Without wishing to be limited to any particular thickness for the polymer coating, the polymer coating may have a thickness of about 0.1 mm to about 3 mm, preferably about 0.5 mm to about 1.5 mm.

As can readily be appreciated, instead of applying the above-described polymer coating after blank 370 has been folded, the polymer coating could be applied before folding blank 370.

One benefit of applying a polymer coating of the aforementioned type to the corrugated cardboard of liner 351 is that, as a result of such a coating, liner 351 may be rendered more water-resistant or even water-proof. Consequently, liner 351 may become less susceptible to water damage and may be more easily wiped-down or cleaned between uses. In addition, the polymer coating may even make liner 351 more structurally durable, for example, more crush-resistant and/or more scratch-resistant. Where liner 351 comprises or consists of a polymer-coated corrugated cardboard of the type described above (or perhaps even independently thereof), casing 327 may, but need not, similarly comprise or consist of a polymer-coated corrugated cardboard.

System 301 may further comprise a first plurality of spacers 381-1 through 381-4 and a second plurality of spacers 383-1 through 383-4. Spacers 381-1 through 381-4 and spacers 383-1 through 383-4 may function similarly to pads 97-1 through 97-4 of system 11 and may be made of a corrugated cardboard or similar material. Spacers 381-1 through 381-4 may be secured to the outside surfaces of liner 351, and spacers 383-1 through 383-4 may be secured to the outside surfaces of spacers 381-1 through 381-4, respectively.

System 301 may further comprise a plurality of temperature-control members 391-1 through 391-12. Temperature-control members 391-1 through 391-12 may be identical to one another and to temperature-control members 101-1 through 101-3, the only difference being that system 301 may include 12 temperature-control members whereas system 11 may include three temperature-control members. Notwithstanding the above, it is to be understood that the number of temperature-control members 391-1 through 391-12 and the number and shape of pouches 393 in temperature-control members 391-1 through 391-12 are merely illustrative. Consequently, the number of temperature-control members 391, as well as the number and shape of pouches 393 therein, may be varied while still coming within the scope of the present invention. Moreover, while, in the present embodiment, each pouch 393 of temperature-control members 391-1 through 391-12 contains the same quantity and type of phase-change material, this need not be so as some of temperature-control members 391-1 through 391-12 may contain different phase-change materials than others of temperature-control members 391-1 through 391-12 and/or different pouches 393 of the same temperature-control member 391 may contain different phase-change materials. Furthermore, in certain embodiments, whether the same phase-change materials or different phase-change materials are used, it may be desirable to precondition some temperature-control members at a first temperature and to precondition other temperature control-members at a second (i.e., different) temperature.

Temperature-control members 391-1 through 391-12 may be dimensioned relative to product box 313 and liner 351 so that temperature-control member 391-1 through 391-12 may fit snugly around product box 315.

System 301 may further comprise a temperature indicator 395, which may be similar in composition and function to temperature indicator 127.

System 301 may be used similarly to system 11.

Many of the systems described herein may use identical types of temperature-control members to keep payloads within a particular temperature range. For example, the temperature-control members used by systems 11, 201 and 301 to keep a payload within a temperature range of, for example, +2° C. to +8° C., may be identical, the only difference being the number of such temperature-control members used by these systems and the arrangement of such temperature-control members within the respective systems. As a result, a party may keep inventories of various types of temperature-control members designed for keeping payloads within particular temperature ranges and then may use these temperature-control members, as needed, within the various systems. This is advantageous as it reduces the number of different types of temperature-control members that may be needed by a party using differently-sized systems.

Figure 18:
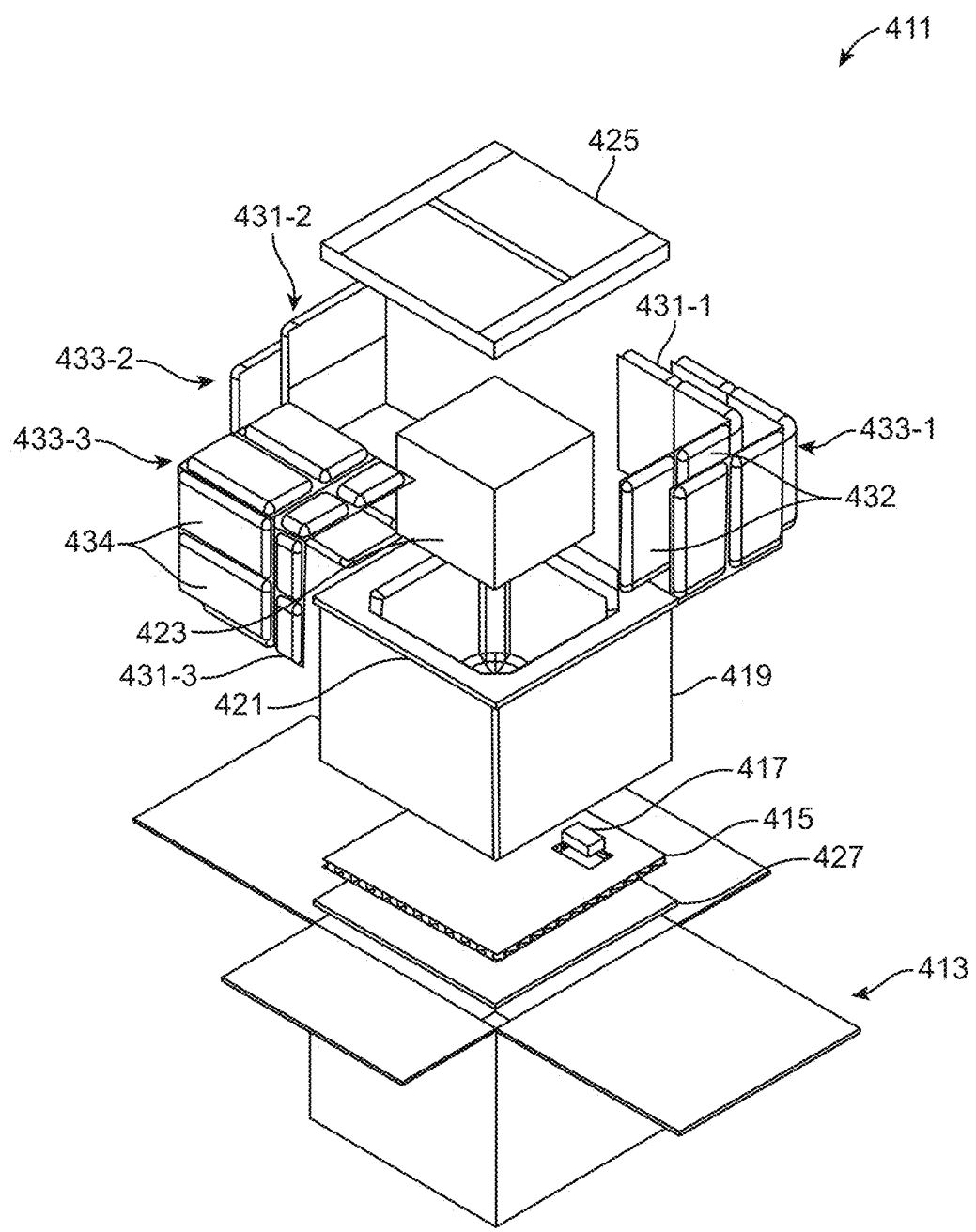
FIG. 18 is a partly exploded perspective view of a sixth embodiment of a shipping system suitable for use in storing and/or transporting temperature-sensitive materials, the shipping system being constructed according to the teachings of the present invention.
Figure 19A:
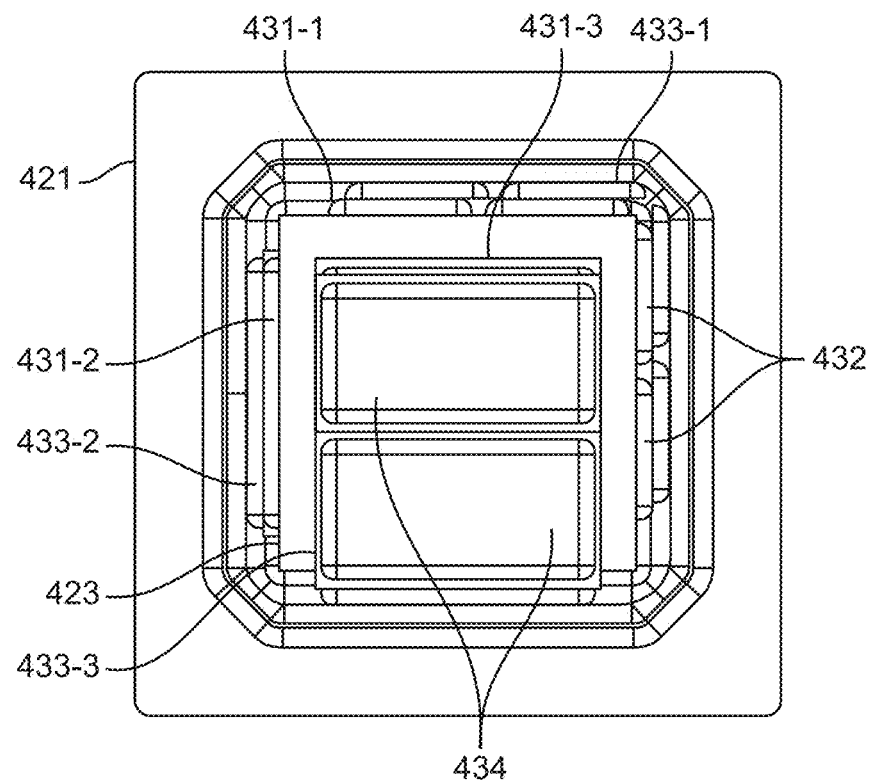
FIGS. 19(a) and 19(b) are top and section views, respectively, of the shipping system of FIG. 18, with only the liner, the product box, and the temperature-control members being shown.
Figure 19B:
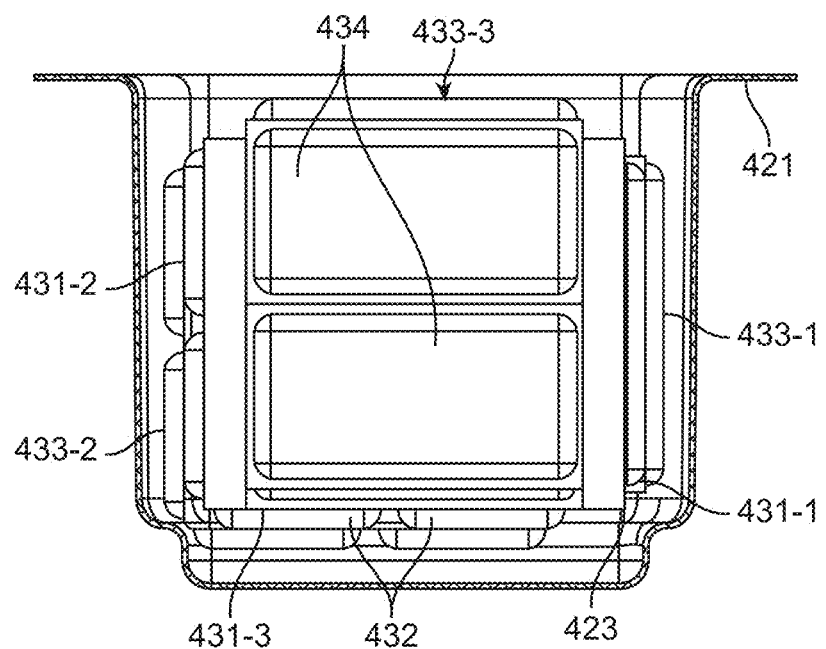

Referring now to FIGS. 18, 19 (*a*) and 19 (*b*), there is shown a partly exploded perspective view of a sixth embodiment of a shipping system suitable for use in storing and/or transporting temperature-sensitive materials, the shipping system being constructed according to the present invention and being represented generally by reference numeral 411. For clarity and/or ease of illustration, certain details of shipping system 411 that are discussed elsewhere in this application or that are not critical to an understanding of the invention may be omitted from one or more of FIGS. 18, 19 (*a*) and 19 (*b*) or may be shown therein in a simplified manner.

System 411 may be similar in many respects to system 11. Accordingly, system 411 may comprise an outer box 413, which may be similar to outer box 13 of system 11, a board 415, which may be similar to board 43 of system 11, an environmental data logger 417, which may be similar to environmental data logger 41 of system 11, an insulation unit 419, which may be similar to insulation unit 51 of system 11, a protective liner 421, which may be similar to protective liner 81 of system 11, a product box 423, which may be similar to product box 99 of system 11 but may be scaled down in size, and a lid assembly 425, which may be similar to lid assembly 122 of system 11. Although not shown in FIG. 18, lid assembly 425 may be detachably coupled to a top flap of outer box 413 in a manner analogous to that discussed above for lid assembly 122 of system 11.

System 411 may differ from system 11 in that system 411 may additionally comprise a pad 427, which may be made of foam or a similarly suitable material, disposed in outer box 413 under board 415. Pad 427 may be used to keep the components that are contained within outer box 413 from jostling up and down, despite tolerances, and may also provide some shock absorption to protect the contents disposed within outer box 413. Notwithstanding the above, in some embodiments, pad 427 may be omitted.

System 411 may also differ from system 11 in that, whereas system 11 may comprise three temperature-control members 101-1 through 101-3, system 411 may comprise six temperature-control members, namely, three inner temperature-control members 431-1 through 431-3 and three outer temperature-control members 433-1 through 433-3. In the present embodiment, each of inner temperature-control members 431-1 through 431-3 may have four generally rectangular, trough-shaped pouches 432, and each of outer temperature-control members 433-1 through 433-3 may have four generally rectangular, trough-shaped pouches 434. Inner temperature-control members 431-1 through 431-3 may be arranged around product box 423 so that two pouches 432 of inner temperature-control members 431-1 through 431-3 may face each side of product box 423. Outer temperature-control members 433-1 through 433-3 may be similarly arranged around inner temperature-control members 431-1 through 431-3. Preferably, inner temperature-control members 431-1 through 431-3 and outer temperature-control members 433-1 through 433-3 are dimensioned to snugly fit between product box 423 and protective liner 421. Notwithstanding the above, it is to be understood that the number and/or dimensions of inner temperature-control members 431-1 through 431-3 and outer temperature-control members 433-1 through 433-3, as well as the number of pouches 432 and 434 therein, may be varied without departing from the present invention.

Inner temperature-control members 431-1 through 431-3 and outer temperature-control members 433-1 through 433-3 may be similar to temperature-control members 101-1 through 101-3 in terms of size, shape, and general construction. However, as can be appreciated, the types and/or quantities of phase-change materials used in inner temperature-control members 431-1 through 431-3 and in outer temperature-control members 433-1 through 433-3 may or may not be the same as that of temperature-control members 101-1 through 101-3 and may differ therefrom, for example, by one or more of phase-change temperature, specific heat, chemical composition, and quantity. In fact, the types and/or quantities of phase-change material in inner temperature-control members 431-1 through 431-3 and outer temperature-control members 433-1 through 433-3 may be tailored to a particular application. For example, one, some, or all of inner temperature-control members 431-1 through 431-3 and/or one, some, or all of temperature-control members 433-1 through 433-3 may contain a different type and/or a different quantity of phase-change material than is contained in temperature-control members 101-1 through 101-3. (In fact, the type and/or quantity of phase-change material may even differ among different pouches of the same temperature-control member.) Moreover, the preconditioning temperatures used for inner temperature-control members 431-1 through 431-3 and for outer temperature-control members 433-1 through 433-3 may or may not be the same as that for temperature-control members 101-1 through 101-3 and may be tailored to a particular application. For example, one, some, or all of inner temperature-control members 431-1 through 431-3 and/or one, some, or all of temperature-control members 433-1 through 433-3 may be preconditioned at one or more temperatures different than that used to precondition temperature-control members 101-1 through 101-3. Notwithstanding the above, in certain applications, it may be desirable for inner temperature-control members 431-1 through 431-3 and outer temperature-control members 433-1 through 433-3 to contain the same type of phase-change material and/or to be preconditioned at the same temperature. This may be desirable, for example, where the phase-change material that is needed exceeds that which is contained in a single temperature-control member.

Where, for example, system 411 may be used to maintain a payload at a temperature of +15° C. to +25° C. for an extended period of time, such as 4 days or longer, each of pouches 432 of inner temperature-control members 431-1 through 431-3 and each of pouches 434 of outer temperature-control members 433-1 through 433-3 may contain an equal quantity of a phase-change material having a phase-change temperature of +17° C., with inner temperature-control members 431-1 through 431-3 being preconditioned at +20° C. and with outer temperature-control members 433-1 through 433-3 being preconditioned at +5° C. A +17° C. phase-change material suitable for use in pouches 432 of inner temperature-control members 431-1 through 431-3 and in pouches 434 of outer temperature-control members 433-1 through 433-3 may be, for example, a gelled n-hexadecane of the type described in U.S. Pat. No. 9,598,622 B2 and/or U.S. Patent Application Publication No. US 2018/0093816 A1, which are incorporated herein by reference.

Alternatively, pouches 432 of inner temperature-control members 431-1 through 431-3 may contain a +17° C. phase-change material (which may be a gelled n-hexadecane of the type described above), and pouches 434 of outer temperature-control members 433-1 through 433-3 may contain a +24° C. phase-change material (which may be, for example, a gelled n-hexadecane/n-octadecane of the type described in U.S. Pat. No. 9,598,622 B2 and/or U.S. Patent Application Publication No. US 2018/0093816 A1, which are incorporated herein by reference), with inner temperature-control members 431-1 through 431-3 being preconditioned at +20° C. and with outer temperature-control members 433-1 through 433-3 also being preconditioned at +20° C. Alternatively, the contents of inner temperature-control members 431-1 through 431-3 and outer temperature-control members 433-1 through 433-3 may be swapped, with inner temperature-control members 431-1 through 431-3 containing a +24° C. phase-change material preconditioned at 20° C. and with outer temperature-control members 433-1 through 433-3 containing a +17° C. phase-change material preconditioned at 20° C.

Although not shown, to facilitate assembly of system 411, one or more of inner temperature-control members 431-1 through 431-3 and outer temperature-control members 433-1 through 433-3 may be removably or permanently housed in a sleeve or container (e.g., a corrugate sleeve or container). For example, inner temperature-control member 431-1 and outer temperature-control member 433-1 may be housed within a first sleeve or container, inner temperature-control member 431-2 and outer temperature-control member 433-2 may be housed within a second sleeve or container, and inner temperature-control member 431-3 and outer temperature-control member 433-3 may be housed within a third sleeve or container. In particular, where the inner and outer temperature-control members are pre-conditioned at the same temperature, such pre-conditioning may take place with the inner and outer temperature-control members housed within their corresponding sleeve or container. Instead of using a sleeve or container, one or more inner temperature-control members and one or more outer temperature-control members may be coupled to one another by other techniques, such as, but not limited to, shrink-wrapping, hook and loop fasteners, adhesive tape, glue, and the like.

As can readily be appreciated, a protective liner of the type exemplified by protective liners 81, 211 and 421 may be replaced with a protective liner of the type exemplified by protective liner 351 and vice versa. In other words, for example, protective liner 81, protective liner 211, or protective liner 421 could have an overall shape similar to that of protective liner 351 and/or could comprise or consist of the materials used to make protective liner 351, such as a polymer-coated corrugated cardboard, and protective liner 351 could have an overall shape similar to that of protective liners 81, 211 or 421 and/or could comprise or consist of the materials used to make protective liners 81, 211 or 421.

Figure 20:
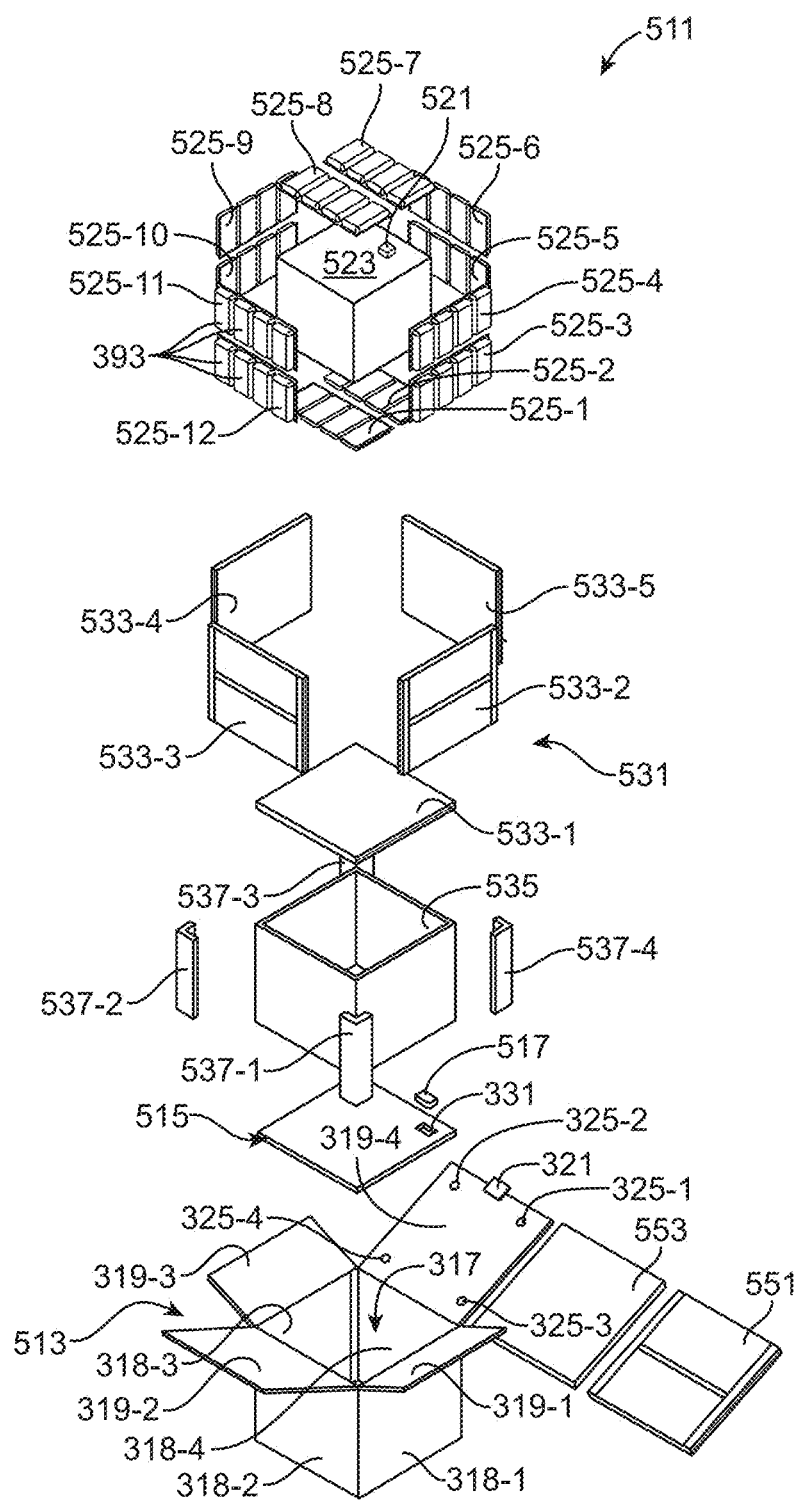
FIG. 20 is a partly exploded perspective view of a seventh embodiment of a shipping system suitable for use in storing and/or transporting temperature-sensitive materials, the shipping system being constructed according to the teachings of the present invention.

Referring now to FIG. 20, there is shown a partly exploded perspective view of a seventh embodiment of a shipping system suitable for use in storing and/or transporting temperature-sensitive materials, the shipping system being constructed according to the present invention and being represented generally by reference numeral 511. For clarity and/or ease of illustration, certain details of shipping system 511 that are discussed elsewhere in this application or that are not critical to an understanding of the invention may be omitted from FIG. 20 or may be shown therein in a simplified manner.

System 511 may be similar in many respects to system 301. Accordingly, system 511 may comprise an outer box 513, which may be similar to outer box 303 of system 301, a board 515, which may be similar to board 307 of system 301, an environmental data logger 517, which may be similar to environmental data logger 333 of system 301, a temperature indicator 521, which may be similar to temperature indicator 395 of system 301, a product box 523, which may be similar to product box 313 of system 301, and temperature-control members 525-1 through 525-12, which may be similar to temperature-control members 391-1 through 391-12, respectively, of system 301.

Figure 21A:
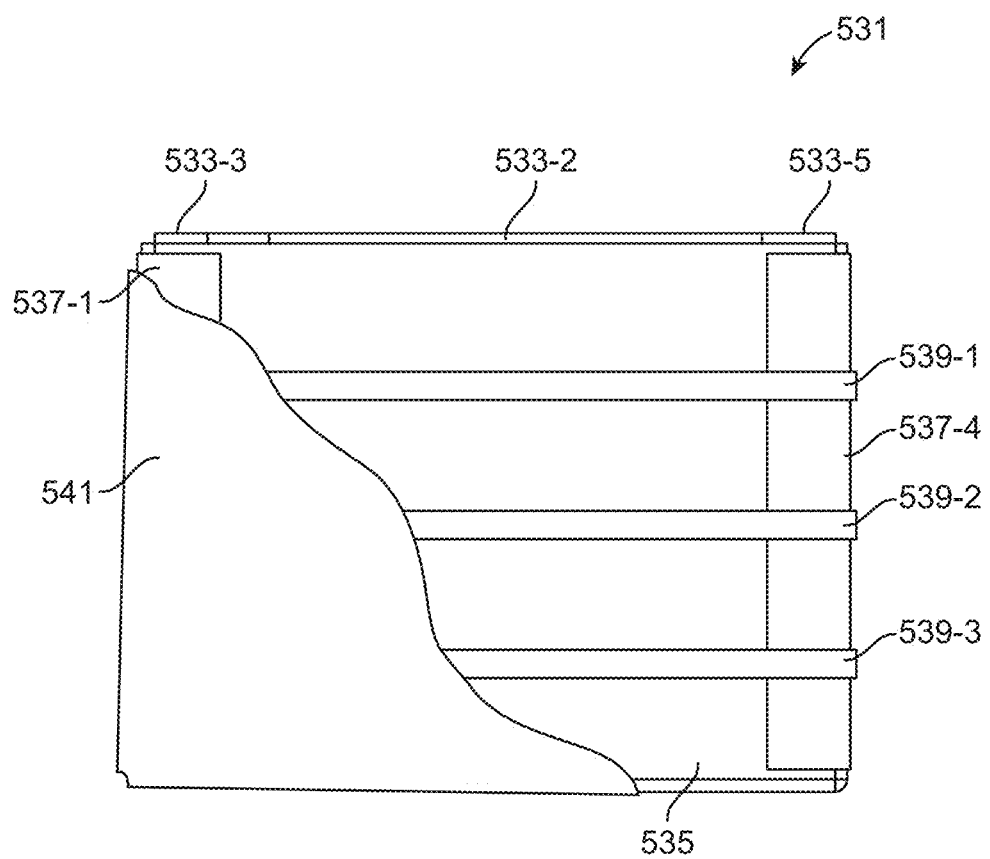
FIGS. 21(a) and 21(b) are side, broken away in part, and simplified section views, respectively, of the insulation unit of the shipping system shown in FIG. 20.
Figure 21B:
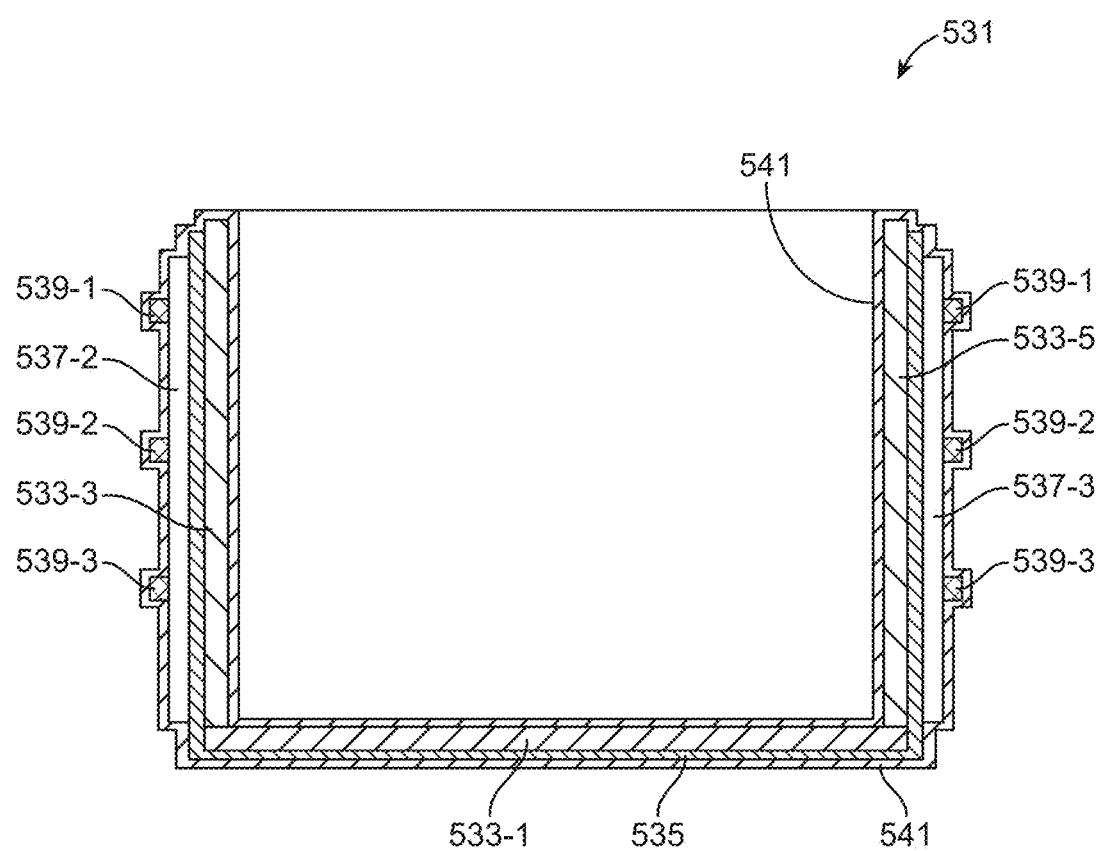

System 511 may differ from system 301 in that, whereas system 301 may comprise insulation unit 309, system 511 may instead comprise an insulation unit 531. Insulation unit 531, which is also shown in FIGS. 21(*a*) and 21(*b*), may be similar in many respects to insulation unit 309 of system 301. Accordingly, insulation unit 531 may comprise a plurality of vacuum insulated panels 533-1 through 533-5, which may be similar to vacuum insulated panels 341-1 through 341-5, respectively, of system 301, a support 535, which may be similar to support 343 of system 301, a plurality of corner boards 537-1 through 537-4, which may be similar to corner boards 345-1 through 345-4 of system 301, and a plurality of straps 539-1 through 539-3, which may be similar to straps 69-1 through 69-3 of system 11. However, insulation unit 531 may differ from insulation unit 309 in that insulation unit 531 may also comprise a coating 541. Coating 541, which may be a polymer coating similar to the polymer coating that may be applied to liner 351 of system 301, may be used to encapsulate, partially or completely, the assembly of vacuum insulated panels 533-1 through 533-5, support 535, corner boards 537-1 and 537-4, and straps 539-1 through 539-3. Accordingly, in one embodiment, coating 541 may be formed by spraying or otherwise applying a conventional sprayable, two-part polyurea or polyurethane system over the aforementioned assembly of components. Preferably, coating 541 is applied over at least the entirety of the exposed portions of vacuum insulated panels 533-1 through 533-5; however, coating 541 could be applied to only some of the exposed portions of vacuum insulated panels 533-1 through 533-5 (e.g., the inner surfaces forming the floor and sides of insulation unit 531).

One benefit of insulation unit 531, particularly where coating 541 at least encapsulates the exposed portions of vacuum insulated panels 533-1 through 533-5, is that system 511 need not include a liner. In other words, product box 523 and temperature-control members 525-1 through 525-12 may be positioned directly within insulation unit 531. This may be beneficial in reducing the cost and complexity of system 511 and may also permit a larger product box to be used.

Although insulation unit 531 is described above as being made by assembling vacuum insulated panels 533-1 through 533-5, support 535, corner boards 537-1 and 537-4, and straps 539-1 through 539-3 and then applying coating 541 to the assembly, one could apply the coating to the individual vacuum insulated panels 533-1 through 533-5 and then assemble the various components.

Also, where vacuum insulated panels 533-1 through 533-5 are assembled with support 535 and then coating 541 is applied to the assembly, it may be possible to omit corner boards 537-1 through 537-4 and/or straps 539-1 through 539-3. In fact, by applying coating 541 directly to an assembly of vacuum insulated panels 533-1 through 533-5, it may further be possible to omit support 535, whereby the resulting insulation unit may consist merely of vacuum insulated panels 533-1 through 533-5 and coating 541, with the vacuum insulated panels 533-1 through 533-5 being held together by coating 541.

System 511 may further comprise a vacuum insulated panel 551 and a casing 553. Casing 553 may be similar to casing 327 of system 301 but may additionally be partially or completely encapsulated within a coating similar to coating 541. Alternatively, casing 553 may be omitted, and vacuum insulated panel 551 may be partially or completely encapsulated within such a coating.

The encapsulation of vacuum insulated panels 533-1 through 533-5 and/or vacuum insulated panel 551 with a coating similar to 541 may result in improved thermal properties for system 511. Also, such encapsulation may create a seal between vacuum insulated panels 533-1 through 533-5 and vacuum insulated panel 551, for example, when outer box 513 is closed.

The embodiments of the present invention described above are intended to be merely exemplary and those skilled in the art shall be able to make numerous variations and modifications to it without departing from the spirit of the present invention. All such variations and modifications are intended to be within the scope of the present invention.

What is claimed is:

1. A shipping system for use in transporting and/or storing temperature-sensitive materials, the shipping system comprising:
   (a) an insulation unit, the insulation unit shaped to include a cavity bounded by a bottom wall, four side walls, and an open top, the insulation unit comprising an assembly of vacuum insulated panels encapsulated within a spray-coating of a polyurea, wherein each vacuum insulated panel is in direct contact with at least one other vacuum insulated panel;
   (b) a product box, the product box being removably disposed within the cavity of the insulation unit; and
   (c) at least one temperature-control member, the at least one temperature-control member being removably disposed within the cavity of the insulation unit.

2. The shipping system as claimed in claim 1 wherein the insulation unit further comprises at least one of a support, corner boards, and straps also encapsulated within the spray-coating of polyurea.

3. The shipping system as claimed in claim 1 wherein the plurality of vacuum insulated panels comprises a bottom vacuum insulated panel and four side vacuum insulated panels, the four side vacuum insulated panels being positioned directly on top of the bottom vacuum insulated panel.

4. The shipping system as claimed in claim 1 wherein the at least one temperature-control member comprises a plurality of temperature-control members, the plurality of temperature-control members being positioned snugly on all sides of the product box.

5. The shipping system as claimed in claim 4 wherein each of the plurality of temperature-control members comprises at least one pouch and wherein a layer of exactly one pouch is positioned on all sides of the product box.

6. The shipping system as claimed in claim 4 wherein each of the plurality of temperature-control members comprises at least one pouch and wherein a layer of more than one pouch is positioned on at least one side of the product box.

7. The shipping system as claimed in claim 1 wherein the at least one temperature-control member comprises a plurality of temperature-control members, wherein each of the temperature-control members comprises a flexible mat having a plurality of discrete sealed pouches, each of the plurality of discrete sealed pouches containing a quantity of phase-change material, the flexible mat being sufficiently flexible to be bent by at least 90 degrees.

8. The shipping system as claimed in claim 1 further comprising an outer box, wherein the insulation unit, the product box and the at least one temperature-control member are removably mounted within the outer box.

9. The shipping system as claimed in claim 8 wherein the outer box comprises a top closure flap and wherein the shipping system further comprises an insulated lid, the insulated lid having opposing top and bottom surfaces, the top surface of the insulated lid being coupled to the top closure flap so that closure of the top closure flap positions the insulated lid over the cavity of the insulation unit.

10. The shipping system as claimed in claim 9 wherein the insulated lid is removably mounted on the top closure flap.

11. The shipping system as claimed in claim 9 further comprising a cover, the cover covering the bottom surface of the insulated lid.

12. The shipping system as claimed in claim 11 wherein the insulated lid is removably mounted on the top closure flap and wherein the cover is removably mounted on the insulated lid.

13. A shipping system for use in transporting and/or storing temperature-sensitive materials, the shipping system comprising:
(a) an insulation unit, the insulation unit shaped to include a cavity bounded by a bottom wall, four side walls, and an open top, the insulation unit consisting of an assembly of vacuum insulated panels held together with a spray-coating of a polyurea, wherein each vacuum insulated panel is in direct contact with at least one other vacuum insulated panel;
(b) a product box, the product box being removably disposed within the cavity of the insulation unit; and
(c) at least one temperature-control member, the at least one temperature-control member being removably disposed within the cavity of the insulation unit.

14. The shipping system as claimed in claim 13 wherein the plurality of vacuum insulated panels consists of a bottom vacuum insulated panel and four side vacuum insulated panels, the four side vacuum insulated panels being positioned directly on top of the bottom vacuum insulated panel to form the cavity.

15. The shipping system as claimed in claim 14 wherein the spray-coating of polyurea is applied over at least some exposed portions of the vacuum insulated panels.

16. The shipping system as claimed in claim 14 wherein the spray-coating of polyurea is applied over all exposed portions of the vacuum insulated panels.

17. The shipping system as claimed in claim 13 wherein the at least one temperature-control member comprises a plurality of temperature-control members, wherein each of the temperature-control members comprises a plurality of pouches, wherein each pouch contains a phase-change material, and wherein at least one pouch contains a different phase-change materials than another pouch.

18. The shipping system as claimed in claim 13 wherein the at least one temperature-control member comprises a first temperature-control member, the first temperature-control member comprising a plurality of pouches, at least some of the pouches of the first temperature-control member comprising a first type of phase-change material and at least some of the pouches of the first temperature-control member comprising a second type of phase-change material, the first and second types of phase-change material being different.

19. The shipping system as claimed in claim 13 further comprising a lid, the lid being removably mounted over the insulation unit for closing the cavity of the insulation unit.

20. The shipping system as claimed in claim 19 wherein the lid comprises a vacuum insulated panel.

21. A shipping system for use in transporting and/or storing temperature-sensitive materials, the shipping system comprising:
(a) an insulation unit, the insulation unit shaped to include a cavity bounded by a bottom wall, four side walls, and an open top, the insulation unit comprising an assembly of vacuum insulated panels, wherein the assembly of vacuum insulated panels is formed by completely encapsulating each of a plurality of vacuum insulated panels within a spray-coating of a polyurea and then assembling the plurality of vacuum insulated panels so that each of said polyurea-encapsulated vacuum insulated panels is in direct contact with at least one other of said polyurea-encapsulated vacuum insulated panels;
(b) a product box, the product box being removably disposed within the cavity of the insulation unit; and
(c) at least one temperature-control member, the at least one temperature-control member being removably disposed within the cavity of the insulation unit.

* * * * *